(12) United States Patent
Mandyam et al.

(10) Patent No.: US 8,595,186 B1
(45) Date of Patent: Nov. 26, 2013

(54) SYSTEM AND METHOD FOR BUILDING AND DELIVERING MOBILE WIDGETS

(75) Inventors: Srinivas Mandyam, San Jose, CA (US);
Krishna Vedati, Sunnyvale, CA (US);
Kelvin Voon-Kit Chong, San Jose, CA (US)

(73) Assignee: Plusmo LLC, Glendale, CA (US)

( * ) Notice: Subject to any disclaimer, the term of this patent is extended or adjusted under 35 U.S.C. 154(b) by 1190 days.

(21) Appl. No.: 12/135,089

(22) Filed: Jun. 6, 2008

Related U.S. Application Data

(60) Provisional application No. 60/942,406, filed on Jun. 6, 2007.

(51) Int. Cl.
*G06F 7/00* (2006.01)
*G06F 17/00* (2006.01)
*G06F 9/445* (2006.01)

(52) U.S. Cl.
USPC ............ 707/632; 707/733; 707/912; 717/178

(58) Field of Classification Search
USPC ......... 707/617, 623, 628, 632, 633, 731–734, 707/912, 178
See application file for complete search history.

(56) References Cited

U.S. PATENT DOCUMENTS

| | | | |
|---|---|---|---|
| 7,454,459 B1* | 11/2008 | Kapoor et al. | 709/203 |
| 7,890,136 B1* | 2/2011 | Fujisaki | 455/556.1 |
| 8,185,507 B1* | 5/2012 | Kaminski, Jr. | 707/698 |
| 8,261,258 B1* | 9/2012 | Jianu et al. | 717/174 |
| 2001/0047363 A1* | 11/2001 | Peng | 707/104.1 |
| 2003/0208595 A1* | 11/2003 | Gouge et al. | 709/225 |
| 2005/0058108 A1* | 3/2005 | Ekberg et al. | 370/338 |
| 2005/0154759 A1* | 7/2005 | Hofmeister et al. | 707/104.1 |
| 2005/0172231 A1* | 8/2005 | Myers | 715/716 |
| 2006/0143622 A1* | 6/2006 | Prabandham et al. | 719/328 |
| 2006/0149630 A1* | 7/2006 | Elliott et al. | 705/14 |
| 2006/0165105 A1* | 7/2006 | Shenfield et al. | 370/401 |
| 2007/0033584 A1* | 2/2007 | Yu | 717/168 |

(Continued)

FOREIGN PATENT DOCUMENTS

WO WO 2005053335 A1 * 6/2005 ............... H04Q 7/32

OTHER PUBLICATIONS

"Sony Ericsson Z525 White Paper". Aug. 2006. Sony Ericsson. 64 pages.*

(Continued)

*Primary Examiner* — James E Richardson
(74) *Attorney, Agent, or Firm* — Kilpatrick Townsend & Stockton LLP

(57) ABSTRACT

Systems and methods are provided for creating, publishing, sharing, and delivering mobile software applications called "mobile widgets" onto mobile devices. A system may include functionality to render a declaratory component of a widget, such as HTML, and also functionality to execute an imperative component of a widget, which may or may not be compiled and/or in a scripting or functional language. Mechanisms for providing common access to disparate device capabilities APIs are also provided, as are mechanisms for installing widgets onto mobile devices and managing those widgets.

62 Claims, 72 Drawing Sheets

(56) References Cited

U.S. PATENT DOCUMENTS

| | | |
|---|---|---|
| 2007/0101291 A1* | 5/2007 | Forstall et al. ............... 715/805 |
| 2007/0101433 A1* | 5/2007 | Louch et al. ................. 726/25 |
| 2007/0184820 A1* | 8/2007 | Marshall .................. 455/414.3 |
| 2007/0250521 A1* | 10/2007 | Kaminski, Jr. ............... 707/101 |
| 2007/0250643 A1* | 10/2007 | Pyhalammi et al. .......... 709/245 |
| 2007/0260637 A1* | 11/2007 | Shenfield et al. .......... 707/104.1 |
| 2007/0275705 A1* | 11/2007 | Lau et al. .................. 455/414.1 |
| 2008/0167078 A1* | 7/2008 | Eibye ............................ 455/566 |
| 2008/0168382 A1* | 7/2008 | Louch et al. ................. 715/781 |
| 2008/0168391 A1* | 7/2008 | Robbin et al. ............... 715/810 |
| 2009/0077664 A1* | 3/2009 | Hsu et al. ....................... 726/24 |

OTHER PUBLICATIONS

Tomimori et al. "An Efficient and Flexible Access Control Framework for Java Programs in Mobile Terminals" 2002. Proceedings of the 22nd International Conference on Distributed Computing Systems Workshops. 6 pages.*

Raento et al. "ContextPhone: A prototyping Platform for Context-Aware Mobile Applications" 2005. Pervasive Computing, IEEE, vol. 4, No. 2, pp. 51-59.*

* cited by examiner

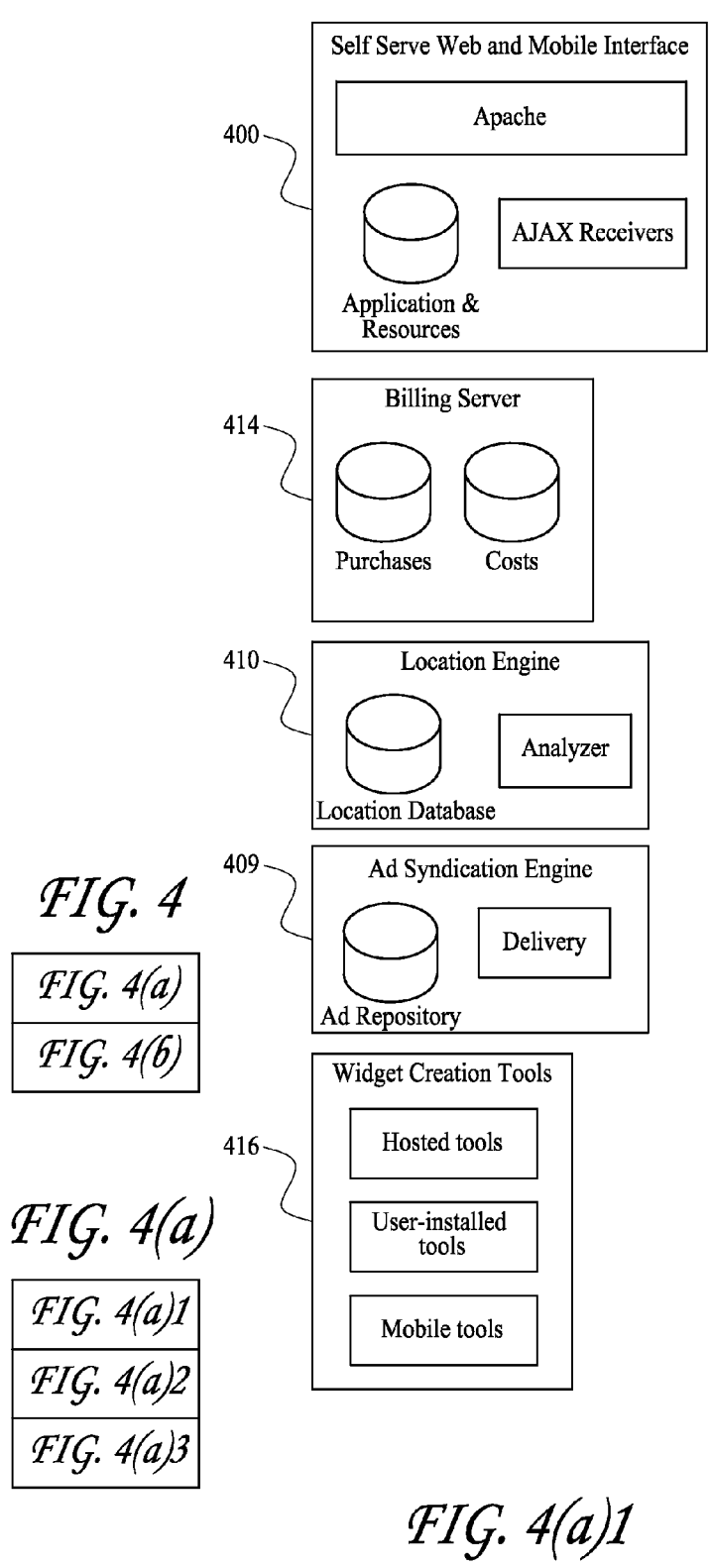

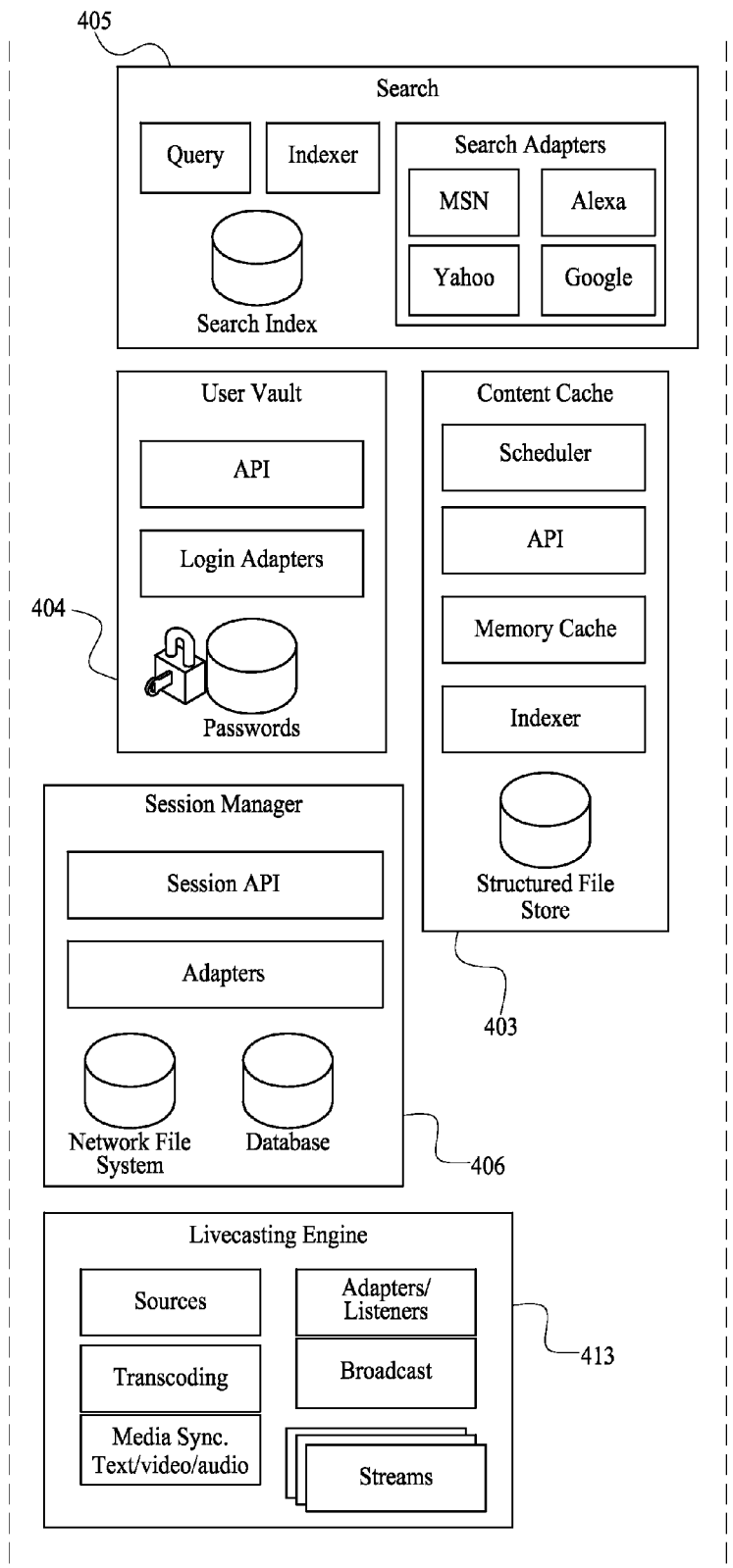
FIG. 4(a)2

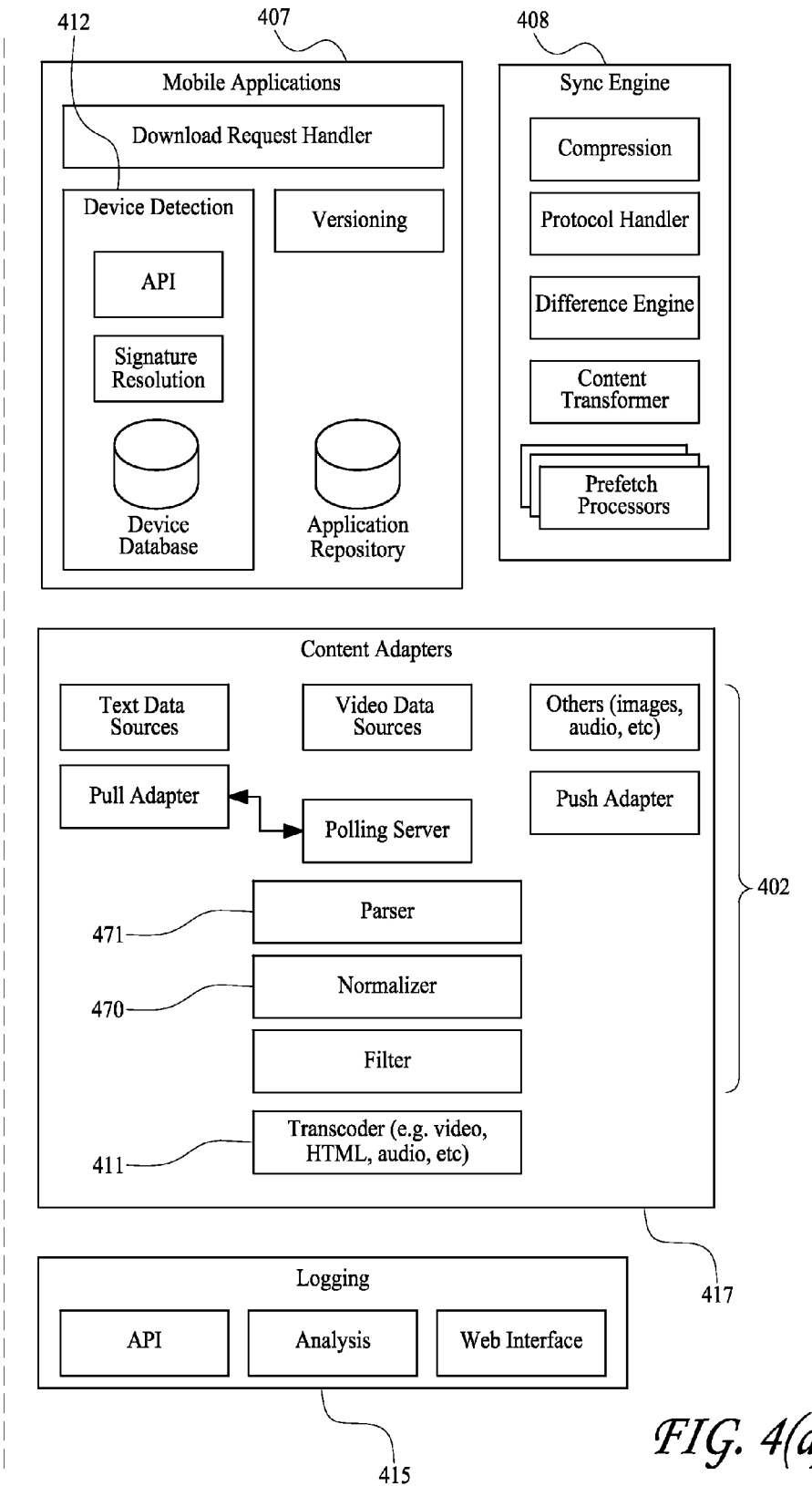
FIG. 4(a)3

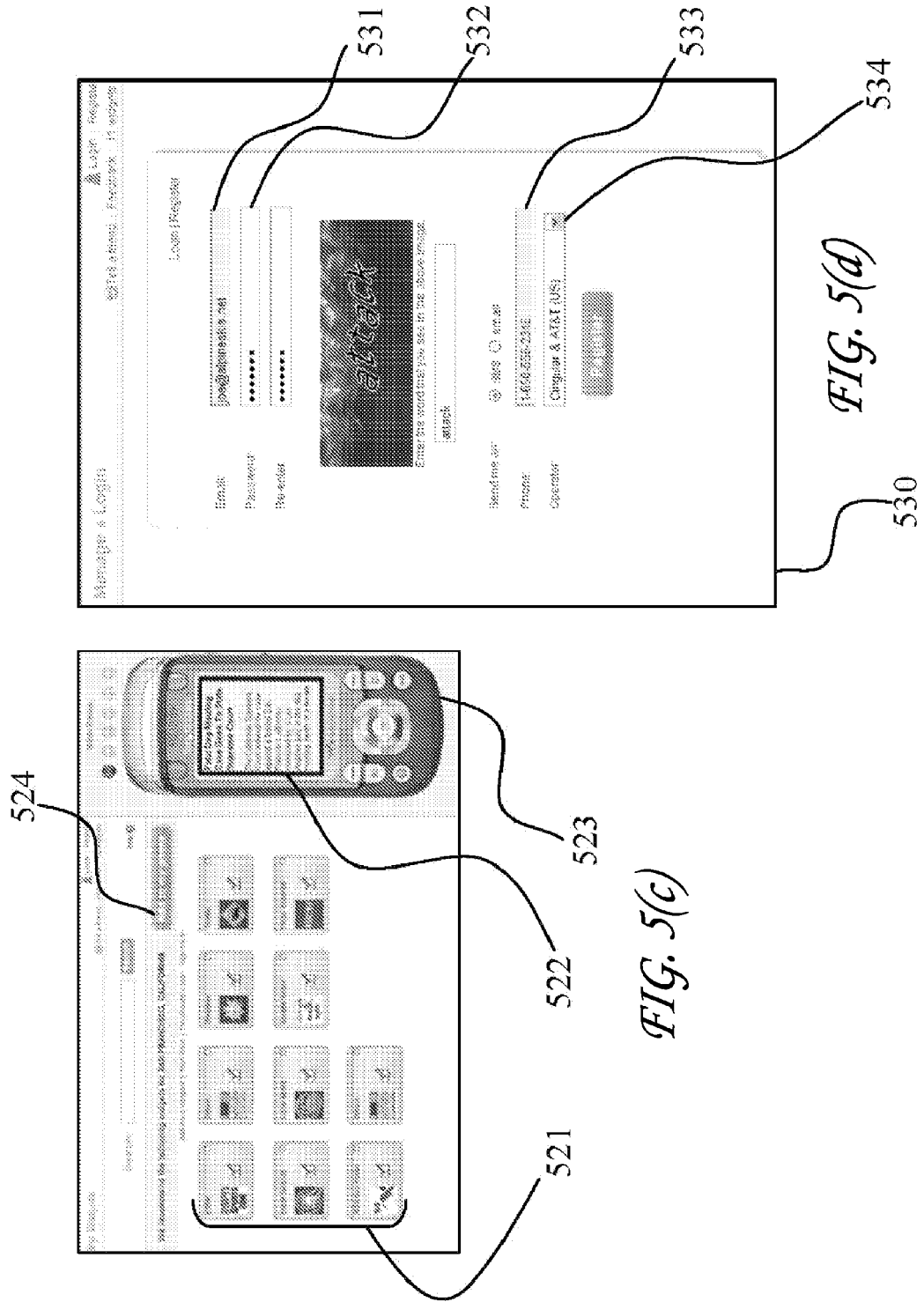

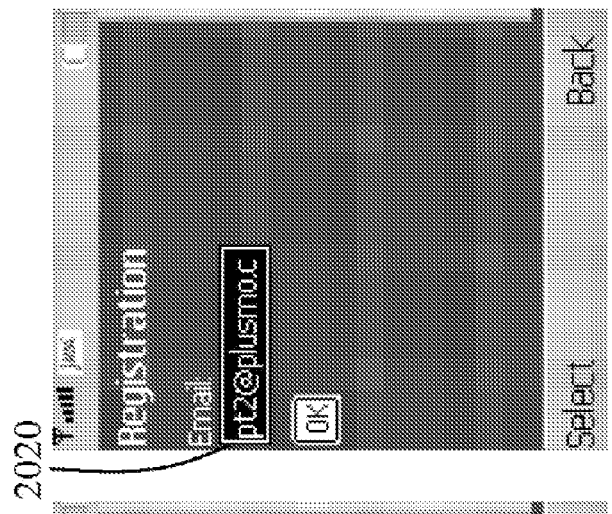
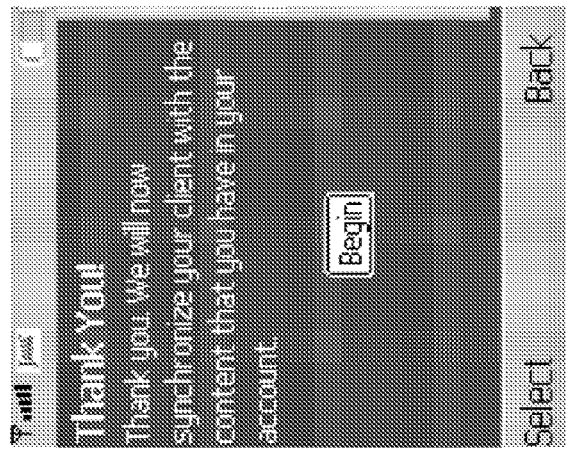
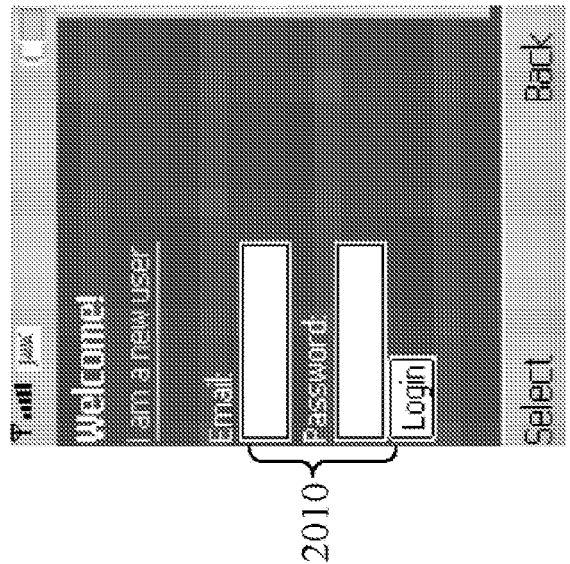
FIG. 20(c)
FIG. 20(b)
FIG. 20(a)

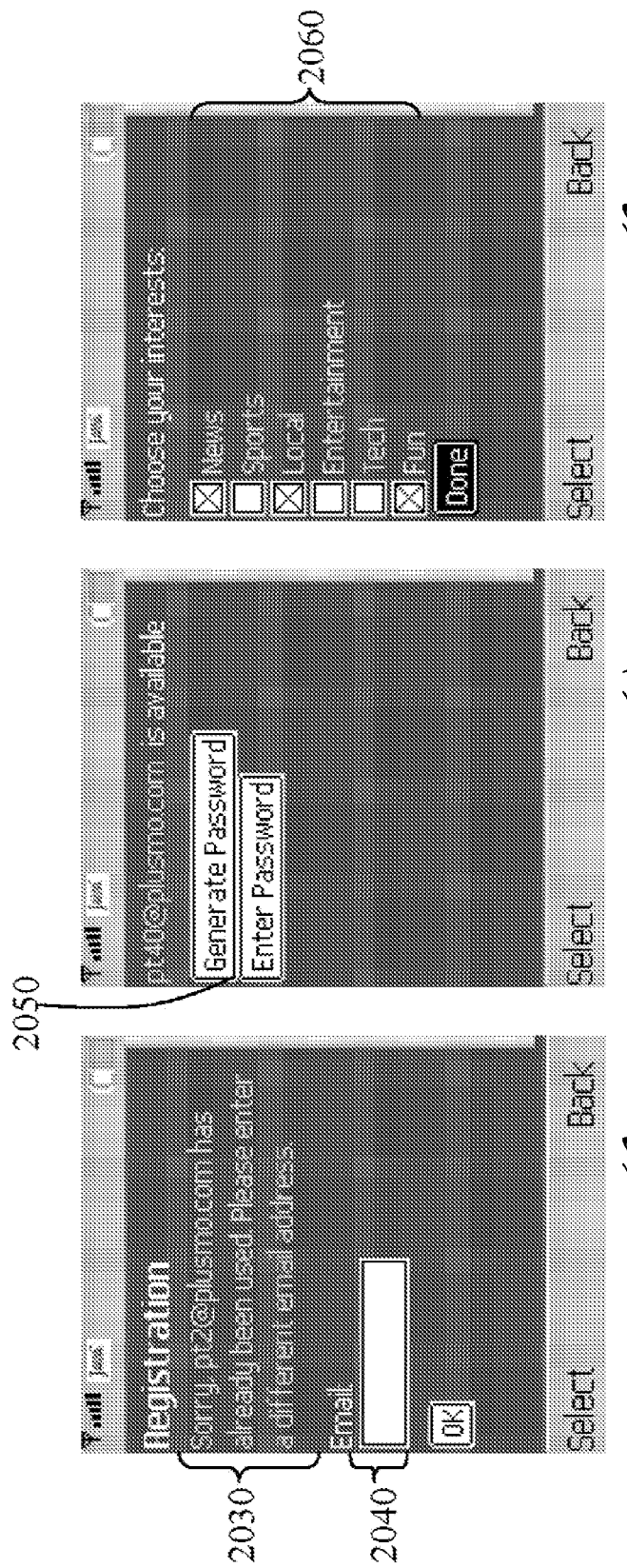

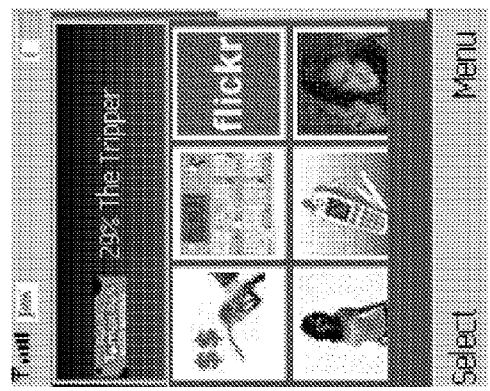
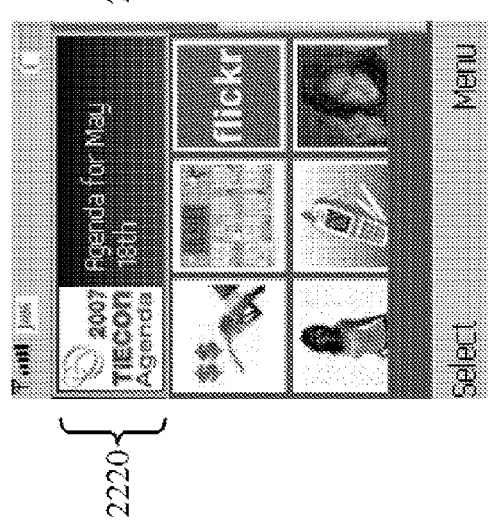
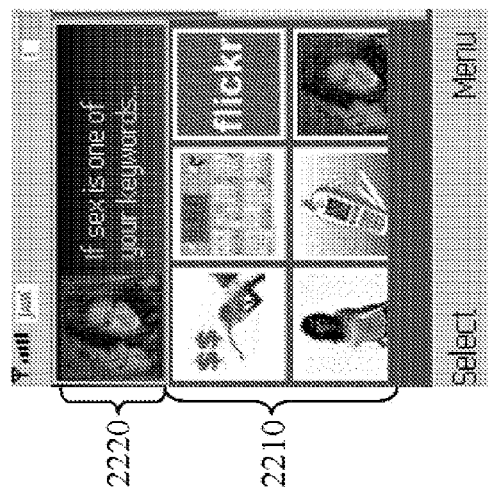
FIG. 22(a)
FIG. 22(b)
FIG. 22(c)

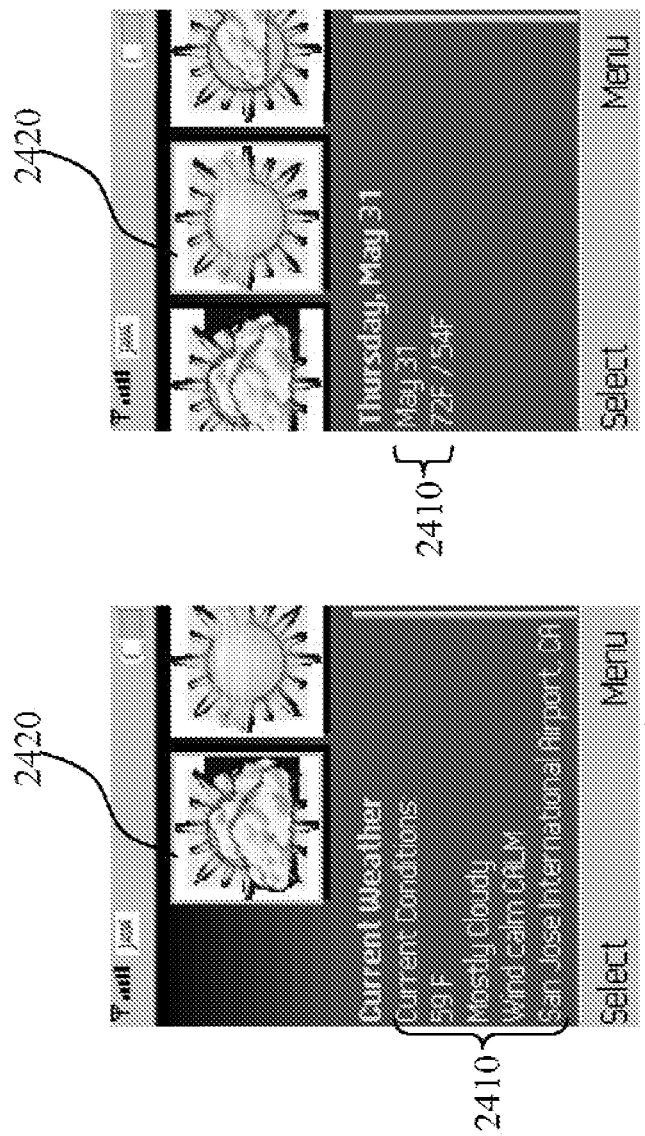

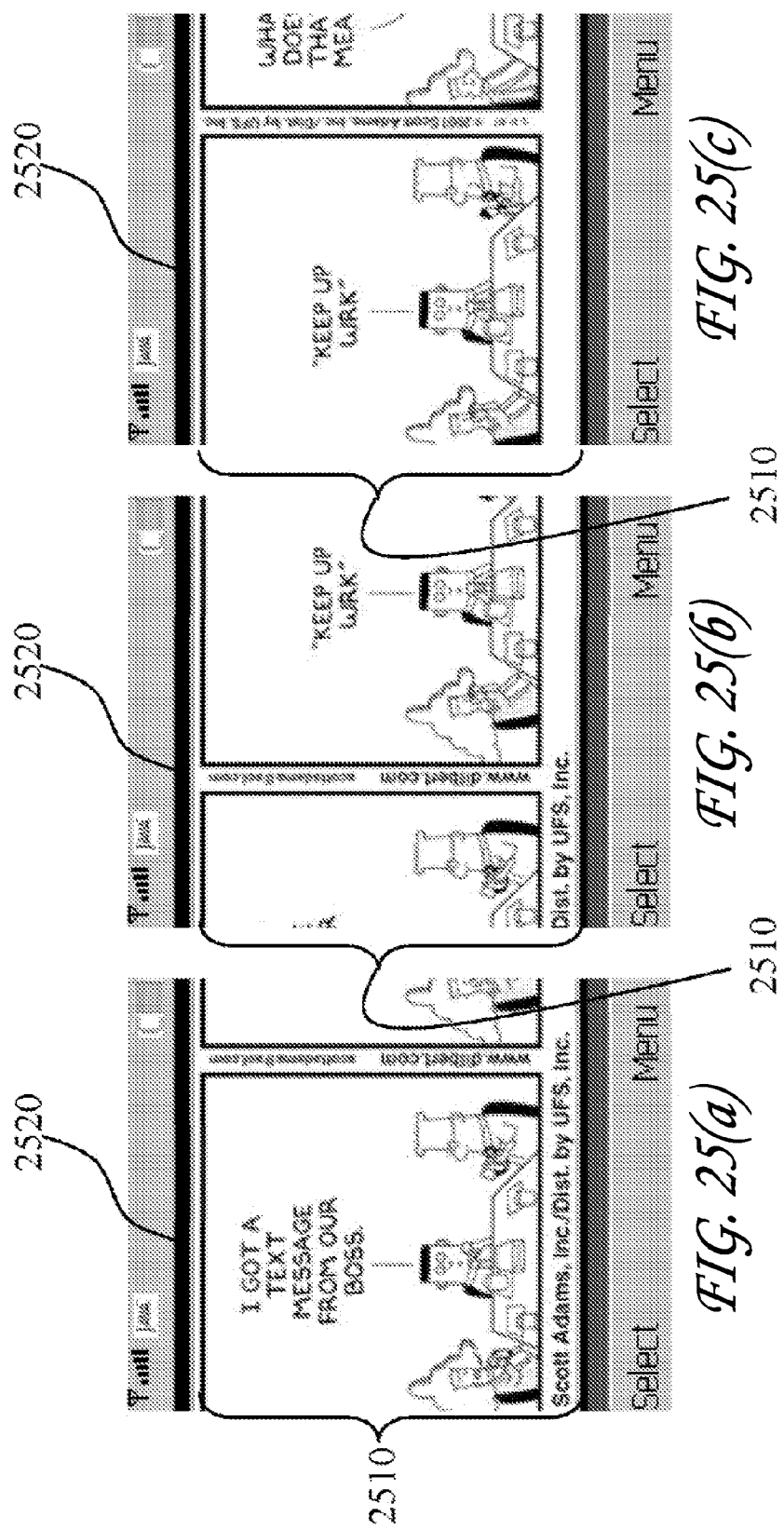

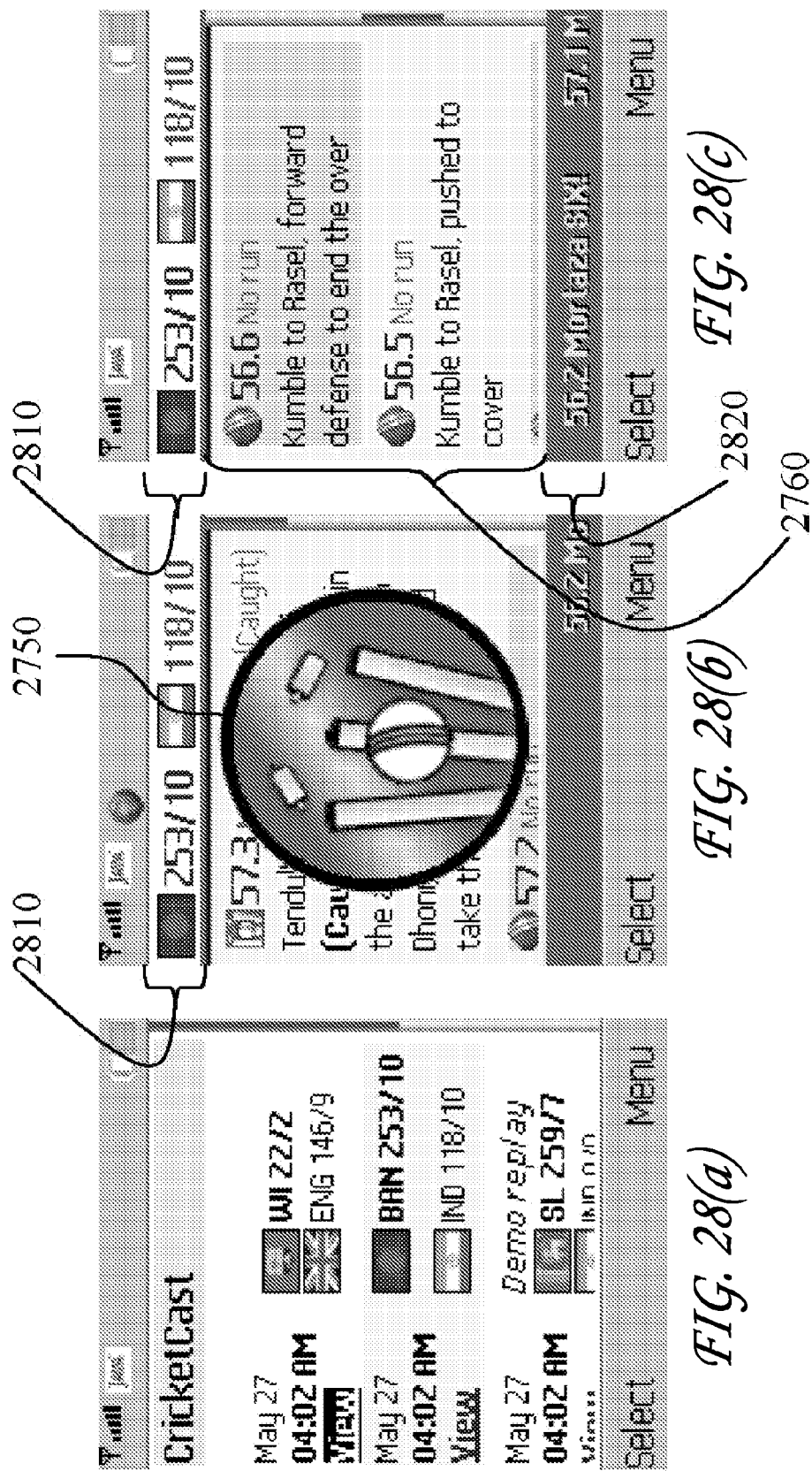

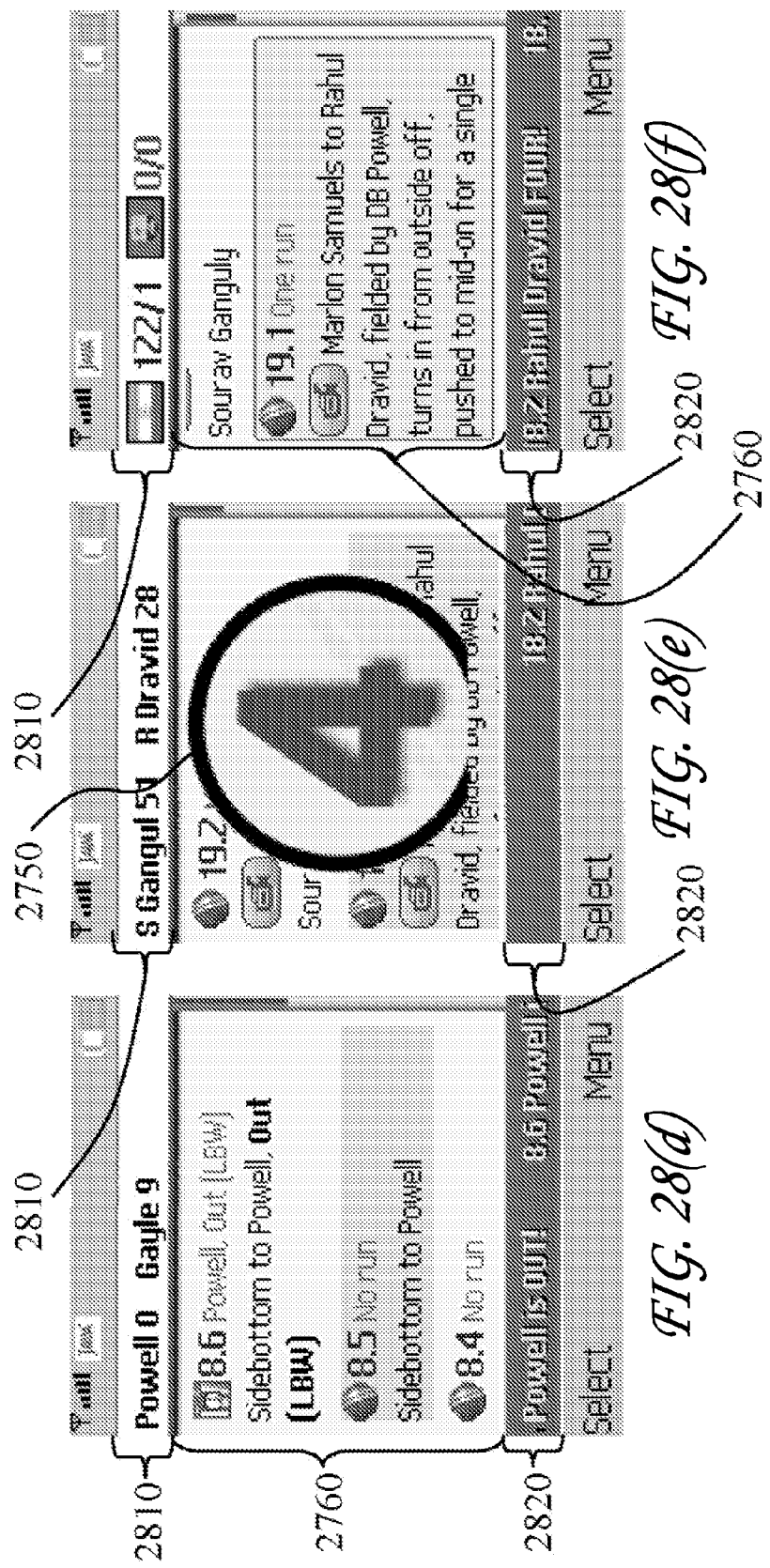

FIG. 28(g)

Bangladesh – 2nd Innings (253/10)

| Player | How Out | R |
|---|---|---|
| Omar | ct MS Dhoni b Z Khan | 0 |
| Nafees | ct MS Dhoni b RP Singh | 4 |
| Bashar | ct R Dravid b Z Khan | 5 |

Select | Menu

FIG. 28(h)

| | Tendulkar | |
|---|---|---|
| Rafique | lbw SR Tendulkar | 1 |
| Sharif | not out | 1 |
| Rasel | not out | 1 |

| Player | O | M | R | W | Wide | No |
|---|---|---|---|---|---|---|
| Khan | 8.0 | 1 | 54 | 2 | 0 | 4 |
| Singh | 6.0 | 1 | 28 | 1 | 0 | 0 |
| Sharma | 6.0 | 2 | 30 | 0 | 0 | 1 |

Select | Menu

FIG. 28(i)

| Kumble | 15 | 1 | 72 | 2 | 0 | 4 |
|---|---|---|---|---|---|---|
| Powar | 16 | 4 | 33 | 3 | 1 | 0 |
| Tendulkar | 6.2 | 1 | 35 | 2 | 0 | 0 |

Other Innings
India – 2nd Inning
Bangladesh – 2nd Inning

Select | Menu

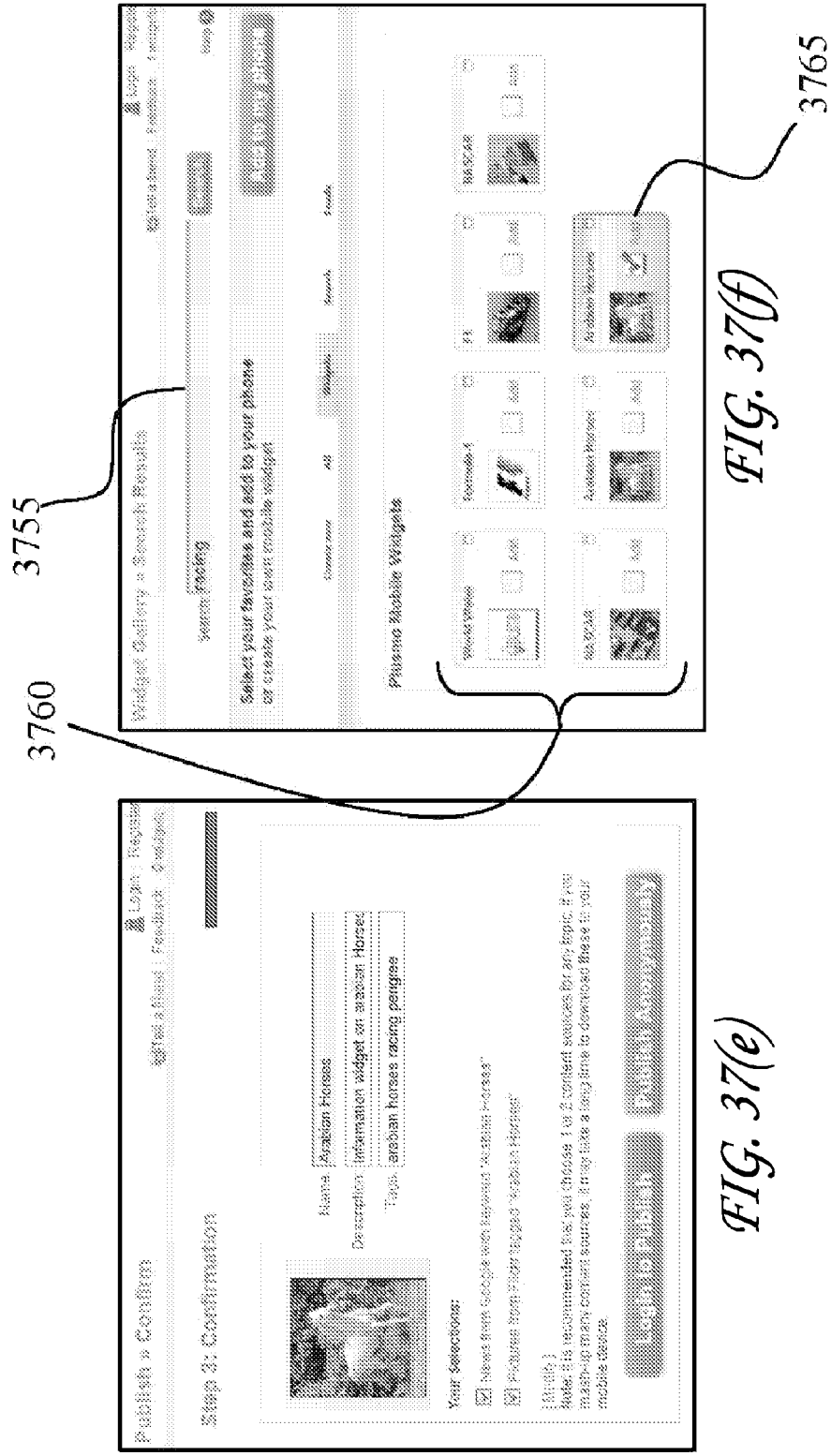

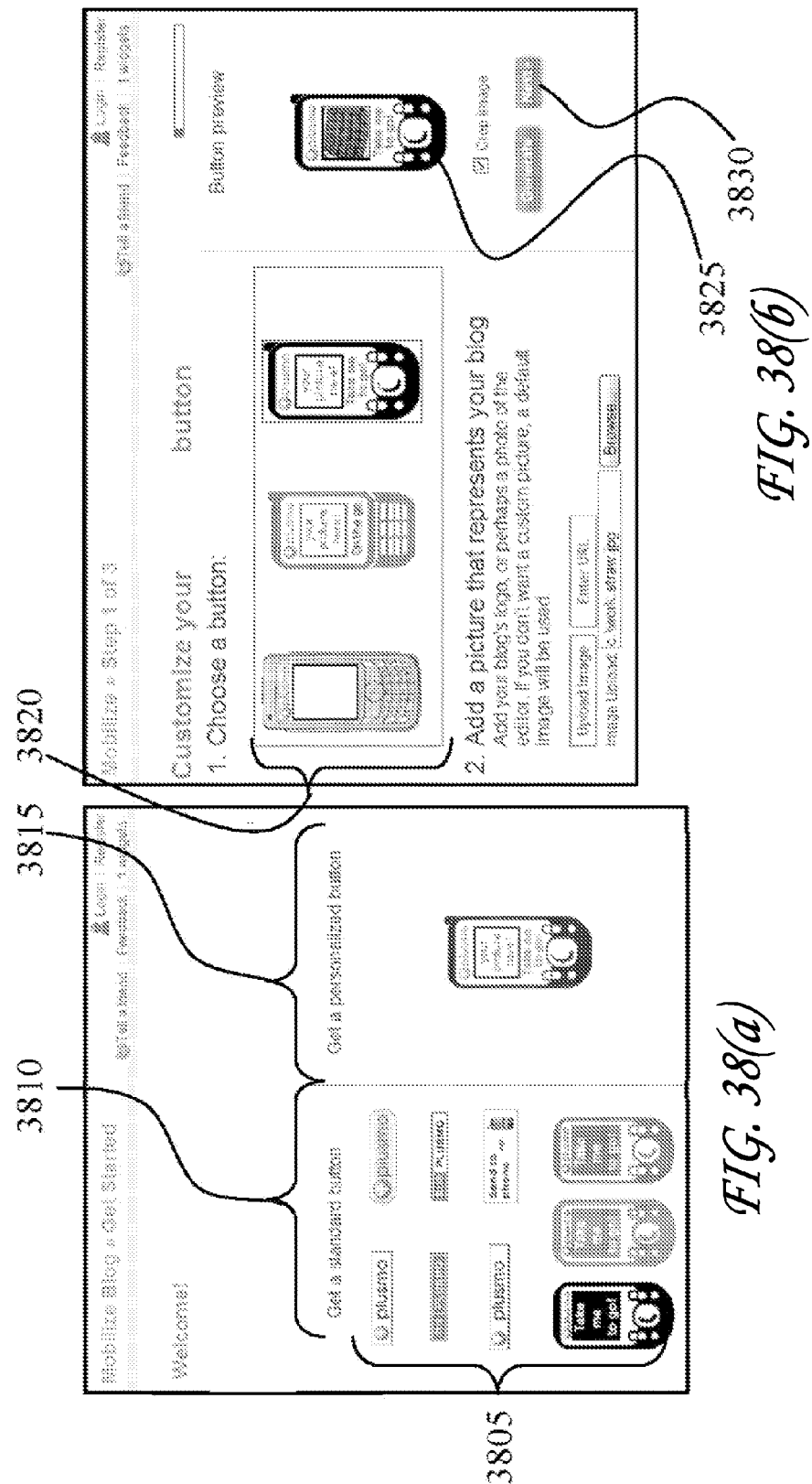

SYSTEM AND METHOD FOR BUILDING AND DELIVERING MOBILE WIDGETS

CROSS-REFERENCE TO RELATED APPLICATIONS

This application claims the benefit of U.S. Provisional Patent Application No. 60/942,406, filed Jun. 6, 2007, the entire content of which is incorporated herein by reference.

BACKGROUND

1. Field

The present disclosure relates to applications and user interfaces for mobile computing devices, and particularly to methods and systems for creating, publishing, sharing, and delivering mobile software applications.

2. Description of the Related Art

Cell phone data usage is on the rise. Phones may support the wireless application protocol (WAP), an international standard for applications that use wireless communication from mobile phones. Mobile data applications include SMS and the WAP browser, an Internet browser for accessing mobile web sites. Interactive and specialized kinds of applications are also in use.

Mobile usage patterns are different from desktop usage. Users may be on the move, in a movie line, on public transportation, or in a coffee shop and may have very short attention spans and may be in situations where it is very hard to type. Such a user may launch the browser and waits for the results. By the time the results are delivered to the mobile device, the user may have moved on to another task.

Further, mobile devices may have diverse non-standard feature sets and user interfaces. Phone manufacturer has a different way of presenting the user interface on the mobile device. Menus may be unique to a particular device, and users may have to learn where the application modules are and how to perform device setup. At any given time, there may be multiple mobile models supported by multiple mobile operators with diverse physical layouts, including QWERTY keyboards, keypads, thumb wheels, joy sticks, styluses, roller balls, etc.

SUMMARY

A system is provided for executing a widget application installed on a mobile device, including a declaratory markup language renderer for rendering a declaratory markup language component of a widget application on a display of the mobile device, a compiled programming language execution engine for executing a compiled programming language component of a widget application installed on the mobile device, a mobile device API, adapted to be accessible to a widget application, and providing access to a device service API of the mobile device, and a widget manager configured to automatically download widget applications or descriptions of widget applications from a network location to the mobile device, without receiving user instructions for said widget applications.

Software is provided which includes a plurality of different widget-executing engines for executing software widget applications installed on a plurality of different types of mobile devices, where each of the mobile device types is adapted to run software applications written in a programming language that is distinct from programming languages supported by the other mobile device types, and all of the widget-executing engines provide a common application programming interface for the widget applications to access a common device capability of the mobile devices.

A method for executing a widget software application is provided. The method includes rendering a declaratory markup language component of the widget application, executing a compiled programming language component of the widget application, and automatically downloading widget applications or descriptions of widget applications from a network location to the mobile device without receiving user instructions for said widget applications. Executing the compiled programming language component includes making available to the widget application an API to access a device service of the mobile device.

A software widget application is provided and configured for installation and execution on a mobile device. The application includes code written in a declaratory markup language and code written in a programming language, where the code written in a scripting language contains a call to an API accessing a device service of the mobile device.

An application is provided including a software widget configured, when compiled, to be installed and run on a plurality of different mobile devices, each device having an operating system that runs software applications written in a programming language that is different than programming languages supported by the operating systems of the other devices, wherein the devices have a common device service, the devices having different device services APIs for accessing the device service, the widget being configured to access the device service only through a single API distinct from each of the device services APIs.

A method for creating a mobile software widget application is provided. The method includes accessing a first section of code written in a declaratory markup language, accessing a second section of code written in a programming language, compiling the second section of code to produce a compiled section, packaging the first section of code and the compiled section to produce a mobile widget application configured to be installed onto a mobile computing device so that a user of the device can repeatedly select, run, and terminate the widget application.

A widget application distribution system is provided. The system includes a server adapted to transmit a software widget application to a plurality of mobile devices of different types for installation thereupon, wherein each mobile device type includes a distinct API to a mobile device service that is common to all of the mobile device types, a software widget application stored on the server, the widget application comprising a first component including programming language code and a second component including declaratory markup language. The widget application is configured to utilize the mobile device service without directly accessing any of the distinct APIs.

A widget application distribution system is provided, where the system includes a server having gallery of widget software applications, the server configured to allow users of mobile computing devices to browse the gallery of widget applications from the mobile devices, each of the widget applications configured to be installed onto one of the mobile devices, the server configured to receive requests for downloading selected ones of the widget applications from the mobile devices, the server configured to respond to a request to download a widget application by electronically sending the widget application to be downloaded and installed to the mobile device that sent the request to the server.

A method for synchronizing information with a mobile device is provided, including maintaining a first version of the information on an electronic storage, the information comprising one or more of (1) widget software applications configured to be installed onto the mobile device and repeatedly selected, run, and terminated, (2) network content used by widget applications, and (3) logged data related to activities of widget applications, receiving a synchronization request from a mobile device having a second version of the information, the synchronization request including a mobile timestamp and mobile identifier related to the information, the mobile timestamp indicating a time at which the second version of the information was last updated, and comparing the mobile timestamp to a local timestamp and local identifier stored in the storage, the local timestamp indicating a time at which the first version of the information on the storage was last updated, and determining, based on the timestamps and identifiers, whether the information has been changed on the mobile device, the storage, or both since a previous synchronization request.

A system for synchronizing information between a server and a mobile device is provided. The system includes a server comprising a server data store and a conflict resolver, the server data store being configured to store a version of the information, the information comprising one or more of (1) widget software applications configured to be installed onto the mobile device and repeatedly selected, run, and terminated, (2) network content used by widget applications, and (3) logged data related to activities of widget applications, and a mobile device comprising a synchronization engine and a mobile data store, the mobile data store being configured to store a version of the information, the mobile device configured to transmit synchronization requests to the server, each synchronization request comprising a mobile timestamp related to the version of the information on the mobile data store. The server is configured to respond to the synchronization request by comparing the mobile timestamp to a local timestamp stored in the server data store, the local timestamp indicating a time at which the version of the information on the server data store was last updated, the server further configured to determine, based on the timestamps, whether the information has been changed on the mobile data store, the server data store, or both since a previous synchronization request by the mobile device.

A mobile device including a memory, a display, and engine that executes a compiled software widget application installed on the mobile device is provided. The widget application requests network content without receiving a specific request for said content from a user of the mobile device. The device is configured to download the network content at the request of the widget application, without immediately displaying the downloaded content on the display, the device being configured to store the downloaded network content in the memory so that it is available for later use by the widget application in the absence of a network connection.

A mobile device including a widget execution engine and a software widget application installed on the device and configured to be executed by the widget execution engine is provided. The widget application is configured to receive a user instruction to request a first content datum from a network location, the widget application is also configured to respond to the user instruction by initiating the downloading of the first content datum from the network location to the device, and the widget application is further configured to initiate the downloading of a second content datum from the network location to the device without receiving a user instruction to download the second content datum.

A mobile device is provided. The mobile device includes a location identification module configured to determine a location of the device, and a software widget application installed on the device, the widget application configured to obtain a location of the device from the location identification module, the widget application configured to request network content customized to the location of the device.

A method for providing localized content on a mobile device is provided. The method includes causing a widget software application to access a location identification service to determine a present location of the mobile device, the widget software application being installed on the mobile device and being configured to be repeatedly selected, run, and terminated by a user of the mobile device, causing the widget application to select content to be transmitted to the mobile device based in part upon the present location of the mobile device, and causing the content to be transmitted to the mobile device.

A computer-implemented method of receiving a widget application for a mobile device is provided. The method includes running a widget execution engine on a mobile device, causing the widget execution engine to conduct diagnostic tests on the device, where the diagnostic tests are adapted to test for capabilities of the device, sending results of the diagnostic tests to a server, and receiving a software widget application from the server where the widget application being selected based on the results of the diagnostic tests.

A computer-implemented method of selecting widget applications for installation and execution on a mobile device is provided. The method includes receiving results of diagnostic tests run on a mobile device by a widget execution engine running on the device, selecting one or more software widget applications based on the results, and sending the selected one or more widget applications to the device for installation.

A widget execution engine for running widget software applications on a mobile device is provided. The engine includes a diagnostic testing module configured to run diagnostic tests on the device, the diagnostic tests adapted to test for capabilities of the device, the engine configured to send results of the diagnostic tests to a server, the engine configured to install software widget applications received from the server.

A mobile device included a virtual machine that executes compiled widgets, wherein a code segment footprint of the virtual machine is less than 10,000 bytes is provided.

A widget execution engine, adapted to run on a mobile device and configured to execute compiled widgets, included a virtual machine with a code segment footprint of less than 10,000 bytes, the virtual machine being represented in computer storage, is provided.

BRIEF DESCRIPTION OF THE DRAWINGS

Many of the advantages and aspects of the present disclosure will become more readily appreciated as the same become better understood by reference to the following detailed description, when taken in conjunction with the accompanying figures illustrating some embodiments of the disclosure, wherein:

FIGS. 4(a) and 4(b) illustrate schematic diagrams of the widget service and the widget client, respectively.

FIGS. 5(a) through 5(d) show exemplary elements for a user to register from the Web.

FIGS. 20(a) through 20(h) are exemplary displays of the mobile registration process according to embodiments.

FIGS. 22(a) through 22(f) are exemplary displays of widget displays according to embodiments.

FIGS. 24(a) and 24(b) are exemplary displays of a weather widget according to embodiments.

FIGS. 25(a) through 25(e) are exemplary displays of a comics widget according to embodiments.

FIGS. 28(a) through 28(i) are exemplary displays of sports widgets.

FIGS. 37(a) to 37(f) show exemplary web user interface displays that a user may be presented with to create a mobile widget non-programmatically according to embodiments.

FIGS. 38(a) to 38(e) show exemplary web user interface displays that a content author may be presented with to create a mobile widget non-programmatically according to embodiments.

Figure 1A:
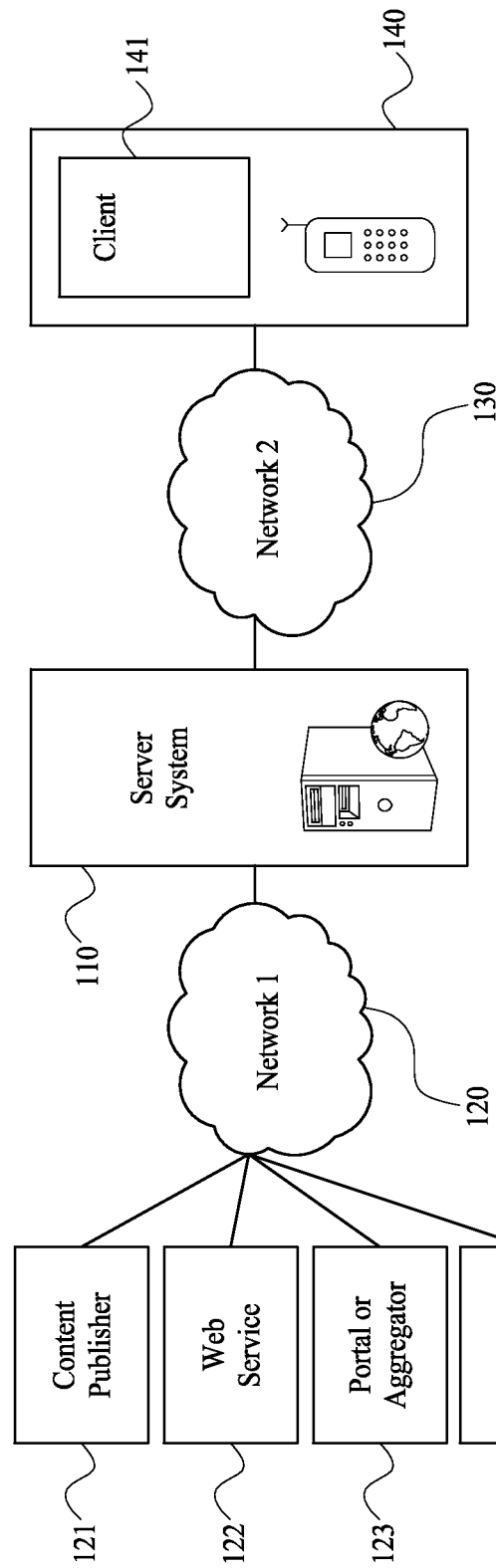
FIG. 1(a) illustrates a schematic diagram of a wireless system for providing a mobile widget service.

In figures showing multiple components, nothing herein is meant to imply that all of such components are required, and certain embodiments may include only a subset of the components or modules depicted in any one or more figures. Likewise, with respect to figures showing method elements, nothing herein is meant to imply that all the elements illustrated in any one or more of such figures are required, and certain embodiments may include only a subset of the elements shown in any one or more figures.

DETAILED DESCRIPTION

In one embodiment, methods and systems are provided for creating, publishing, sharing, and delivering mobile software applications called "mobile widgets" while maintaining device independence across hundreds of disparate mobile devices. The term "widget" may be interchangeably used with other similar terms, such as "module," "application," or "program."

Overview

Many mobile devices, such as cellular phones and PDAs, have a browser to browse the Internet. But the end-user experience may be poor, resulting in single digit mobile adoption rates even for essential web services like email and weather. Tasks that may be simple on a desktop computer can turn out to be complex chores when performed on a mobile phone. For example, on a desktop machine, getting the weather forecast for the day may require only for the user to type "new york weather" on a search engine and see the results. On a mobile phone, however, users may need to first find the web browser, which may be hidden in a menu, then users may laboriously type the URL on a little keypad, wait for the browser to connect, possibly deal with mal-formatted content pages, and then try to use the web site. Normal users may not have the patience or attention span to perform so many steps just to get the weather or the current sports score.

Mobile widgets can offer an enhanced user experience for similar web services. The architecture may include server-side technology, device-agnostic client-side technology, and publishing technology for widget creation. Some embodiments of the architecture may allow relevant information to be made available on the mobile terminal for when users glance at the phone.

The system and techniques presented here may include server-side architecture for authoring, hosting, and delivering the widgets and mobile content, a mobile client-side platform to run the widgets and render content, a framework for developing and publishing the widgets, and a system for measuring mobile widget usage.

A mobile terminal may refer to a mobile computing device, including, but not limited to, wirelessly connectible PDAs, mobile phones, handheld pads, 2-way pagers, voice recognition terminals, and portable computers with wireless connection capability. Other similar names used for a mobile terminal include handheld device, client device, cellular phone, mobile phone, or, more commonly, phone.

A mobile widget may refer to a mobile software application that runs on a mobile device and may perform a specific task. As an example, consider a weather forecast mobile widget that displays the forecast graphically for a specific city, or a cartoon reader that formats a cartoon strip so that it is easily readable on a mobile phone. Of course, widgets may have more or less functionality and may be adapted to perform multiple tasks.

The widget service client software may refer to a software application that runs on a terminal device and is capable of hosting and running mobile widgets. Other names used for this module are client software or, more commonly, client. The widget service server system may be an embodiment of the basic server-side architecture configured to author, host and deliver the mobile widget service.

Illustrative Operating Environment

FIG. 1(a) is a schematic diagram of a wireless system for providing mobile widgets according to one embodiment. In other embodiments, not all of the illustrated components may be required, and variations in the arrangement and type of the components may be made.

As shown in FIG. 1(a), the environment may include the widget service server system 110, a first network 120 (e.g., the internet), a second network 130 (e.g., a wireless network), the widget service client 140 and various content sources such as content publishers 121, web services 122, web portals 123 and other web sites 124.

The client device 140 may include mobile computing devices capable of sending and receiving data over a network 130. Such devices may include mobile terminals that connect via a cellular network, Wi-Fi network, and the like, such as connected PDAs, cellular phones, smart phones, Blackberry devices, Windows PocketPC and Smartphone devices, and wireless gaming devices such as PSP, Nintendo DS, or any other device that is equipped to communicate over a wireless communication medium. Mobile devices 140 may include storage, memory, displays, operating systems, additional software such as email, calendar, PIM, and phone-specific features.

Relative to non-mobile devices, the mobile client device 140 may have slower transmission rates, may exhibit a network latency, may have a smaller screen, may have different or limited user entry mechanisms such as soft keys, key pads, or thumb wheels, and may not have a full keyboard. Client devices 140 may be further configured with a built-in browser application that supports receiving and display of markup languages such as Wireless Markup Language (WML), WMLScript, JavaScript, and Hypertext Markup Language (HTML), to display text, graphics or multimedia. Further, client devices 140 may run mobile operating systems such as Symbian OS, Mobile Linux, Windows Mobile, RIM Blackberry, and Palm OS. The operating systems may provide a virtual machine such as a Java Virtual machine (JVM) or BREW. Client devices 140 may further be configured to support download and installation of new applications and functionality. Mobile client devices 140 may have several additional components such as GPS, camera, multiple networks, and the like.

The widget service server system 110 may contain one or more server systems and may be configured to communicate with client devices 140 and to respond accordingly. The server system 110 may communicate with a wide area network such as the Internet, a cellular telephone network, or a local area network. As an example, the widget service client software running on the client device 140 may communicate with the widget service server system 110 to receive information about the widgets. The widget service server system 110 may also be capable of communicating with various content sources and services on the Internet such as search engines, web services, XML repositories, relational databases, structured markup content sites, content-aggregators (portals), and the like. The widget service server system 110 may also host online tools to develop and deploy widgets. It may also provide application interfaces to develop and deploy mobile widgets.

Figure 1B:
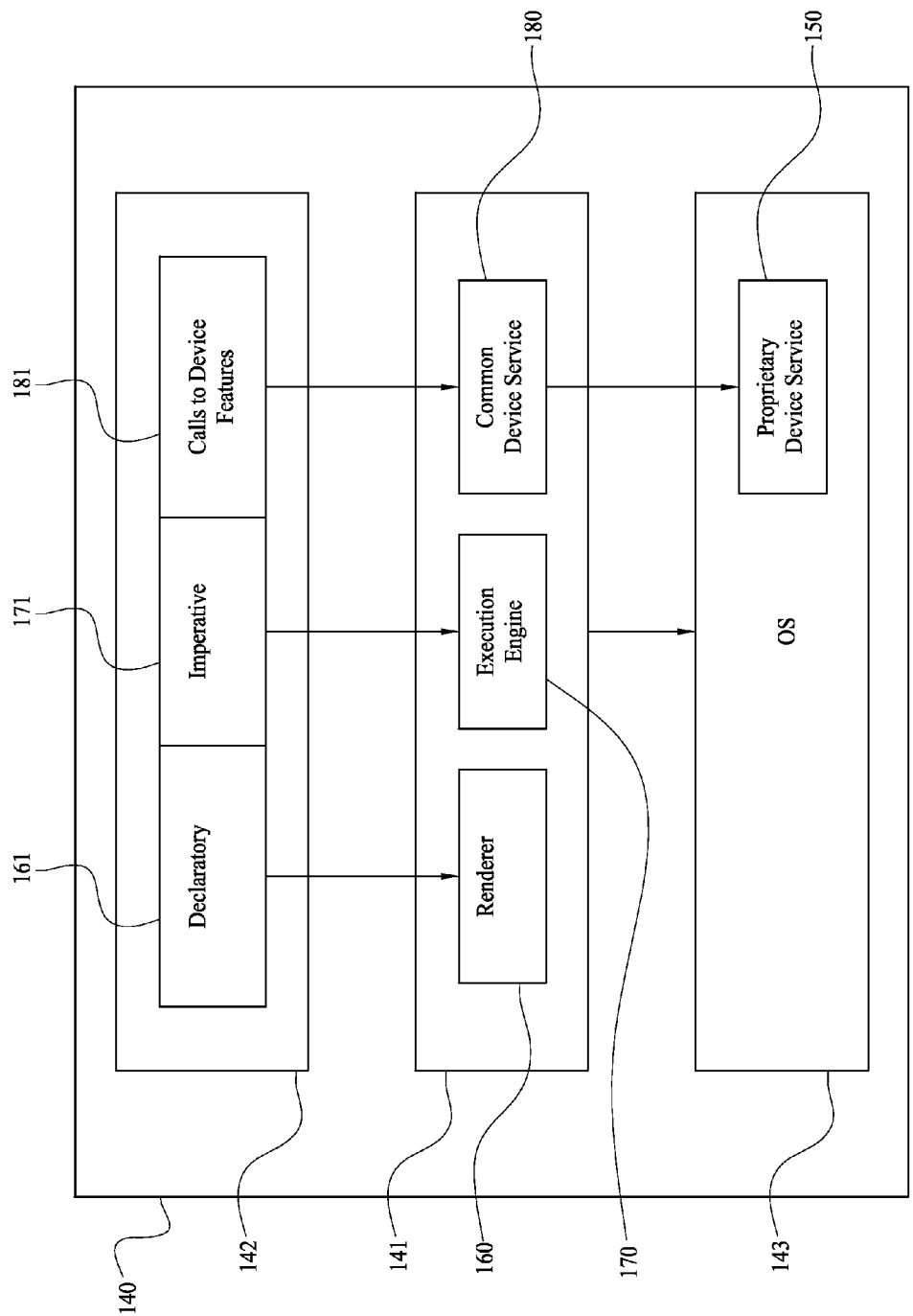
FIG. 1(b) illustrates a mobile device with a widget service client application installed thereon.

With reference to FIG. 1(b), in some embodiments, the client device 140 may include a widget service client 141. The widget service client 141 may be a software program that runs on the mobile computing device 140 and communicates with the widget service server system 110 over wireless networks and wire line networks using standard networking protocols such as Wireless Application Protocol (WAP), Transmission Control Protocol/Internet Protocol (TCP/IP), and the like. The widget service client 141 may be able to run widgets 142 on the client device 140. Users may have a personalized set of widgets 142 that they choose to install and use on the widget client 140.

In another embodiment of the operating environment, the mobile computing device 140 may not support or allow the download or installation of a software such as the widget service client 141. In such a case, if the mobile computing device 140 is equipped with a built-in browser, the widget service server system 110 may be able to offer widgets via, e.g., a built-in browser on the mobile device 140.

The widget service server system 110 may provide tools, programming interfaces, or hosting infrastructure ("wizards") for the creation or publishing of mobile widgets. As an example, the wizards enable non-programmatic ways of creating device-independent mobile widgets for content publishers. Furthermore, programming interfaces may allow developers and those skilled in the art to build new kinds of mobile widgets in a device-independent way.

Figure 2:
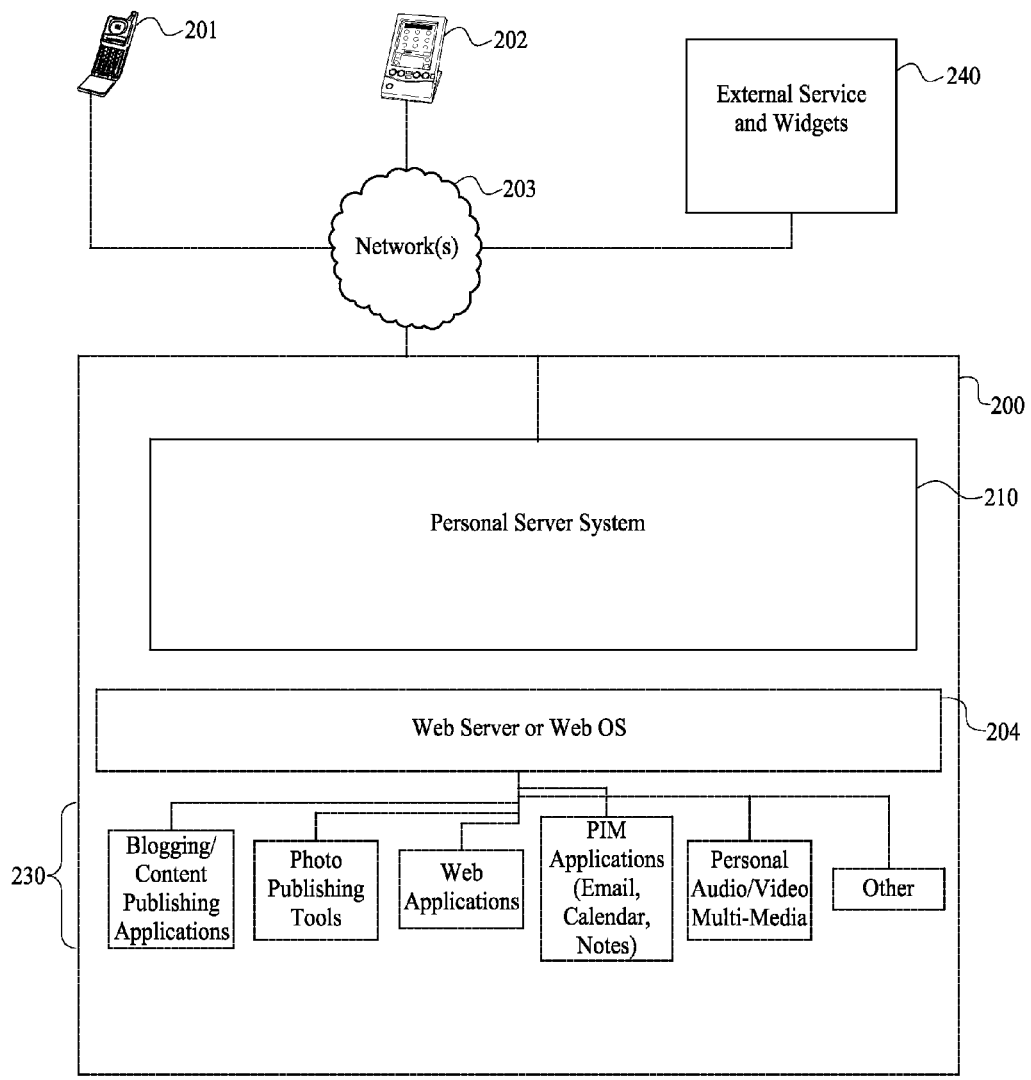
FIG. 2 illustrates a schematic diagram of a personal computing device or personal desktop system providing a mobile widget service.

Another embodiment of the widget service system is illustrated in FIG. 2. In this embodiment, an individual user or publisher may download a personal version of the widget service server 210 and install it on a local computer server 200. The personal widget service server 210 and accompanying tools may interface with services on the local computer server 200 where the user may create personal widgets from local data sources and share it with friends and family. The data for these local widgets may come from personal/local applications 230 such as email, calendar, photos, personal media, etc., and may be accessed via a personal web server or operating system 204. Here the data may reside on the user system 200 instead of public widget service servers 240. Users who use the personal widget service server 210 may also be able to syndicate other widgets from the public widget service 240. A web server or web operating system can be provided to enable the server 210. It will be understood that mobile devices 201, 202 can receive widgets from the server 210 via networks 203.

Mobile Widgets

Figure 3:
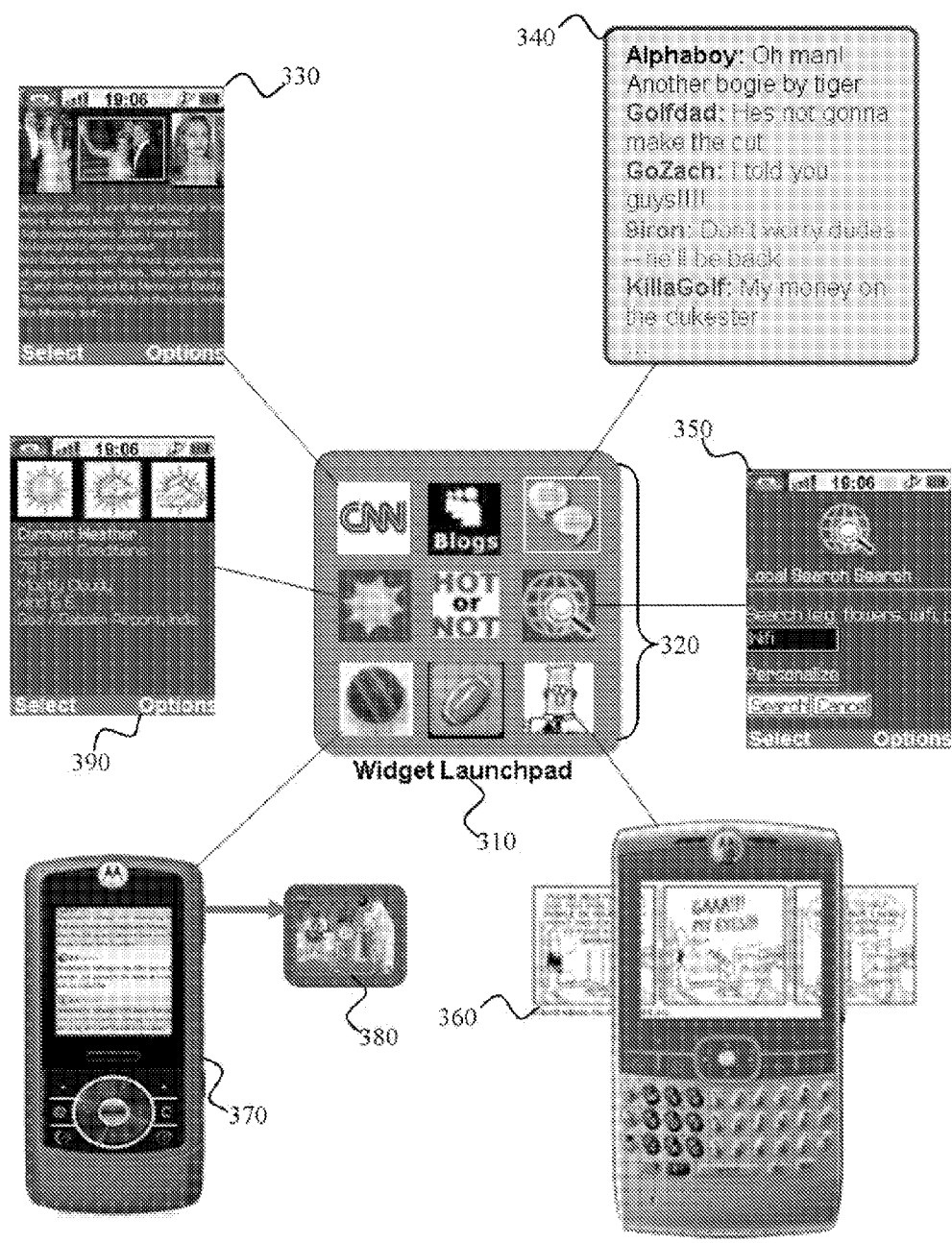
FIG. 3 is an illustration of various types of mobile widgets.

As recited earlier, a mobile widget may include a mobile software application, which may run on a mobile computing device 140 and may offer a user experience to perform a task. FIG. 3 shows an exemplary mobile widget launchpad 310 with several widgets 320 installed. The widgets 320 are represented by the grid of icons in the center of the figure. As depicted, each widget 320 may have a completely different user interface and behavior. As examples, in this diagram we illustrate a mobile widget that displays the news in pictures 330, another one that displays a chat session 340, another one that represents a local search query 350, another one for viewing comic strips in a slider 360, a livecast widget 370 that displays play-by-play updates with video 380 for a live cricket game, and a weather widget 390. Many other types of widgets 320 may be created and delivered in this embodiment. A mobile widget 320 could be an encapsulated version of a web site, a portion of a web site, a mobile web (WAP) site, an HTML page, an RSS feed, an ATOM feed, a webcam feed, a video or audio feed, or any other data source. The widget 320 may offer a mobile friendly version of the functionality offered by these original data sources.

In one embodiment, a widget may display a golf leaderboard in a mobile computing device. The widget may offer the information so that it is well-formatted and easily viewable on a specific mobile device. Furthermore, the leaderboard may be automatically updated every few minutes without the user having to hit a refresh control. The information may be pre-fetched so that the user does not have to experience the network latency typical of mobile data networks. The widget may automatically display a particular golf shot via video. The widget may overlay a golf ball's path over a picture of a golf hole. These features, when used in conjunction with each other, improve the end-users' experience significantly because very specific information is available at a glance.

In another embodiment, a widget may show traffic information for a user's afternoon commute. The mobile widget could be configured to update every 30 minutes with the latest traffic information from a specific web data source, personalized to the user's home location and update a status image to a red light or green light based on whether there is a traffic incident or not. The user would be able to receive the information at a glance without having to go through tedious steps to get the traffic information from a mobile web browser. In this embodiment, the information may be periodically pushed to the widget, rather than pulled by a user using the web browser.

In another embodiment, a widget may be a mobile display of personal media. For example, a user could carry her favorite family photographs in a mobile slideshow widget. Widgets like these may include simple to-do lists, music playlists with links to the media, video playlists, person-to-person greetings, and the like. In many cases, may be possible to construct the widget's user interface in a unique or simple way so that it is easy to use by the end-user.

In another embodiment, a widget may use special functions or device services of the mobile computing device, such as a voice recorder, a camera, or a video recorder. As an example, a mobile widget may allow a user to record a voice note and upload it to another user or web site. In another embodiment, a widget may be related to communication. Widgets may offer access to Instant Messaging, Voice Over IP (VOIP) call-bridging, and chat rooms.

The foregoing embodiments provide several examples of mobile widgets supported by this disclosure. However, other types and configurations of mobile widgets apparent to those skilled in the art may also be created, published, and used in the system of the embodiments described above.

There are many ways in which users may discover mobile widgets, such as through affiliate sites like web logs (blogs), online content brands, or aggregators where mobile widgets are featured. In some instances, users may receive an invitation from a friend or users may hear of the widget service and access the widget service's website or mobile sites. In any of these potential use cases, users may be allowed to preview and pick various widgets and then register to receive mobile widgets on their mobile phones. After registration, users mobile phones may be provisioned with the widget service client software via a text message or email. Users may then manage their own widget sets from the widget service mobile client software or from the widget service web front end. Users may program the widgets as to how often data should be downloaded, how much data should be downloaded, and the like. Users may use search capabilities on the device to add more widgets or invite other friends to use widgets.

Widgets may include multiple components, some of which may be executed or rendered on the mobile device. When executed or rendered, widgets may access a common device API provided by the client, and may access a feature of the mobile device, without necessarily accessing any of the distinct APIs native to the mobile devices.

Widget Installation

Once a widget is created, it may be uploaded to the server 110 for storage and indexing. The server 110 may store the widget in a database. In one embodiment, the widget's manifest may also be read to obtain the widget name, description, tags assigned to the widget, creation time, author, version, and other attributes. These attributes may be indexed by the search engine so that the widget can be searched by end-users to be added to their accounts.

In an embodiment, users may either browse a catalog (gallery) of widgets or they may search for a particular widget. Once found, the user may add the widget to their account using the user interface. When a widget is added to a user account, an entry may be created in the database that references a widget and applies to the user account. A user account may be specified when a user "logs in" to the system via the web user interface or via the mobile client unique identifier.

By having this entry in the database, the user has effectively added the widget to their account.

Figure 4B:
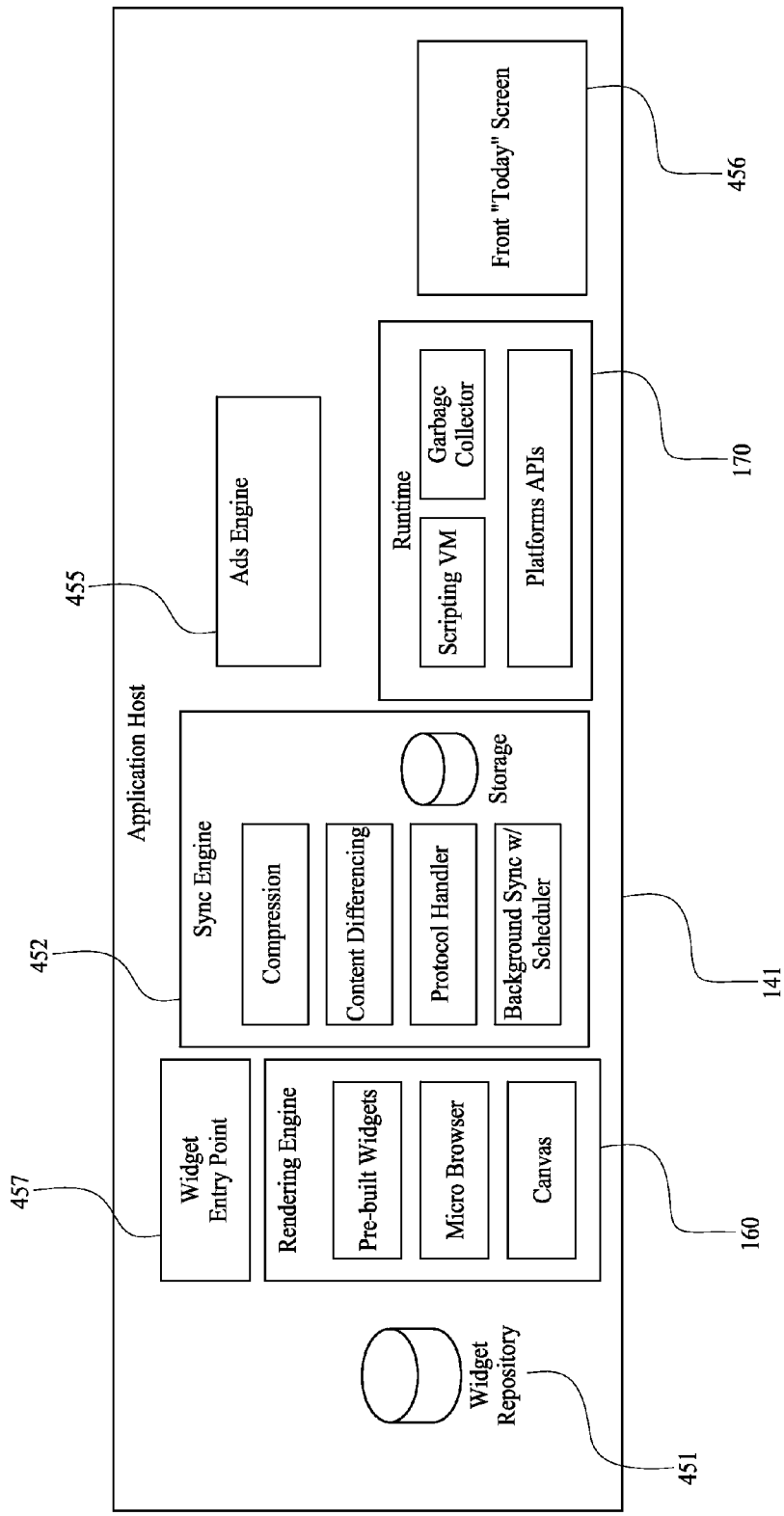

Referring to FIGS. 4(a) and 4(b), the user may synchronize their mobile client with their online account. The client synchronization engines 452 and/or server synchronization engine 408 may detect that a new widget has been added. The widget may be transmitted to the client.

The mobile client 141 may install the widget by unpacking the widget archive. Installation may be handled by an installation component of the client 141, where the installation component is designed to install widgets onto the mobile device 140. Installation may be permanent, persistent, temporary, or of some other definite or indefinite duration. Installation may include unpacking the widget components, installing each, some, or a section of some of the components onto the device. Such installed components may include code, compiled code, images, text, video, multimedia, and so forth. Widget installation may also include decompression of the widget or other processing before installation. The widget may then be registered into the user's views. The user can then interact with the widget. The widget may contain code that retrieves additional data if required. For example, an RSS feed widget may have a server counterpart that fetches feeds and reformats the feeds to the capabilities of the mobile client. This may include resizing images, transcoding the content to simplified HTML, transcoding media types such as video, etc. The widget may then utilize the synchronization engine on the client 452 and the server 408 to transmit data between the systems.

Widget Client System Architecture Overview

FIG. 1(b) illustrates one embodiment of the widget client system 141. The widget client system 141, also referred to as a client framework and widget-execution engine, may be located on a mobile device 140. The mobile device 140 may include an operating system 143. The operating system may provide a device services API 150. The device services API 150 generally refers to an interface to device features, services, and/or capabilities of the mobile device 140. Device services are provide access specialized features of a phone. These features may include a speaker, a GPS device, a microphone, a camera, a videorecorder, a homescreen user interface, a touchscreen, an accelerometer, a transceiver, a raw network connection, a network socket, a software email program, a software calendar, a data store, and a software personal information manager. Device services APIs may also include, but are not limited to, functionality such as getting the device's current location via a device GPS module, accessing spatial orientation data via the device's accelerometer, capturing pictures, audio and video, displaying content on a home screen of the device, interfacing with device applications such as an address book and calendar to perform actions such as send mail, accessing SMS, Instant Message, or phone call or data transmission functionality, accessing device battery levels, controlling display brightness levels, vibrating the device, and use the speaker to output sound. Device services APIs may further include an API for allowing a software application on a mobile device to send data to another software application on the mobile device, display customized content within a mobile device screen saver, display content on a secondary physical display screen, generate a popup notification, access a mobile device ID, access and/or display area maps on a mobile device display, access wireless signal strength information, and so forth. A device API may further include an API for monitoring an event (e.g., receipt of a text message, receipt of an email, receipt of a phone call, or activation of an alarm) and an API for executing, waking, or launching a widget application in response to the event.

So, for example, the operating system 143 may provide a proprietary API 150 to allow authorized applications running on the device to access one of the specialized features of the device. The API may include calls to open the camera shutter, close the shutter, and save the image to a storage location. Various mobile devices 140 provide different features, functionality, and services, so the operating systems (which run on the devices) will provide various device services APIs 150. Additionally, various operating systems 143 may provide a different device services APIs for the same feature. Thus, a program written for one device and operating system may not be able to run on another device or operating system.

The client widget engine 141 may run on top of the operating system 143. Alternatively, the widget engine 141 may be a component or constituent of the operating system 143. The engine may provide functionality for widgets 142 to be executed on the mobile device 140. The widget engine 141 may typically provide a renderer 160, an execution engine 170, and a common device services API 180.

In turn, a widget 142 to be executed on the widget engine 141 may contain, among others, a declaratory language component 161 (e.g., a declaratory markup language such as HTML) and an imperative language component 171 (e.g., a scripting programming language such as JavaScript). The declaratory language component 161 may be rendered or otherwise executed by the renderer 160 or the widget engine 141. The imperative language component 171 may be executed by the execution engine 171. The imperative language component 171 may also contain code calls 181 to device services and features. These calls may be to the common device services API 180 provided by the widget engine 141.

FIG. 4(b) depicts another embodiment of the widget client framework 141 comprising additional components. In some embodiments, the components may run on an application host. Components and their respective functions may include:

- A widget repository 451 may provide storage for widgets
- A synchronization engine 452 may synchronize data between the client and the server.
- A rendering engine 160 may include a mobile browser canvas and/or a vector graphics engine.
- An execution engine 170 may execute runnable code. It may include a virtual machine.
- An advertisement engine 455 may provide offline delivery and display of advertisements
- A home screen 456 may provide an idle screen for displaying summaries of widgets.
- A widget entry point 457 may provide the ability for widgets to be downloaded and installed. Widget discovery may provide for automatic download of widget application or descriptions, and may take place in the absence of user instruction.
- A widget permissions engine may control and monitor the execution of the widget, or components of the widget, such as JavaScript, and may preclude a widget from accessing unauthorized functionality of the device. Malicious or other widgets may be terminated or otherwise be caused to cease execution by the widget permissions engine, if, for example, the widget permissions engine detects that the widget has attempted to access unauthorized functionality of the device. The permissions engine may also modify the widget, such as by adding additional permissions restrictions and by utilizing personalization or marking (such as by adding warning banners to widget displays). The engine may prompt the user for instructions.

A data access management component may be configured to allow a widget application (or other component of the mobile client) to write data (including program data, content, prefetched data, and so forth) to a storage location. This location may be inaccessible to other widget applications and software programs installed on the mobile device. Alternatively, or in addition thereto, the data access management component may also allow a widget application to write data to another storage location that is accessible to other widget applications and software programs installed on the mobile device. The data management component may use any of a variety of other permissions schemes to control access to data stores.

The following sections detail components and functionality of some embodiments of the widget engine 141.

The Rendering Engine

The rendering engine 160 may generally parse and execute a declaratory language. Declaratory languages include markup languages such as XML, HTML, XHTML, and SGML. The language need not be declaratory, and may be functional or imperative. These languages may form components of a widget application.

Figure 33:
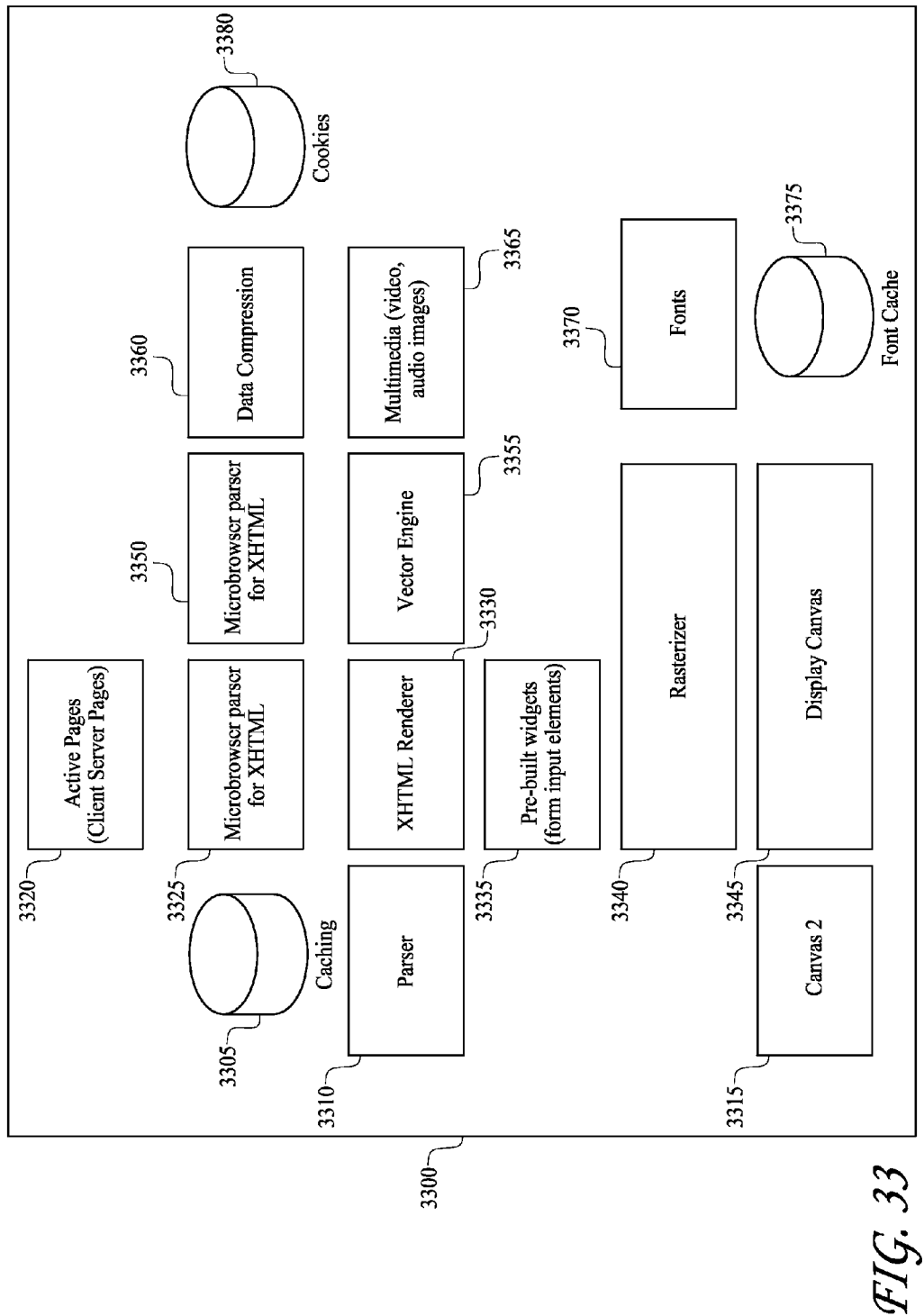
FIG. 33 is a schematic of an execution engine and mobile widget canvas on the widget client.

The rendering engine, also known as a microbrowser, 160 may include a mobile browser canvas 3300. FIG. 33 depicts a schematic diagram of one embodiment of an execution engine and mobile browser canvas 3300. FIG. 33 illustrates, among other elements, a repository of pre-built widgets 3335 and a font rendering engine 3370. According to one embodiment, the mobile browser canvas 3300 provides a canvas for application developers to render user interfaces for applications. This canvas may be a modified XHTML and SVG rendering engine. The canvas may allow application developers to display rich user interfaces. User interfaces may include formatted text and bitmap graphics as well as vector graphics. Embodiments may implement caching 3305 of, for example, rendered elements, a second canvas 3315 for, for example, pre-rendering a second frame for display while keeping a first canvas 3345 active on the display, and active client server pages 3320.

Mobile Browser Canvas Widgets

The following are widgets that application developers may use to display user interfaces. These widgets may be stored in a pre-built widgets repository (FIG. 4(*b*), 451). These widgets may be accessible to widgets executing on the widget engine 141.

Display Widgets

These types of widgets may display information. In some embodiments, users do not interact with these widgets.

Some widgets may display or render bitmap images. The mobile client may have two different versions of an image renderer. The first may be used when a mobile client has more resources. In such a case, there can be simple image manipulation such as bitmap scaling. In more resource constrained devices, image manipulation can be done on the server and sent to the mobile client for display.

Some widgets may display text, possibly with formatting and word wrap. Formatting includes font type (e.g. proportional, fixed width), font style (e.g. bold, italics, underlined), color, size, etc. Text flows on a document with word wrap and may be modified through various formatting commands to flow differently (e.g. center, right justified, flow around images, etc).

Some widgets add a break to separate two objects on two different lines. These widgets may also be rendered as a graphical line on the page (a horizontal rule).

Some widgets may act as a container for any object. This may be a logical container that bounds the text, images, and other objects. An example is a table cell where contents fit within a defined boundary.

Some widgets may display enumerated or bulleted lists. Lists may be indented to show hierarchy.

Some widgets provide for a 2-dimensional table to be displayed in rows and columns.

Some widgets provide a cell within a table that contains any object.

Some widgets provide a reference element that may be in conjunction with hyperlinks to allow for a hyperlink to be traversed to various parts of the same page rather than on different pages.

Interaction Elements

Interaction elements may allow users to interact with the mobile widgets. Interaction may be accomplished by selecting the widget by directional cursor movements, mouse pointer movements, stylus clicks, voice commands, etc. For the mobile client implementation, the system may use well-defined input mechanisms available on mobile devices such as directional cursor movements and stylus pen inputs.

A four-way directional cursor pad may be used to move a selection "cursor" up, down, left, or right (as per cursor pad) to select the elements on a document. In one embodiment, if there are no selectable elements on a page, the document may scroll up or down (depending on the direction the user has selected) until a selectable widget is visible. The system may then select the widget and change its visual indicator to indicate that the user has selected the widget and that this widget can perform some further action based on further user input.

For the user interaction elements, there may be a hidden form widget comprising form-specific elements. In one embodiment, all form-specific elements may have a name assigned to them as well as a value. When the form widget is "submitted", the data contained in the form may be collected, encoded, and sent to a specified URL for further processing. These name and value pairs may then be considered the data.

Figure 35:
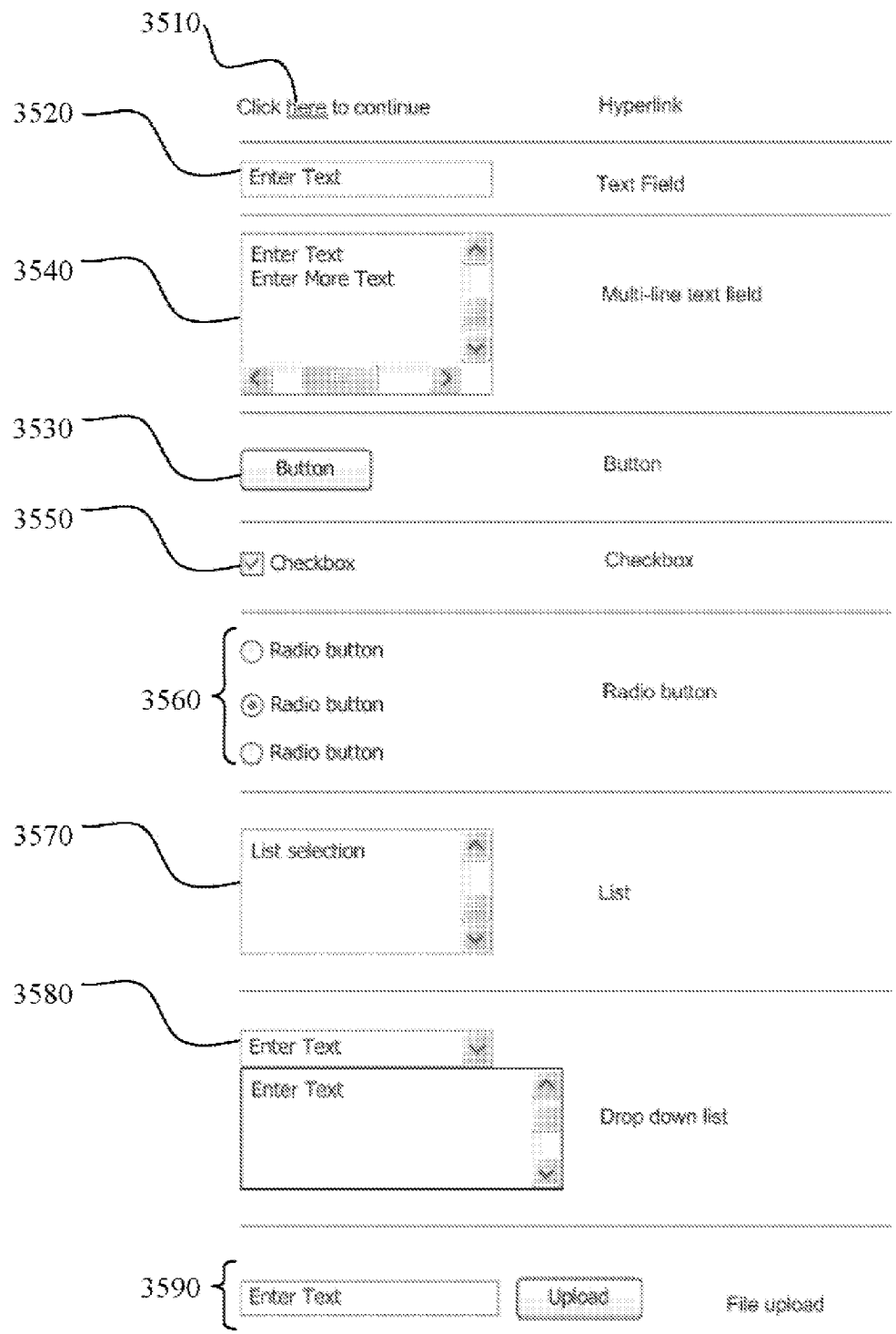
FIG. 35 is an illustration of various types of interactive elements supported by the widget client.

Appendix F lists sample user interaction elements according to an embodiment. FIG. 35 illustrates example interaction elements according to one embodiment (3510-3590), including, for example, hyperlinks (3510), text fields (3520 and 3540), controls (3530), checkboxes (3550), radio controls (3560), list boxes (3570), drop-downs (3580), and file upload controls (3590).

Meta Information Descriptors for Visual Elements on Mobile Client

The elements described above that accept user input can also have optional attributes to provide additional context to the system to apply additional actions that the user can perform. These optional attributes may be specified in the same manner as other attributes on the elements.

According to one embodiment, one such usage of the meta descriptor is the use of automatic form filling with last entry history. A naming convention is used for describe some of the entry fields. For example, "email" is used to describe a user's email address, or "phone-mobile" can be used to describe a user's mobile phone number. When the page renderer encounters such entry fields, it may optionally changes the visual indicator of the element so that the end-user knows the automatic form filling can apply to the fields. The form may then be filled manually by the user (in which case the entries are saved into a storage mechanism which exists locally and/ or remotely on the server). Alternatively, the renderer may display special user interface features when users select the input element. For example, in a text entry field where a meta descriptor is specified, the background color might change to yellow, indicating that this field can be auto-filled. The user selects this field at some point. A popup can then appear, presenting the user with items that the user can choose using any input mechanism. After filling, the result is saved into a history stack so that whenever the renderer encounters the element again, it can present to the user the entered items again.

In addition to the history stack, the meta descriptor values can come from external sources. According to one embodiment, the user may register on the web site. They enter their personal information such as name, address, phone number, etc. This information is transmitted to the client at some point using the synchronization module. The mobile client can then use this data to fill form elements conforming to the naming conventions and implementing the meta descriptor attributes.

The mobile client 141 may contain a parser for languages. Two such parser are described below, but the client 141 may generally parse any programming or rendering language, including XML, XHTML, SVG, other declaratory markup languages in general, as well other languages such as the imperative languages C and Java and the functional language Scheme.

XML Parser

With reference to FIG. 33, the following is one example of an XML-based parser 3325 to render HTML. XML is a text-based document that conforms to certain rules to make machine parsing easier. The parser in this example may be a non-strict version to handle some instances where user-entered XML code might not be compliant (as might be the case with HTML documents). There are several ways to handle non-XML compliant documents. One is to have a relaxed parser. Another is to tidy up the document to be XML compliant before parsing. Both methods are compatible with the present disclosure, but only the first method will be described below.

According to one embodiment, the first element may be lexical analysis whereupon the document is broken up to get the characters. The XML parser may choose not to validate the XML for correctness. For example, when the parser encounters a tag that does not close, it may be closed automatically rather than generate an error. To do this, the engine may provide two stages: A generic XML parsing stage and a semantic information processing stage.

In the generic XML parsing element, the parser parses the input to determine what the next item is. The item may be a tag, end tag (that closes the opening tag), text (exists between the start and end tag), or end of file so that it is known when to stop calling the function. The function may return a constant to specify what the next retrieved type is (e.g. TAG, END_TAG, TEXT, or EOF) so that other functions may be called as appropriate. Appendix E contains pseudocode for some embodiments of the first element of parsing.

The second stage of the parser may grab the XML elements and match against HTML tags. It may keep a stack of tags that are to be closed in a stack. So, for a start tag, it waits for an end tag matching that name to arrive. When we encounter a start tag, we place it on the stack. When we encounter an end tag, we'll match against the start tag at the top of the stack. If it's the same, we'll pop that one off. If it's not the same, we'll keep popping the tags off the stack until we find the matching start tag or until the stack is empty. Similarly, we can handle the following case. A start tag is placed on the stack. Then, another start tag begins that is the same as the start tag on the top of the stack. This should not occur in HTML. So, we pop off the tag on the stack and close both tags.

Parser for XHTML and SVG

The user interface of a widget may be specified using a declarative syntax such as XHTML. It may be provided as a declaratory markup language component of the widget. According to one embodiment, widgets may be based upon XHTML and SVG standards derived from XML documents (see these docs as ref). In this embodiment, the first element is to prepare the user interface for display is to parse the user interface. As mobile devices can be resource constrained, it sometimes may not be possible to parse the user interface on the device due to resource limitations. Hence, some embodiments support several methods to parse and render the user interfaces.

1. Mobile client parses the document. The mobile client contains a parser (for XHTML 3325 and/or SVG 3350) to extract document elements from the source. This may be available for mobile devices that have more resources to run through computationally intensive parsing steps.
2. Server parses the document. If the client does not contain enough CPU/resources to parse and compute, computations may be done on the server. The client may make a request through a special server proxy. The client engine may transmit capabilities (e.g. display sizes, font sizes, client type). The server may compute X and Y coordinates and dimensions of elements and transmit to the client in a compact format that is simpler to parse. The client may rebuild the data structures and render the data.
3. Server modifies the document for the capabilities of the client (also known as transcoding). The client may contain a simplified parser. For certain widget user interfaces, the transcoding service on the server may break down the user interface into simpler elements that the client can parse. For example, HTML tables can be pre-computed into X and Y coordinates as well as bounds to transmit to the client while text formatting can be parsed on the client. CSS (reference to CSS) can also be applied on the server.

To support more scalable clients, an API may be made available for capabilities discovery. Examples include ability to do bitmap image scaling, supported multimedia objects 3365, supported input events, multiple screens, etc.

Vector Graphics

In some embodiments, within the renderer or mobile browser canvas 3300, application developers may specify a block of the canvas 3300 to display vector based graphics. A component of the mobile client 141, or the renderer 3330, may include a vector graphics display unit or engine 3355. According to one embodiment, this is demarcated by the <svg> tag. Attributes it can take are width and height of the vector graphics area.

Various objects can be placed into the canvas. These may include the following objects:

Rectangle—Includes and upper left x-y coordinate and a width and height.
Circle—Includes an x-y coordinate for the center of the circle and a radius.
Ellipse—Includes an x-y coordinate for the center and a horizontal radius and vertical radius.
Line—Draws a line between two coordinates.
Polyline—Draws a series of lines between points.
Polygon—Draws a polygon between points and closes the lines.
Path—Draws a complex path with the following commands.
M—move to an x-y coordinate
L—line to an x-y coordinate C—cubic Bezier specified by 4 control points
Q—quadratic Bezier specified by 3 control points
Z—close the path
Text—Draws text using a vector-based font 3370 at a specified x-y coordinate. The font may be stored in a font cache 3375.
Images—Draws raster images.

The objects can take on various attributes to affect rendering. Some attributes include: color, fill color, font family, font size, font style.

Transformations

Transformations may be applied to the objects. These may include translation, rotation, and scaling, and skewing. In some embodiments, only the first three, or some other subset, of the transformations may be implemented. The transformations may use matrix notion of linear algebra as follows:

Translation and Scaling Matrix:

| [scale | 0 | translateX | ] |
| [0 | scale | translateY | ] |
| [0 | 0 | 1 | ] |

2D Rotation Matrix:

| [cos(angle) | -sin(angle) | 0] |
| [sin(angle) | cos(angle) | 0] |
| [0 | 0 | 1] |

Rendering

The renderer and/or mobile browser canvas 3300 may render the object primitives on a raster graphics display unit 3340. A mobile device may expose APIs to allocate and use a block of memory to represent the graphics display. This block of memory can represent screen pixels by the following equation:

$$\text{mem\_offset} = x + y * \text{screen width}$$

Lines and curves that are represented by geometric equations may be optimized for rendering on a pixel-by-pixel case according to the following equations.

Lines

Lines may be rendered on a raster graphics display canvas using J. E. Bresenham's line drawing algorithm ("Algorithm for Computer Control of a Digital Plotter"). It describes an method of line drawing by using an error value that is accumulated as lines are traversed.

Circles and Ellipses

Circles and ellipses can be rendered on a raster canvas using a variant of Bresenham's line drawing algorithm as described by J. R. Van Aken "An Efficient Ellipse Drawing Algorithm".

Bezier Curves

The quadratic Bezier curve is described by the following parametric equation. Given points P0, P1, and P2:

$$B(t) = (1-t)2P0 + 2t(1-t)P1 + t2P2, t \in [0,1]$$

The cubic Bezier curve is described by the following parametric equation. Given points P0, P1, P2, and P3:

$$B(t) = P0(1-t)3 + 3P1t(1-t)2 + 3P2t2(1-t) + P3t3, t \in [0,1]$$

An approximation to a raster canvas may be made by breaking up the curve into several line segments (e.g. 16 segments). These line segments can be rendered individually using the Bresenham algorithm for line raster rendering.

Computation for the points on the segments can also be made by breaking down the equations. For example, one can solve for (1−t) in the equations above. One can also assume that at the beginning of the curve t=0 and at the end of the curve t=1.

The Execution Engine

Widgets may contain sections or components of general programming language code. Such code may increase the expressive power available to widget designers relative to widgets containing declarative (e.g. HTML) code alone. The execution engine 170 (FIG. 1(b)) may execute code that has been compiled. In some embodiments, the widget execution engine 141 may be unable to compile code. Alternatively, the execution engine may contain a compiler or interpreter, or make use of a compiler or interpreter on the mobile device 140. The execution engine 170 may execute (and therefore widgets may contain) scripting programming language code, such as JavaScript, and the script may be compiled, such as bytecode or object code. The execution engine 170 may include a facility for executing code written in another programming language, and APIs that the code may access to interface to device services 150.

Figure 36:
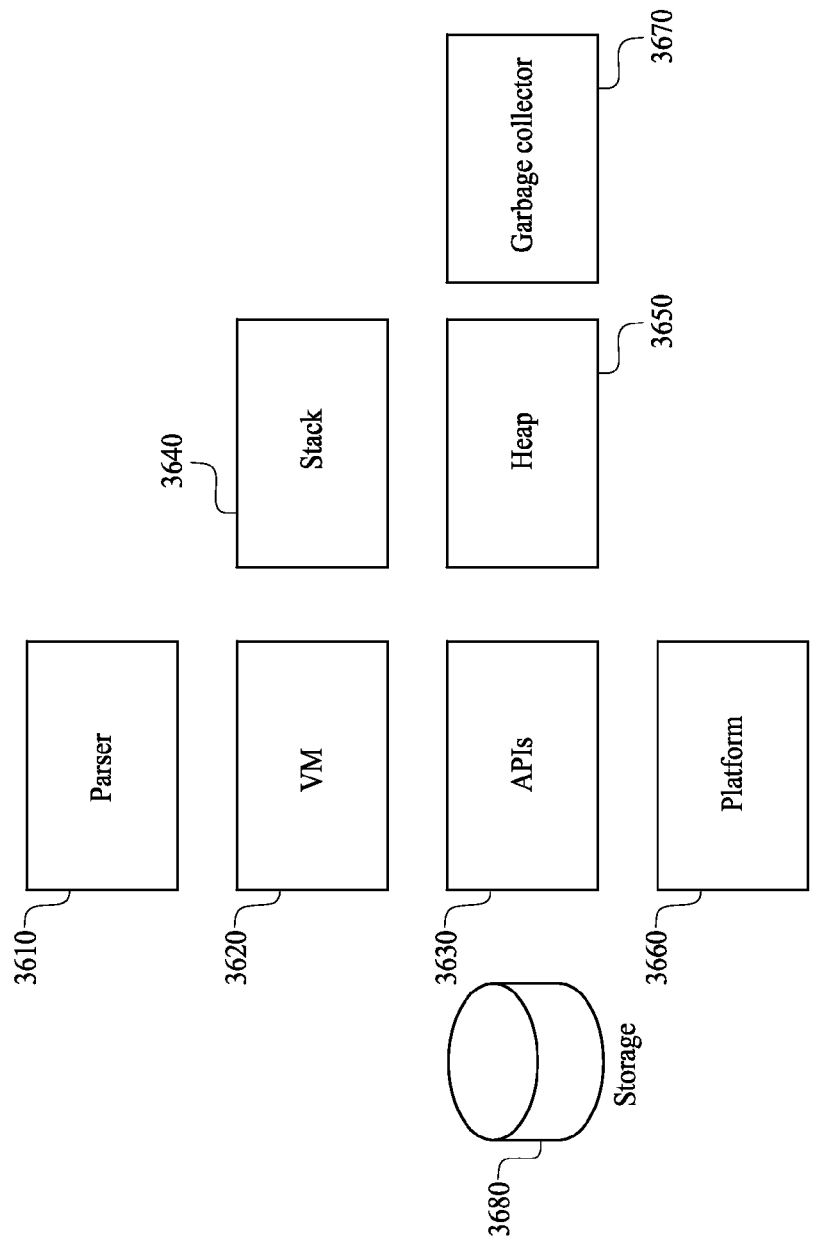
FIG. 36 is a schematic block diagram of the scripting engine on the widget client.

FIG. 36 illustrates additional modules that may be included in an execution engine 170 on the widget client, according to one embodiment. The parser 3610 may be made to be an optional component. If omitted, the server 110 may parse into bytecode before sending. If included, it can have dynamic script creation. Also included is a representation of the underlying hardware platform 3660 exposed by to widgets and/or client or execution engine components. The platform 3660 may include hardware descriptions, handles, operating system hooks and calls, APIs to device services and capabilities, an SDK, and so forth. The native platform may be exposed, or the execution engine may expose a modified, translated, or protected platform 3660 representation to widgets or other components.

A virtual machine 3620 may execute the bytecode and interact with the user through APIs 3630. Bytecode may be in the form of an octet stream (8-bits=1-byte). The virtual machine may have an instruction pointer that points to a list of instructions (bytecodes). After each instruction that gets executed, the instruction pointer may be incremented (except for branch instructions). Appendix D illustrates sample 1-byte opcodes of the instructions that may be implemented.

Virtual Machine Architecture

A generic virtual machine may support many languages. However, adopting a simple version of JavaScript may lower the learning curve to create applications. A compact, reduced version of JavaScript may accommodate low resource mobile devices. Operations may include:

| Binary operators | +, −, *, /, etc |
| Unary operators | −, + |
| Assignment operators | =, +=, etc |
| Object operators | ., ( ), [ ], etc |
| Access operators | . |
| Declarations | var |
| Execution | function calls |
| Branches | return, if, switch |
| Comparison operators | ==, !=, <, >, etc |

A modified BNF of a JavaScript language subset is provided in Appendix A. The code segment of such a virtual machine, or the execution engine as a whole, may be less than 10,000 bytes, 7,000 bytes, or even smaller.

The virtual machine may be a stack-based architecture or machine. With continued reference to FIG. 36, values that are required by the instructions may be pushed and popped from the stack 3640 as required. In addition, a heap space 3650 may be provided where variables of a particular scope get stored. Whenever a new scope is created, a space for heap 3650 may be created and pushed onto the stack. Whenever program control leaves a scope, the space for the heap 3650 may be popped from the heap stack and destroyed. In addition to the local scope, a global scope may be provided. If references to variables do not exist on the local scope, the global scope may be referenced.

Stack

The object stack 3640 may be a temporary storage area that the virtual machine 3620 may use to perform computations. The stack 3640 may be a last-in-first-out stack where the last item pushed into the stack 3640 may be the first item popped out of the stack 3640. Various computations may be performed using postfix operations on the stack 3640. The stack may be located on a data storage module 3680.

Heap

The object heap 3650 may be used by the virtual machine to save the values of variables. In the example above (section on "stack" 3640), the variables "x", "y", and "z" may be used. These variables are stored in the object heap 3650.

The object heap 3650 may be garbage collected as described in the "garbage collection" section below. Garbage collection may clean up and free up space in the heap 3650 so that more objects can be put into the heap 3650 without the developer having to concern themselves about managing the heap 3650. Cleanup may be needed when objects in the heap 3650 are no longer referenced by widgets. The heap may be located on a data storage module 3680.

Garbage Collection

A garbage collector 3670 may be provided for freeing unused memory. For simplicity, a simple mark-and-sweep algorithm can be used. It can be invoked at strategic moments (e.g. after 1000 instructions, after 60 seconds, after idle, etc.). An alternative is the store and copy approach. This approach avoids fragmentation at the cost of using double the memory required. Yet another alternative is the mark and compact approach which combines features of both. Pseudocode descriptions of some embodiments of the algorithms are provided in Appendix B. The garbage collector may be optimized for the particular languages to be executed by the execution engine. For example, an engine which executed compiled JavaScript may implement a version of the mark-and-sweep or mark-and-compact algorithms described above.

Execution Engine APIs

In some embodiments, code executing on the virtual machine may interact with the system resources and with the user. Application Programming Interfaces (APIs) 3630 are interfaces exposed to the virtual machine to display user interface and get user input. These APIs include but are not limited to:

File input/output (e.g. basic file I/O and abstractions like databases)
Network operations (e.g. HTTP, sockets)
Graphics display (e.g. browser API and graphics canvas)
User input
Text parsing (e.g. XML)
Mathematical operations and functions A further list of APIs and operations according to some embodiments is provided in appendix C.

The operating system 143 (FIG. 1(*b*)) typically exposes APIs to device features such as a camera. These APIs may be called device services APIs 150. Different operating systems 143 on different devices may provide different APIs to the same feature. So, for example, while many phones from different manufacturers may have cameras, the operating systems 143 on these phones may expose different APIS: TakePicture( ) versus OpenShutter( ) for example. The API may be included in the execution engine or may be separate from it.

Depending on the underlying function they provide access to, these APIs may or may not be exposed by the operating system 143 to a given application.

The client widget engine 141 may provide a common device services API 180 that may be accessed by executable code 171 that includes calls 181 to devices features. The common device services API 180 allows widgets 142 to be made more independent from the underlying device 140 type and operating system 150. Widgets may make a call to a function included in the common device services API 180 with little regard to the underlying proprietary device services API 150. As such, multiple engines may be installed on multiple different types of mobile devices, such as by different manufacturers, where each of the devices utilizes different APIs, programming languages, operating systems, OS versions, and other features, from other devices. Despite running on different hardware/platforms, all of the engines may provide a common API for widgets to access common device services of the mobile devices.

Widget Repository

With reference to FIGS. 1(*b*) and 4(*b*), in one embodiment, widgets may be stored in a widget repository 451 on the mobile engine 141. According to this embodiment, when a widget 142 is installed, it may be unpacked. The resources contained within it may be stored in the repository along with some meta information about the widget 142. One of attributes in the meta data may be a widget's version. If widget authors deploy newer versions of a widget, the widget 142 may be upgraded. This may work similarly to the client auto update as described below. The widget version may be compared against the version on the server. If there is a newer version, this data may be transmitted to the client. The user may either be prompted with a mandatory widget update or an optional update (depending on what the widget author has specified). If applicable, the new version of the widget may be downloaded. If the download fails, the download may resume the next time the application initiates a widget synchronization. After a successful download, the old widget may be removed and the new widget may be unpacked and registered with the mobile client.

Synchronization Engine

With reference to FIGS. 1(*b*) and 4(*b*), the synchronization engine 452 on the mobile client 141 may be used to ensure that the data is the same between the server and the client. The synchronization engine may work in conjunction with a server-side synchronization engine described below.

Mobile Prefetch

Page requests take a finite time to load and render. Each element within a page may make separate requests to various servers to load resources (e.g., images). As such, a user may wait for data to come over the network and the widget 142 (FIG. 1(*b*)) may be rendered before the user can begin to view and interact with some content. Alternatively, the widget may not be rendered until all or a portion of the data is received. Some embodiments allow downloading or prefetching of data in the background, thus allowing the user to interact with other, non-blocking widgets or with the data-requesting widget as described below. Mobile prefetch may be initiated by a widget, controlled by a widget, or operated autonomously by the widget client engine 141.

Mobile prefetching works by downloading at least some of the content needed before the user begins to interact with the widget. Once the content is downloaded, users can interact with the widget without having to make network connections again. According to one embodiment, the process begins when the widget is requested. The widget may begin downloading in the background. The user can then choose to perform other application tasks or wait for the download to complete. Once the download is complete, the widget may contain the resources necessary for the widget to function without having to access the network.

Mobile prefetch can also be configured to download content in the background and have the result appear at a later time. For example, a large video clip may take, for example, 5 minutes to download. The user may prefer to perform other activities while the download occurs. According to one embodiment, the widget may call the mobile download or prefetch module to fetch the specified resource in the background and to put the resource into a "mailbox" that users can later visit to pick up the content. The download proceeds and, eventually, the download completes. In some embodiments, an unobtrusive notification appears (either audio or visual) to indicate that the download has completed. The user can then open the mailbox to retrieve the content and play it.

Another application of the mobile prefetch is to enable use of the mobile client by mobile devices with extremely limited storage. Although the mobile client can prefetch the data for all of the widgets before usage, storage-limited mobile clients may choose a delayed on-demand fetch instead of prefetch. The user may select the content they wish to prefetch and content that they wish to only fetch on demand. One example is the display of articles on a web site. The user may choose to prefetch the article titles first and then retrieve the article content only when they wish to view the article. Note that this is slightly different from the above where content is downloaded into a "mailbox". In this case, the download may occur on-demand so that the user can view the result as soon as the download is complete.

In some embodiments, widgets may query an API provided by the engine 141 in these two modes to render themselves differently. For example, in a grid view mode where the widgets may be "minimized", a widget might render itself as "grayed-out" when there is no data. Then it may change to a flashing indicator to indicate when there is new data or can change to a static image once the user has viewed the data for that widget.

Engine Auto Version Update

Mobile client engines 141 that are downloaded for installation on a mobile device 140 may have versions associated with them. When a newer version of a mobile client 141 is available, the older mobile client 141 may need to be updated. There may be two types of version updates. The first is a mandatory update in which the old mobile client must be updated in order to further use the services of the server. The second is an optional upgrade where an older mobile client is not required to be updated in order to function. For example, new features might have been introduced but the same basic functionality is preserved, and hence does not require an update.

Mobile clients may be notified of new updates. According to one embodiment, when a new update is available, the update is marked on the server. The server may then maintain a list of versions that it keeps track of and may keep the current version that has been deployed. When a new version becomes available that is not the current version, mobile clients may be notified. This may occur when the mobile client connects to the server as follows: As part of a handshake, the mobile clients send their current version. The server responds with whether there is a new version or not and whether or not it is a mandatory update. The mobile client then acts appropriately. If a new update is to be downloaded (user accepts the upgrade), the mobile client may connect to the server at a URL that either has been transmitted to the mobile client during handshake or to a default URL embedded with each mobile client. The URL may be a download page that allows users to download a new version of the mobile client, replacing or superseding the old version.

Widget Service System Architecture:

Referring to FIG. 4(a), the widget service server system 110 may include one or more modules. The modules may be split on different physical machines. There may be additional components in an embodiment. The server system may include one or more of the following illustrated components:

A web and mobile front end 400 may provide a user interface on the desktop using a web browser, WAP browser, or mobile client.

Content adapters 402 may provide plug-in points for external data sources to enter the server. Some content adapters include video feeds, RSS feeds, web services, relational data bases, HTML pages, email, calendaring data, instant messaging channels, etc.

A content caching module 403 may cache external data so that an external fetch to satisfy a request from a mobile device may not always be needed.

A user vault 404 may store user passwords for the server as well as for external services requiring passwords (e.g. external email accounts).

A search module 405 may index and search the content on the server. The search module 405 may make the content on the server available to external search engines.

A session manager 406 may manage web and mobile sessions and sessions between the web and mobile.

A mobile application module 407 may host widgets. This module may be include a device detection module 412 and a widget application repository.

A synchronization engine 408 may synchronize data between the server and the mobile client and the data may be used by a widget. For example, specified widget application may be sent by the server to the device during synchronization.

An ad syndication Engine 409 may serve ads at specific frequencies, for different demographics, in different formats.

A location engine 410 may determine a user's location and may allow widgets to be served based on location.

A transcoder 411 may convert a resource from one format to another format. For example, it can simplify HTML of complex sites into simpler HTML that may be more easily parsed. Some transcoders may transcode one video format to another for device suitability A device detection module 412 may detect the device type and deliver the correct experience to the user.

A livecasting engine 413 may provide a streaming interface to mobile clients.

A billing server 414 may handle billing requests and external billing servers.

A logging module 415 may handle logging errors and actions for statistics.

Widget creation and publishing tools 416 may include various hosted and offline tools for creating and publishing mobile widgets.

A connection to external widget creators, such as by a web services API, such that $3^{rd}$ parties may have a level of access to the server.

The following sections detail some of the components of the Widget Service Server system depicted in FIG. 4(a).

Content Adapters

The content adapters 417 may serve to determine what type of content can be processed. Content adapters 417 may then process the raw data into a structured format that is usable in the server system 110. In the system 110, there may be a registry of adapters 417. Each adapter may register the type of data that it accepts and the location of the adapter.

Raw data may come into the system through channels. Data can go through a directed channel where it is known what type of data needs to be transformed. Alternatively, data can go through a global channel where the system determines the appropriate adapter that can handle the data. In the case of a directed channel, the system need not process what type of data is coming and can let the adapter handle the data. According to one embodiment, for a global channel, a stream is obtained from the data source. The raw data may flow through this stream. The system may pass this stream to each of the registered adapters. Each adapter 417 may determine from the stream whether it can handle the stream or not. If it can handle the stream, it notifies the registry that it can handle the data and may proceed to process the data.

In the event that there is more than one adapter 417 than can handle the stream, a priority-based system may be in effect. As an example, an RSS feed data source can be handled by an RSS parser, a web service by web services adaptor, and an XML document by an XML parser. The system 110 may provide a method of registering priorities of adapters in an adapter registry such that a specific kind of adapter 417 such as an RSS feed adapter may have the highest priority while a plain text document parser may have the lowest priority.

The raw data may be then processed for fast access and optimal delivery to mobile clients. It is up to the adapter 417 to determine how best to optimize the raw data. According to one embodiment, this may be done as follows: The raw data may get processed as appropriate for its data type. For RSS feeds, data may pass through an RSS feed parser. The data may be represented as objects while parsed. The data may then get normalized into a common data format so that other types of feeds (such as ATOM) can be stored in the normalized data structure. The normalized data may then be merged as appropriate with the data that is already in the data store. In the case of RSS or ATOM feeds, each feed may have many articles. After normalization, the articles may be taken and then compared against what is already in the data store. If it doesn't exist, it can be added. Otherwise, it can be ignored. The result is one unified feed that may contain all of the unique articles. The data can be filtered some more based on user preferences. For example, a search string could be specified such that a user receives only articles matching the search. Finally, the data may be transcoded to match the capabilities of the mobile device and the mobile application. The resulting transcoded data can be cached for fast access when multiple users with the same feed requirements access that data.

Text Data Sources

Figure 13:
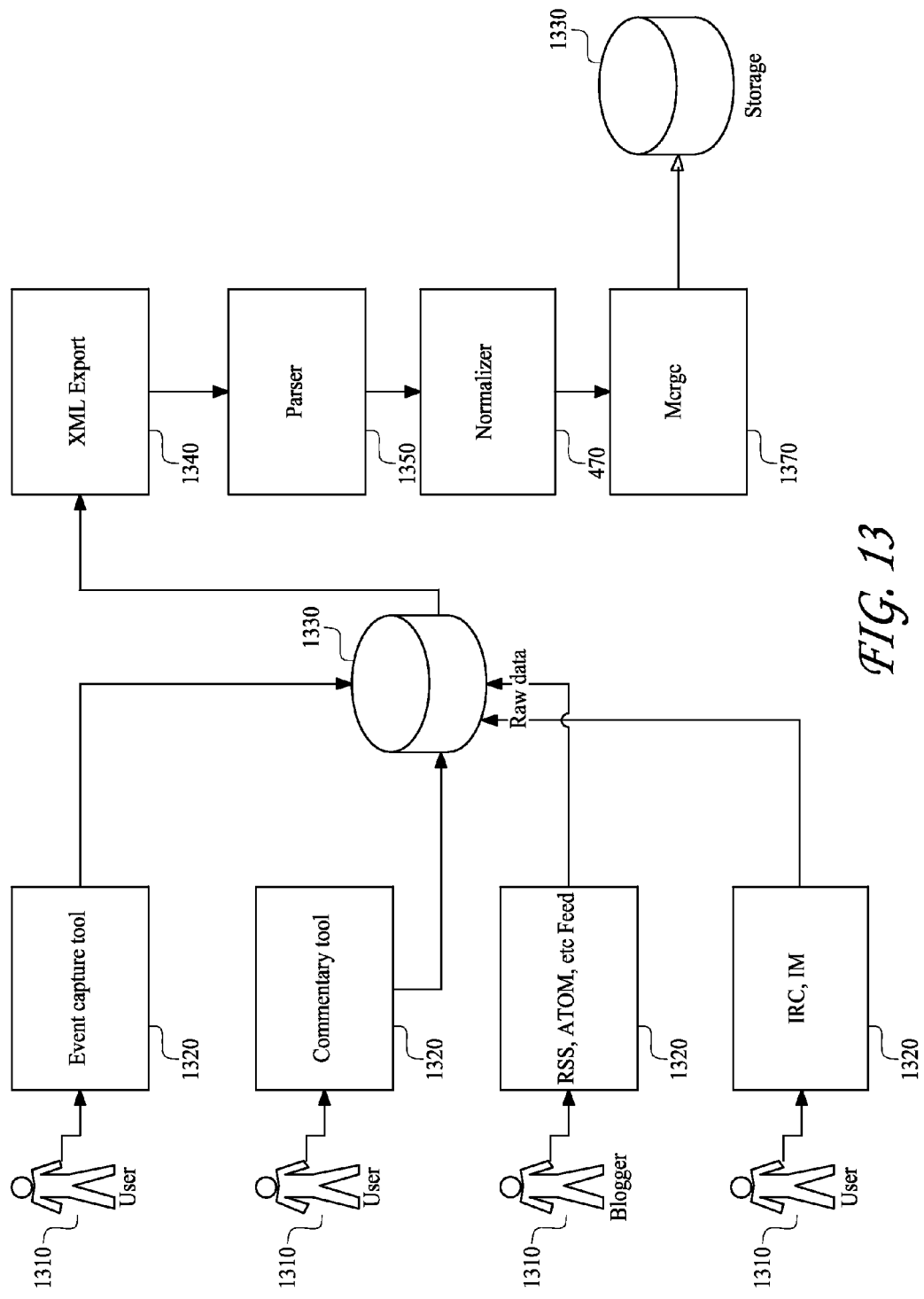
FIG. 13 is a schematic block diagram that depicts various data sources being aggregated by the system for livecasting.

Textual data may come from a variety of data sources. One example is from RSS feeds that web sites can publish. Another source could be a relational database. Another could be a via human entered sportscasting tool. Still another could be from an IM (instant messaging) platform or a chat system. FIG. 13 describes a system by which textual data enters the system for delivery, according to one embodiment:
1) Various text sources have people 1310 entering text.
2) Respective capture tools 1320 transform human entered content into computer structured format. Examples:
    a) Event data (such as events that happened on a ball) such as direction, speed, number of points for the event, etc., may be captured
    b) Commentary data (human readable text about the event)
    c) RSS-type feeds that might contain articles, pictures, etc
    d) IRC data
    e) Others such as web content
3) Data may be saved onto disk 1330.
4) XML export 1340 for transfer to an encoding server that merges feeds together to form a single coherent channel for each feed type (e.g. one channel for each game, news site, traffic data, etc)
5) Parser 1350 receives XML data and transforms back to structured binary data for further processing.
6) Normalizer 470 (FIG. 13) converts the various XML data formats into a meta structure for consumption. E.g. ATOM, RSS, CDF format variants are normalized into a data structure that encompasses the attributes of each format.
7) If data is sent in chunks, the merge module 1370 takes the chunk and combines it with an existing channel.
8) Final result is saved to disk 1330.

In this application, methods as described immediately above do not necessarily include all of the listed elements.

Pull Adapter

The content adapters 417 may have push and or pull interfaces. The pull interface may implement a polling policy that has certain parameters to influence polling characteristics. For example, over HTTP, the source server could transmit HTTP headers to control the cache content of the feed (e.g. when the feed expires so that we can fetch again). The frequency of the polling may also be influenced by the number of subscribers to the feed and the usage patterns (when the feed gets accessed). These policies may affect the frequency of the polling, thereby improving the speed at which the end-user receives the feed. The system may not need to fetch the feed every time a user makes a request for the feed. Furthermore, since the feed may be cached, many different users could share the cached content without having to refetch over a slow network.

For sources that need timely updates, the source may be prefetched as appropriate using the above described frequency fetching policy. This policy may ensure that the server is not overloaded by unnecessarily fetching and may also allow for timely updates to mobile devices. The policy can also be overridden to update on a fixed schedule. This might be done with sources used for demonstration purposes, for example, where users might not necessarily subscribe to the source, but the source content needs to be fresh.

Polling Server for Prefetching

To optimize on server bandwidth, the following algorithm may be used to determine when to pull content from a feed source (if the feed source requires polling):
1. Obtain a list of all feed sources that need to be polled.
2. Obtain the frequency of access for each of the feed sources.
3. Fetch content from the feed source according to a frequency schedule.
4. Save the content in a caching server.

When a user performs an action that requires accessing a feed, the following algorithm may be used:
1. Mark the last accessed time for the feed.
2. If access time interval is lower than previous interval, set the new interval.
3. Reset intervals to a default after a set number of days.

Push Adapter

A push mechanism may also be used, where a content publisher can push updates to the server when some data has changed. Polling policies need not apply here. When new data arrives, it may be normalized and transformed as appropriate. For example, sports data is usually pushed since the clients need to be updated in a timely fashion. After the data is received, the clients may then be notified as appropriate.

Parsing/Content Transformation

When raw data enters the system, it may be sent through a parser 3310 (FIG. 33). The parser 471 reads the raw data and converts it into data structures.

Server Content Fetching and Transform

Figure 15:
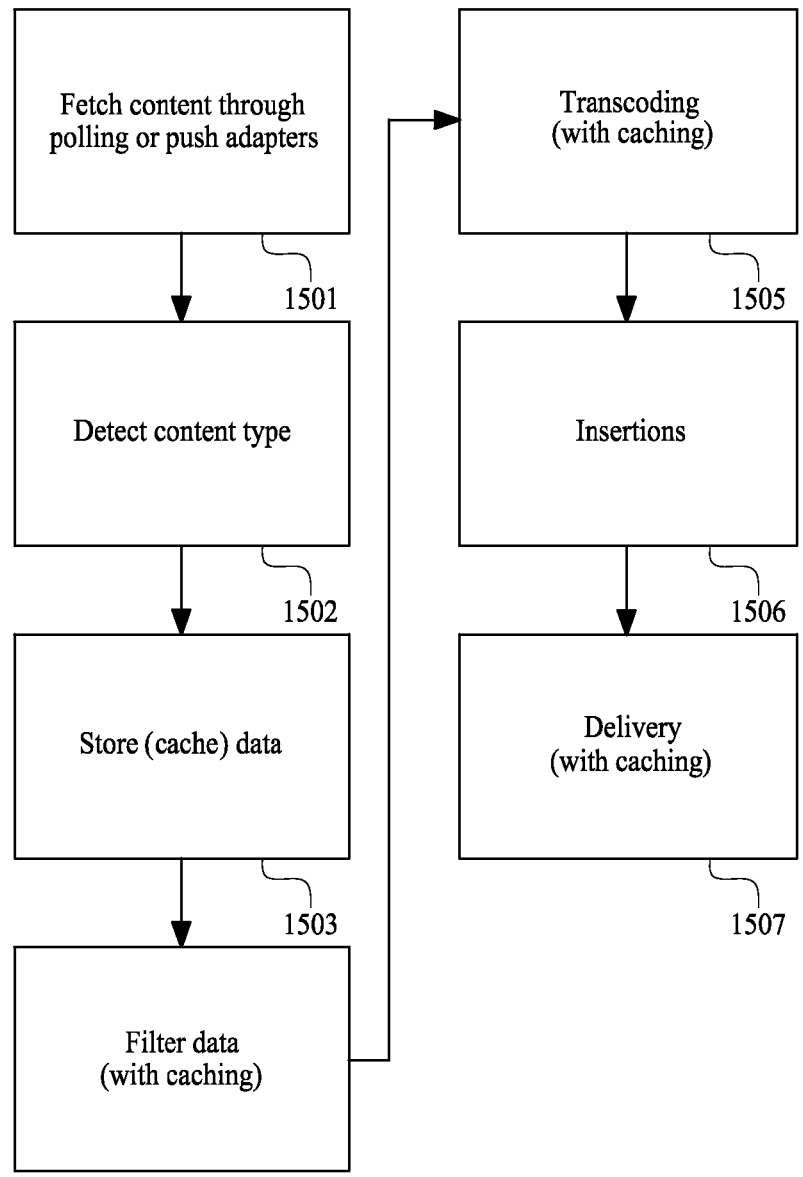
FIG. 15 is a flowchart illustrating a process for aggregating data from a variety of sources.

Data may enter the server 110 through polling or push adapters as described above. A method by which data enters the system, according to one embodiment, is shown in FIG. 15 and described below.

1. Fetch content either through polling or push receiver (1501).
2. A content parser detects the type of content received and parses and normalizes into common data structure (1502).
3. Data is stored on disk (1503).
4. A content filter looks at the raw data in the disk, finds the feeds, and either removes or transforms the data appropriate for the target (1504). Examples:
5. User wants to filter out adult content
6. Search to find relevant content
7. Filter items that haven't been viewed yet
8. A transcoder transforms the content into a format that various clients can understand (1505).
9. An insertion module allows for advertisement insertions (1506).
10. A delivery module delivers content to the client using various methods (1507).
11. A cache module caches the transformed content from elements 4, 5, 6. Each user may have their own cache blocks. The cache module pre-fetches and pre-transforms the data to go into cache. When the user requests data, a fetch is made from the cache. If not existent in cache, the module may perform transformation immediately (1507).

Livecasting Engine

A mobile livecast widget may refer to a specialized mobile widget that delivers an interactive personalized information stream about an event. Such information may include, without limitation, a combination of a user-personalized event status, event-specific graphical illustrations that depict various states of the event, relevant summaries of the event, edited media clips including video clips, photos and commentary, play by play event descriptions, event based notifications, related statistics, and charts. Multiple end-users may be able to simultaneously consume the information stream from their terminals. Further, the information stream may be personalized based on the end-users' preferences and the terminal capabilities.

Figure 34:
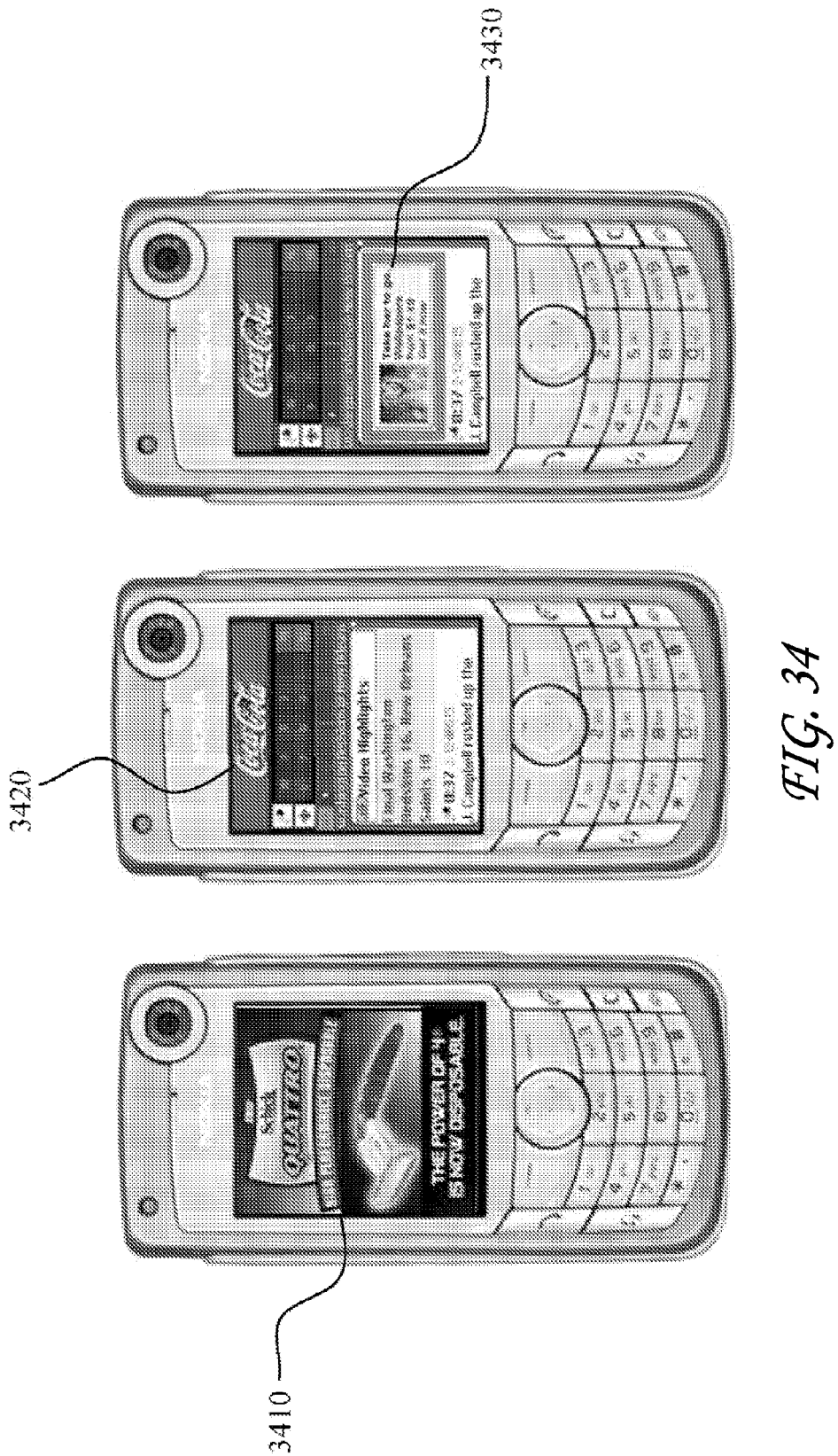
FIG. 34 is an illustration of various types of mobile advertisements supported by the widget client.

A livecast channel may refer to a specific mobile livecast. Alternatively, there may be many channels being delivered to different sets of users. Users may be able to select and "tune in" to a specific mobile livecast. An exemplary livecast widget for the game of cricket is depicted in FIG. 34. Another example of a livecast widget could be streaming video of a live concert or streaming text and picture updates from a live event such as a competition, conference, or media reporting.

Figure 19:
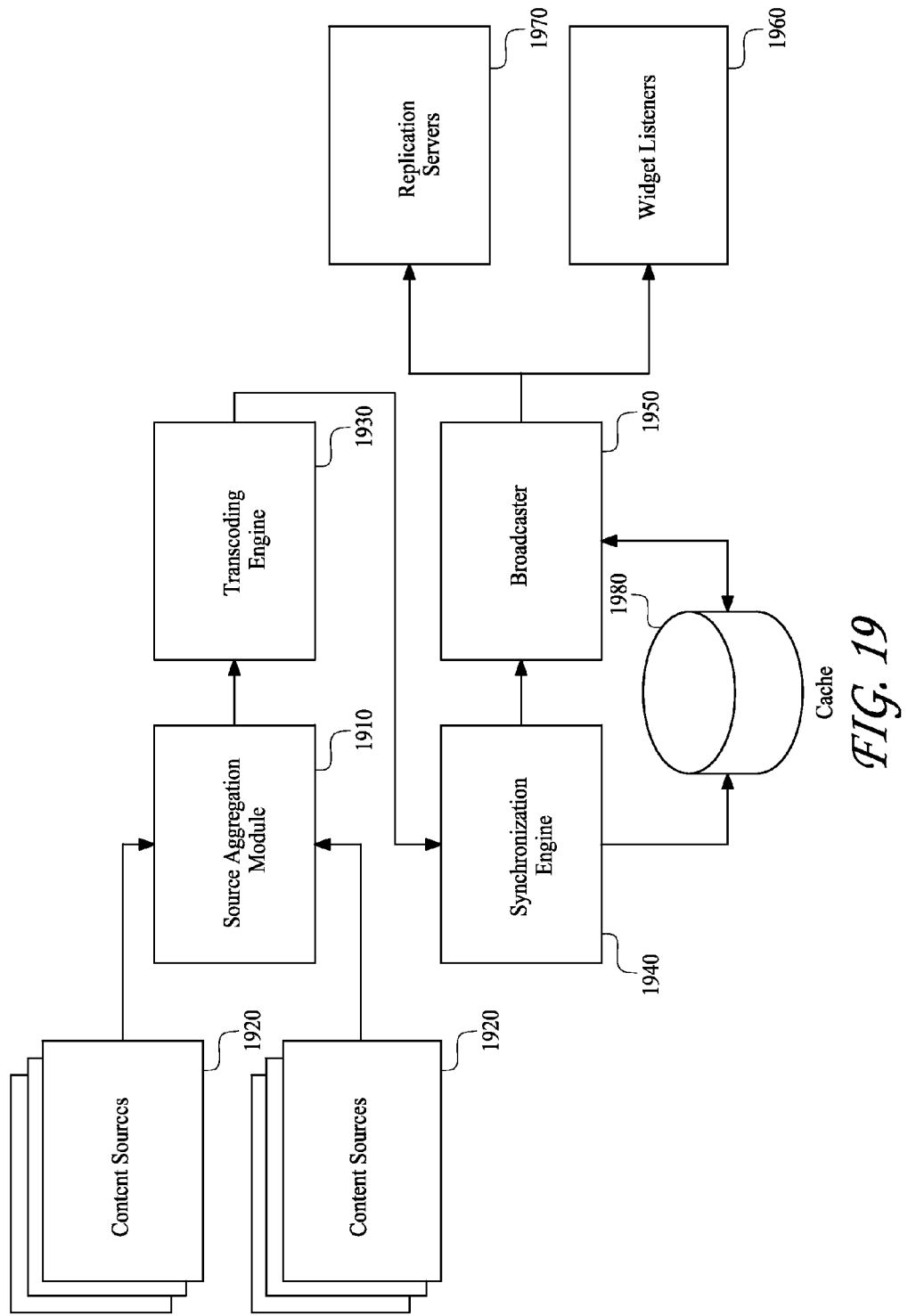
FIG. 19 is a schematic diagram representing the livecasting engine.

FIG. 19 illustrates one embodiment of a livecasting engine. According to this embodiment, the engine is a real-time system by which clients access information that is guaranteed to arrive within a certain period of time. The livecasting engine may be used for serving up videos, sports scores, instant messages, stock quotes, or any other information that requires timely delivery. Each collection of related data is called a stream. A stream could be a sports match, for example, or a stock feed. Streams could further be categorized into groups (e.g. the games in a series correspond to streams in a group). Within each stream is a collection of channels. Example channels are videos, audio, text commentary, scores, advertisements, etc. Each stream is assigned a unique identifier. This is used, for example, in conjunction with the billing server to identify the streams that a user has purchased for receiving.

The livecasting server may include multiple subsystems. The first is a data source aggregation module 1910 where various content sources 1920 enter the system through adapters (as described by pull adapters above). Sources 1920 can be automated (RSS feeds) or manual (video clipping). In the case of video clipping, tools may be available to clip the video and then assign timestamp information for synchronizing the video stream with other streams later in the pipeline (as described below).

Content can be transcoded so that the media can by rendered by the various connecting device types. This is done through a transcoding engine 1930 that is specific to different media types (described in the transcoding section above).

The various streams of information may be then synchronized by the media synchronization engine 1940. This engine may take the different media types and match them to form a coherent stream of data including the different channels. An example is video, audio, and text commentary streams that come together so that the streams match their time signatures with one another. This may be done by marking each stream as they enter the adapters with timestamp information. This timestamp information provides a reference for the time at which the content enters the system. The timestamp may be provided by the system or provided externally. In one embodiment, a sportscasting widget may contain several streams of information. The first stream that may arrive is a text stream containing text commentary of what happened at a particular time. In the meantime, video may be processed externally (clipped, edited, etc) and then sent to the server. Before the video is sent, it may be marked with a timestamp for the time at which the video is pertinent. So, after the stream enters the system, the video stream can match with the text stream based on the timestamps.

A broadcast module 1950 may then send the data stream to the connected clients 1960. The broadcast module may also send data to replication servers 1970 to distribute high server loads. According to one embodiment, the replication server may contain a registry of listeners 1960. For each listener, there may be a channel by which data can be pushed through. There may also be a cache 1980 that temporarily stores data for transmission. This data is in a pre-rendered form for the various devices (as created through the transcoding engine 1930). For example, a video stream would have been rendered into WMV, 3GPP, MPEG2, MPEG4, QuickTime and into 3 different bitrates (for different network speeds). There may be a provision for the broadcast module 1950 to request the transcoding engine 1930 to transcode to a new format on demand. This might happen in the case when a requested format does not exist in the cache 1980. In this case, the data may be transcoded on demand and then stored in cache 1980. As data is to be broadcast, the broadcast module 1950 may pick up data from the cache 1980 and send to the connected clients 1960 (it may be unaware whether the connected client is an end-user mobile device or a replication server 1970). However, the adapters to which the listeners 1960 connect may determine what to send to the respective end points. For example, a replication server adapter 1970 may broadcast other metadata about the streams (such as author, stream sources, creation times, etc).

On the client 141 (FIG. 1(*b*)), widgets 142 can be created to listen for the streams. They can request different channels in the stream to be transmitted based on user requests and device capabilities. As an example embodiment, a livecast stream may contain several channels, video, audio, text, advertisements. On a device with limited network bandwidth, the client can request only text and image based channels in the stream (text and advertisements). Clients can later request download of the omitted video and audio stream separate from the original real-time stream. Users can delay the stream due to bandwidth constraints. In an example embodiment, a stream may contain video, audio, text, and advertisements channels. The user may choose, for example, only text and advertisements channels. So the text and advertisements are sent to the client in real-time. The streaming widget 142 on the client then displays an indicator to indicate that additional data is available on a different stream. Then, the end-user can initiate a separate download when he chooses to view this additional channel. The download might take longer; however, the user may be able to view the channel. The livecasting engine may support a backoff protocol, described below, to support large numbers of mobile widget clients connecting for updates frequently.

Location Engine

A location engine 410 (FIG. 4*a*) may generally act to store, transmit, and make use of location information provided by and to a mobile device. A mobile device may itself contain a location identification module, implementing part of, all of, or more than the functionality of the server-based location engine 410, and the engine and module may work complementarily. The location identification module may be designed to determine the location of the device, as, for example, by GPS or cell tower location. The location identification module may communicate with the mobile client, or a component thereof, e.g., the download manager, to localize content (such as widgets and data) downloaded to the device. As such, widget applications installed on the device may request network content customized to the location of the device. Similarly, the server-based location module may transmit information customized to the location of the device to the device. The device may transmit its location information to the server. The mobile device, the server, or a network resource may contain a location identification service which may be accessed by the device, the server, or another network resource. Information provided by the location identification service may be used to differentially serve content (including data and widgets) to a mobile device or a user.

User Vault

The user vault 404 (FIG. 4(*a*)) may be used to store authentication credentials for the system and external systems. Credentials may include a login username and a login password. In the case of the system, it may store username, password, and other user preferences. Such preferences include a users phone number, their location, topic interests, address books, search history, favorite locations, etc. User vault data may be used to simplify and eliminate user inputs on the mobile device when necessary by prompting or auto-filling responses inside mobile widget inputs. These credentials may be used for a user to identify himself or herself and allow access to his or her account in the system.

In addition, external credentials may be stored. These might include usernames and passwords for external email accounts, instant messaging systems, chat servers. These credentials may be associated with the user's primary system account. So, when the user needs to access an external email through the system, they need not login again. Instead, the system may provide the credentials to the external system to grant access.

Search

There may potentially be vast amounts of information in the system cache and data stores 403 (FIG. 4(*a*)). A search facility may be provided for users to access specific information in the system. According to one embodiment, search index is handled through an external pluggable search engine such as Lucene. The pertinent text fields may be passed through the indexer to build a searchable index of keywords. When users enter the keywords, the associated document results may be returned.

The search may be split between public versus private data versus shared data. Public data includes data that any user can access. Private data includes data specific only to a particular user. Example public data includes RSS feeds from a news syndicate. An example of private data might be the user's bank records. A shared data pool refers to data that is shared amongst a set of users. Separate search indices may be created for different public/private/shared pools.

The search module can also have plugins for external search engines. This way, if there is content that a user wants to access that doesn't exist in the system, the external search can be invoked to return results.

In addition, the system search results may be externalized so that external search engines can find data within the system 110. This is done by building adapters 417 to the external search engines to provide them with documents to be indexed. An example adapter might be a web page that is publicly accessible on the web site. This web page may list the documents as hyperlinks to other documents that are to be indexed. This way, search engines can use web "crawlers" to find this page and traverse the hyperlinks to the documents that are to be indexed.

Session Manager

The session manager 406 (FIG. 4(*a*)) may serve to provide a state that follows the user between stateless modes. For example, web browsers and the HTML protocol are typically request-response based and may not provide inter-request context to other requests. Clients can send some identifying information about the user. This might be in the form of some unique server-generated identifier that gets sent as a browser cookie. In one embodiment, this cookie saves the generated identifier and sends it back to the user between requests to the server. The server may look up the current state based on this unique identifier, thus the session state is maintained. Similarly, a mobile client 141 can have some similar mechanism to save the user's current state as a unique identifier. This way, the session can be kept across requests.

The server may generate unique session identifiers. One type of identifier is a persistent identifier that may stay with the user regardless of whether they have contacted the server or not. The second type is a transient identifier that exists only for the lifetime of a login-logout event. Using the persistent identifier, a user's state can span across multiple devices. For example, a user starts a persistent session on the web. The user then has to step away from the desktop. The user can continue the session on a mobile device. This may be done by referencing the same persistent identifier. The server can associate the same data because the same identifier is referenced.

Billing Server

The system may handle billing integration with third party vendors as well as custom internal billing. The billing system

414 (FIG. 4(*a*)) may include a database containing the events that are to be billed and another database including the cost per event or series of events.

A catalog may exist that contains an item to be sold and the price per unit. This catalog may be referenced by a widget as appropriate (e.g. a user interface to display a catalog of sports games available for viewing). According to one embodiment, an end-user who wishes to purchase an item makes the request through the user interface. This request is transmitted to the server. For example, the mobile client contains information about the user (unique user ID as per "Unique ID Generation" above). On the server, the user has registered some information about billing details. For example, this could be credit card information or the user's mobile phone account number (for charges to appear on their mobile phone bill). A confirmation is presented to the user.

At this point, the system may make an entry in the database that indicates the user wishes to purchase n units of an item. The purchase is not finalized yet. Requests are then made to the necessary systems to bill the user. This might include a third party payment service such as PayPal or CyberSource. Or, this might be an operator or an intermediary that handles payment. These requests may occur through adapters to each type of billing services. Once billing is confirmed by the billing service, the respective adapter 417 may receive the request. It may then mark a particular item as having been purchased. The widget can then access the item as desired.

Transcoding

Before the mobile client 141 (FIG. 1(*b*)) receives data, the data can be further transformed to optimize for a particular device. Example transformations including image size scaling and format transformations. Another might include transcoding HTML into simplified HTML for mobile client browser. The results of the transcoding can be further cached so that subsequent requests to the same data from the same or different mobile client can be fetched from cache rather than recomputed. Another example is the transformation of video and audio for mobile devices. The source format of video might be AVI while the mobile version might require a 3GP format. So, a transformation can occur. In this case, caching can be done ahead of time since the transformation takes a noticeable amount of time.

Video Capture and Transcoding

Figure 16:
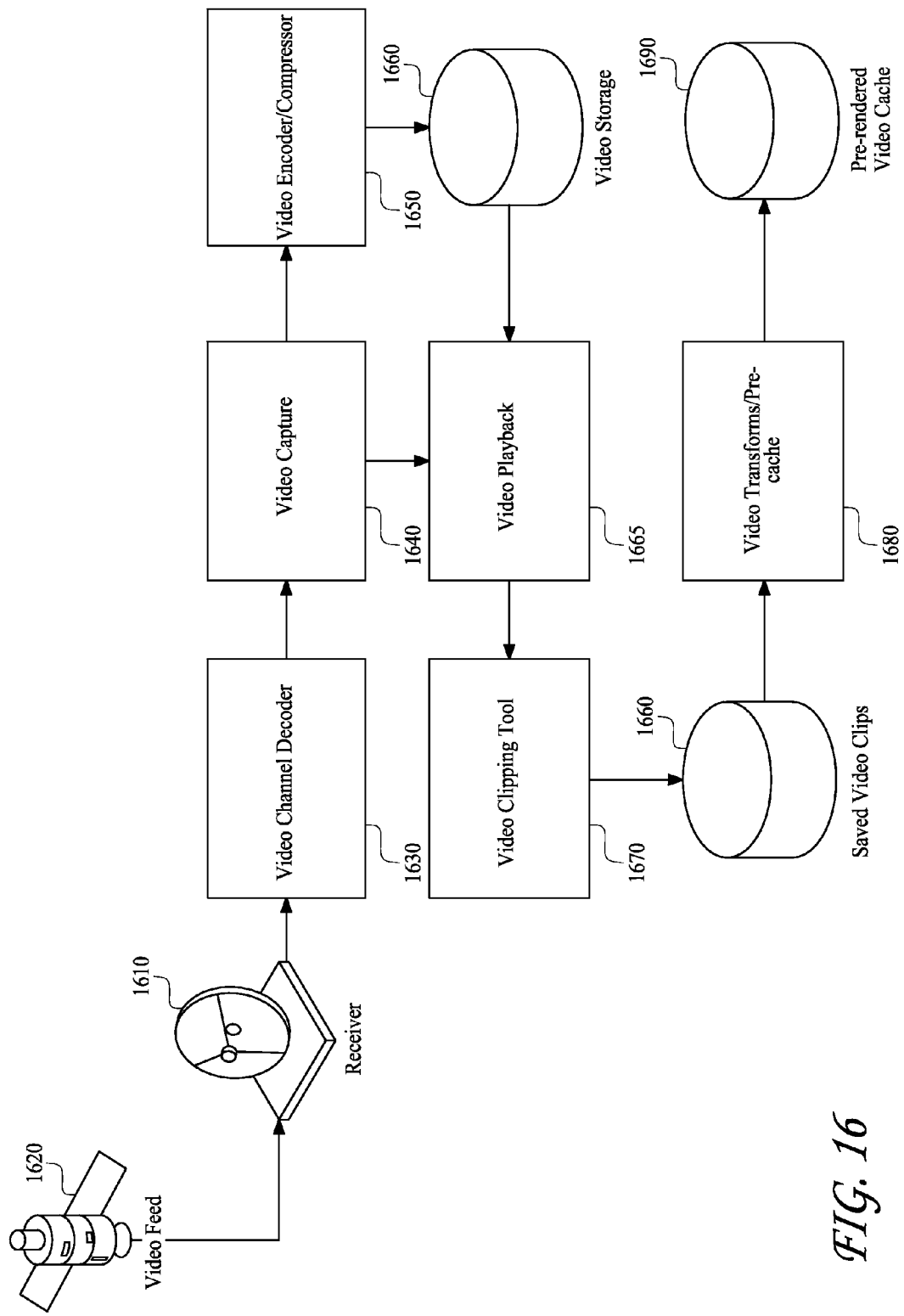
FIG. 16 is a flowchart illustrating the process by which video from a video source enters the system and gets transcoded to the capabilities of various devices.

FIG. 16 describes a process, according to one embodiment, by which video from a video source enters the system and gets transcoded to the capabilities of various devices.

1. Receiver 1610 gets video feed from feed source 1620 (such as satellite)
2. Video channel decoder 1630 decodes the raw stream into a standard video stream such as NTSC to be fed into video capture card 1640.
3. Video capture card 1640 decodes video signals into digital data.
4. Video encoder 1650 encodes and compresses the digital data into standard digital encoding format such as Windows Media Video.
5. Compressed video is stored on a storage subsystem 1660.
6. When video is to be clipped, the user may access the video and playback 1665. The user may be viewing either the live stream or the user may be allowed to rewind back in time or go forward up until the time of the live stream.
7. The user clips the video with a video clipping tool 1670 by marking start and end points of the video.
8. The clipped video start/end points are stored on a storage subsystem 1660 for further processing.
9. A video transformer 1680 takes the clips and transforms them to desired output formats (such as Windows Media Video, 3GPP, MPEG4, MPEG2, etc) that can be accepted by mobile video players.
10. Pre-rendered video may be sent to a cache 1690 so that no further processing is required when video gets accessed.

Mobile Text Transcoding

For certain types of widgets such as RSS feed viewers, each article may often contain a link that allows the user to read the actual source of the article. This link may point to a web site that might render well for desktop computers but not as well for mobile devices. In these cases, the mobile client can run the content through a transcoding proxy on the system first. The transcoding proxy can simplify the page by applying heuristics to strip out unnecessary formatting, ads, navigational elements, etc., reformat images (resize and recompress), paginate large pages, strip out scripting elements, handle complex rendering elements such as forms and frames, and handle cookies 3380.

A result of transcoding is shown in FIGS. 27(*a*) through 27(*c*).

HTML Transcoding Server

Figure 17:
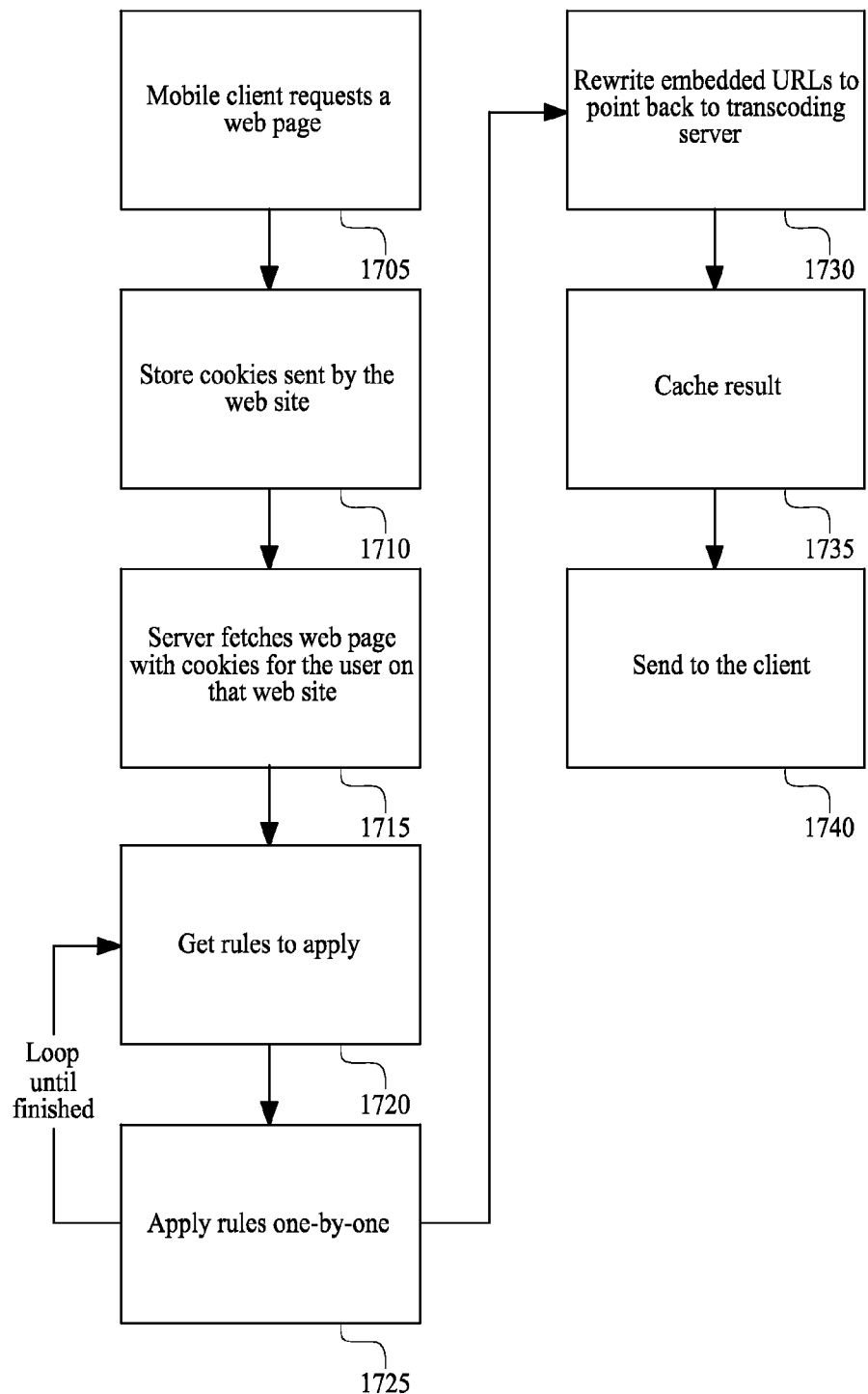
FIG. 17 is a flowchart illustrating an exemplary process by which web markup is transcoded to the capabilities of various devices.

For each page, the full HTML that a site outputs may be transcoded to a simplified version that can render well on mobile devices. One embodiment of such a transcoder is described below. It is a regular-expression based system. One embodiment of the process is illustrated in FIG. 17, which includes a request for a page (1705, optional storage of cookies (1710), a server fetch (1715), a rules application loop (1720 and 1725), url rewriting (1730), caching of results (1735), and outputting of results (1740). In the parsed state, content can be filtered. For example, objectionable material can be filtered out. Images larger or smaller than a certain size can be omitted.

Normalizer

With reference to FIGS. 1 and 4(*a*), the system 110 may include a cache 403. The content in the data structures can be normalized into a global format that gets stored in the system. An example is RSS versus ATOM feeds: Both may be characterized basically as representations of individual articles. Each feed may have a title and description; each article has a title and summary, etc. The two different formats may be parsed into data structures. The data structures may then be converted into a common format and stored in the system.

Another example is with sports data. The various content sources may each have their own data formats for transmitting game data. Sometimes, however, the elements of the same game remain the same. The content may be parsed into data structures. The data structures may then converted into a common format and stored in the system.

Caching

The system 110 may include a cache 403. To implement the cache, the data sources' locations may be specified by a URL (uniform resource locator). Using the URL, the content can be indexed. In one embodiment, an MD5 (message digest 5) hash may be used which generates a 128-bit hash value (or 32-character hexadecimal string). A hash is a one-way function that can be used to "fingerprint" a string. MD5 can be used in a security context. However, an implementation can use it as an index for a resource using the following elements: (1) Perform an MD5 on the URL string. This becomes the index string. (2) Generate a filename with the index string. (3) Store the contents of the data into this file. (4) Then, take the first n characters of the filename to generate a directory in which to store the file, as shown below.

URL: http://plusmo.com/blog
Index: f016fc75785862248ed8bad4fb12de89
Directory: f0
Full path: f0/f016fc75785862248ed8bad4fb12de89.dat The above example used n=2. The number of characters to use for the directory name depends on the number of files in a directory to ensure quick access in a typical UNIX filesystem. For example, if a system is to include 100000 data sources and the maximum number of files to be in a directory to ensure speedy access is 100, then n should be round_up(log 16(100000/100)) is 3.

In the unlikely event that there is a collision for the MD5 hash (same hash for two different URLs), we may append a numeric counter at the end of the filename part of the path. In the above example, if there is another URL that has a hash fingerprint of "f016fc75785862248ed8bad4fb12de89", we'll append "-0" to the filename to form "f016fc75785862248ed8bad4fb12de89-0". We'll continue with "-1", "-2", etc for further collisions. To determine if we have a collision, we may also store the URL as part of the data for the file.

In another embodiment, we can utilize a relational database to index the URLs. In such a scenario, we would create a database table that could have two fields. The first is for the URL. The second is a unique numeric identifier associated with that URL. When a URL is requested, we look up in the database to determine the unique identifier associated with that URL. That unique identifier can form the basis of a filename that we can use to store the contents into. Alternatively, we can also choose to store the data into the database using the BLOB (binary large object) data type.

Logging Module

According to one embodiment, the logging module 415 (FIG. 4(*a*)) provides a fast method for other subsystems to write messages such as error message and access logs. It uses a buffered write mechanism where logging requests are buffered into fast memory. When the time is appropriate (for example, when the buffer fills up or the system is idle), the logs may be written to disk.

Data Synchronization

Synchronization may be used to ensure that the data is the same between the server and the client, i.e. that a first version or content and a second version of content are the same or may be updated. Because the client does not necessarily have the same storage space as on the server, the client may receive smaller chunks of information. Additional information may be retrieved as requested. In addition, the user might request bandwidth metering, which limits the amount of data that is transferred (to avoid costly monthly billing).

Figure 12:
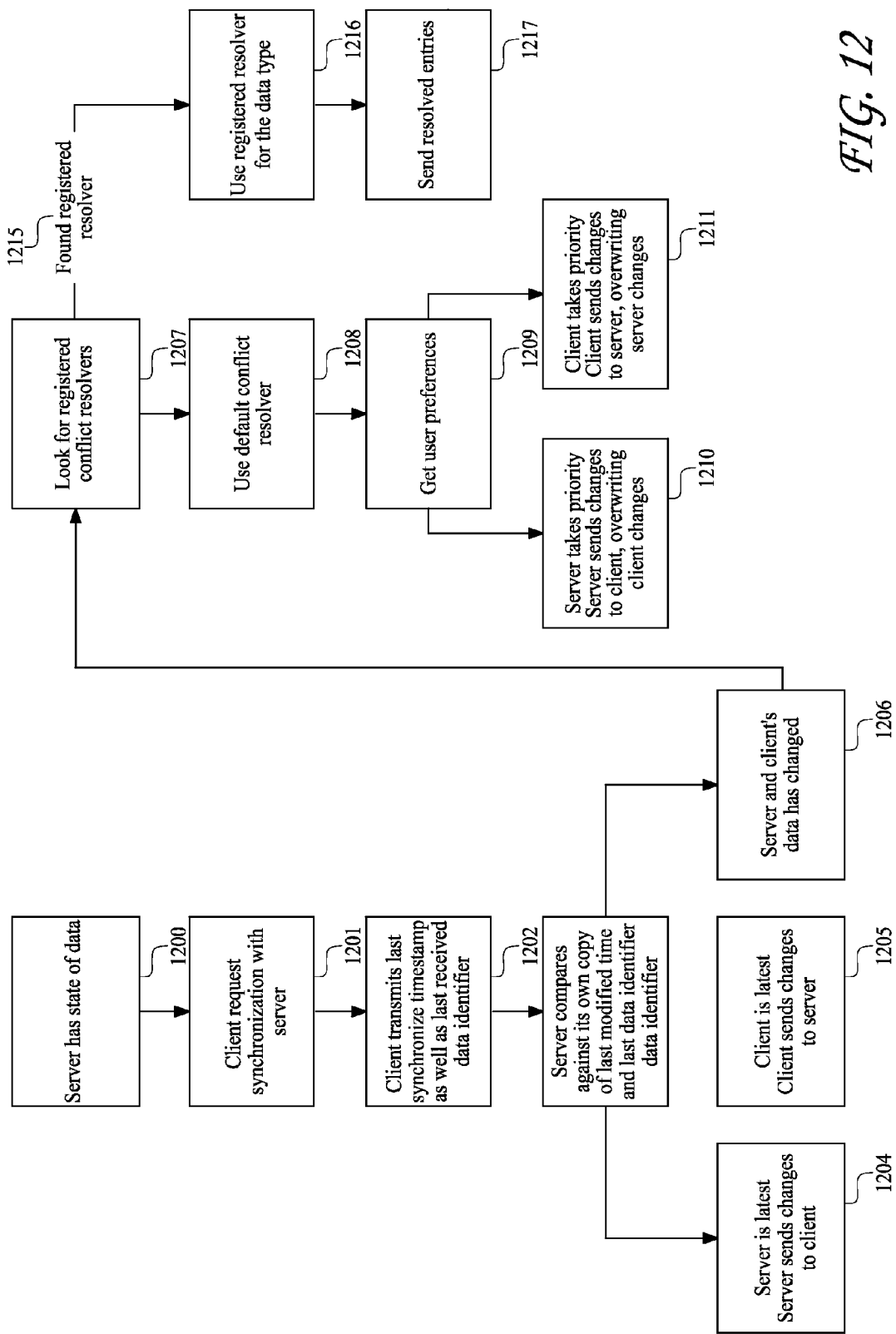
FIG. 12 is a flowchart illustrating a method for the synchronization process between the widget service and widget client.

According to one embodiment, the server synchronization engine 408 (FIG. 4(*a*)) may operate as follows (see FIG. 12): The server maintains a state of all the data for items of interest (1200) in storage. For example, the server state may contain data about a user's subscription to widgets, the widget contents (like RSS feeds), other information known about a user or widget applications, etc. The items of data may have unique identifiers associated with them as well as a timestamp representing when the data was modified or updated. The unique identifiers increment such that given an ID "n", the next ID may be "n+1".

On the mobile client 141, the client may compare the copy of the data that it has with what the server 110 has. This can be done through the timestamp. At block 1201, the client may then request synchronization with the server. The client's timestamp and last seen identifier is transmitted to the server (1202). If the timestamp is different, we may know that the data has been modified and can begin the synchronization process. The next element is to determine what data was modified. This may be done through the unique identifier that is marked for each item of data. The comparison may be done against the unique identifier that is transmitted with the timestamp (1203). A server identifier that is greater in value than the client identifier may indicate that server data was modified (1204). This may indicate that the server is to send the new data (from the last seen client ID on until the last server ID) to the client. A client identifier value that is greater than the identifier on the server may indicate that the client data was modified (1205). In this case, the client sends the new data from the last seen server ID to the last client ID to the server. Timestamps may be updated appropriately.

If data was modified or removed, the following can occur: (1) The old data entry may be removed, and/or (2), in the case of modified or updated data, a new data entry may be created with a new identifier. This new data entry may contain the modified data. The old data entry may not exist any longer and its unique identifier might not re-used.

Conflict resolution may take place when both the server and the client have modified data (1206). The system will check for registered conflict resolvers (1207). If none are found, default handlers may be in place to resolve conflicts (1208). These default handlers can assume several modes. The mode used may depend on user preferences, which may be fetched (1209). In a first mode the server changes take precedence over client changes (1210). A second mode makes client changes take precedence over server changes (1211). A third mode is that the data is merged by appending data entries from the server and client together (and maybe renumbering the identifiers to be sequential). As mentioned, these behaviors may be configured by the user. Sometimes, however, this is not desired by widget developers. Widgets might want to define their own policies regarding data conflict resolution. In such cases, there may be a registration module where widgets can register their own conflict resolution modules with the system. Then, when the widget data is to be synchronized, this module may get invoked, whereby a registered resolver is found (1215), the resolver is applied to the data type (1216), and the resolved entries are sent (1217).

Data may be compressed between the server and client. Compression may occur in a compression module 3360. Example compression formats include but are not limited to gzip and deflate (which are standard web compression formats). In addition, data can be encrypted for additional security.

Data synchronization may be used to synchronize any content on the device, including content acquisition settings, which may include how often to retrieve content and what type of content to retrieve. Reconciliation of conflicts may take place according to the preferences of a user.

Selective Incremental Resource Loading

In one embodiment, the mobile client can download and cache important data as well as simplified meta data about an item. Some of the resources that take a long time to download can be downloaded at a later time. For example, see FIGS. 26(*g*) and 26(*h*). FIG. 26(*g*) shows an article where the text has already been downloaded and cached. The image is not downloaded yet because it might take too long to download initially and the image might not be important for the article. Users can configure when to download the image. In this example, the user has configured to download on demand. FIG. 26(*g*) shows a "clock" icon in place of the image to indicate that the image is currently being loaded. A "Loading . . . " text in the upper right corner of Figure a46 tells the user that elements on the page are being downloaded. When complete, the view looks like FIG. 26(*h*).

Widget Data Sources

For widgets that require data sources, the system may provide a mechanism to synchronize the data and handle transcoding for the client. This mechanism may perform content fetching and aggregation.

Several data sources may be encountered by the system. Examples include RSS feeds, databases, web services, email, calendaring systems, web pages, IRC or IM chat sessions, application programmable interfaces, etc. Each type of input may be handled by various adapters. For example, with sports commentary data, an operator could be sitting at a terminal, entering comments for a particular sports play. The terminal could host a tool to capture user input and convert into an XML file for transmission to the system. Another type of data could be an RSS feed that is hosted on a site. The system might have an adapter that fetches updates from that RSS feed to be updated on the system.

The system may filter the data into individual types. The raw data may then enter the system and be stored in either a permanent or temporary store. For example, RSS feeds may be stored into permanent storage, whereas chat session data may be stored temporarily for forwarding. This may be the role of the content adapter 417.

Backoff Protocol

Figure 14:
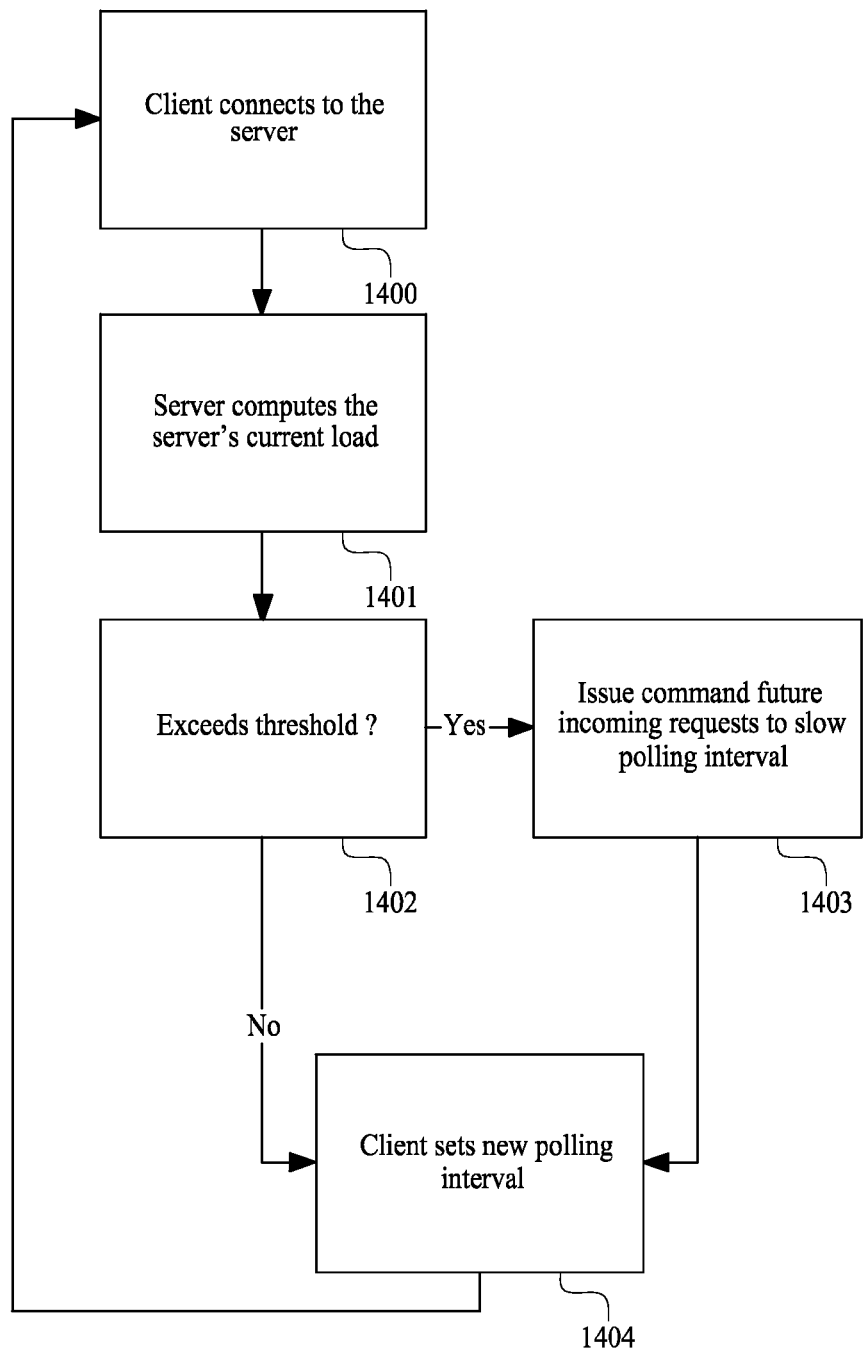
FIG. 14 is a flowchart illustrating the backoff protocol, which is a method for reducing server loads during livecasting.

It may be desirable to ensure server availability. Many clients polling a server for updates may cause many requests to come in at the same time, causing server load to hit a ceiling. This may affect the quality of service for all clients that connect to the server. One solution is to implement a backoff protocol. FIG. 14 illustrates one embodiment of the backoff protocol, described below.

1. Clients connect to the server (1400).
2. The server determines its current load (1401) and checks to see if the load exceeds a threshold (1402).
3. If server load exceeds a threshold, it starts issuing a control command to future clients that connect, commanding them to decrease their polling interval (1403).
4. If server load still exceeds a threshold (1402) after a certain amount of time, the server issues a control command to further reduce the client polling interval (1403). This may continue until the server is below a load threshold.

In the meantime, clients 141 may receive the control command and adjust their polling interval accordingly. Over time, the mobile clients 141 may gradually shorten their polling interval until they reach the minimum polling interval or until the server issues another control command to increase the polling interval (1404).

Widget Browsing and Management

Web and Mobile Front-End

Figures 5A, 5B:
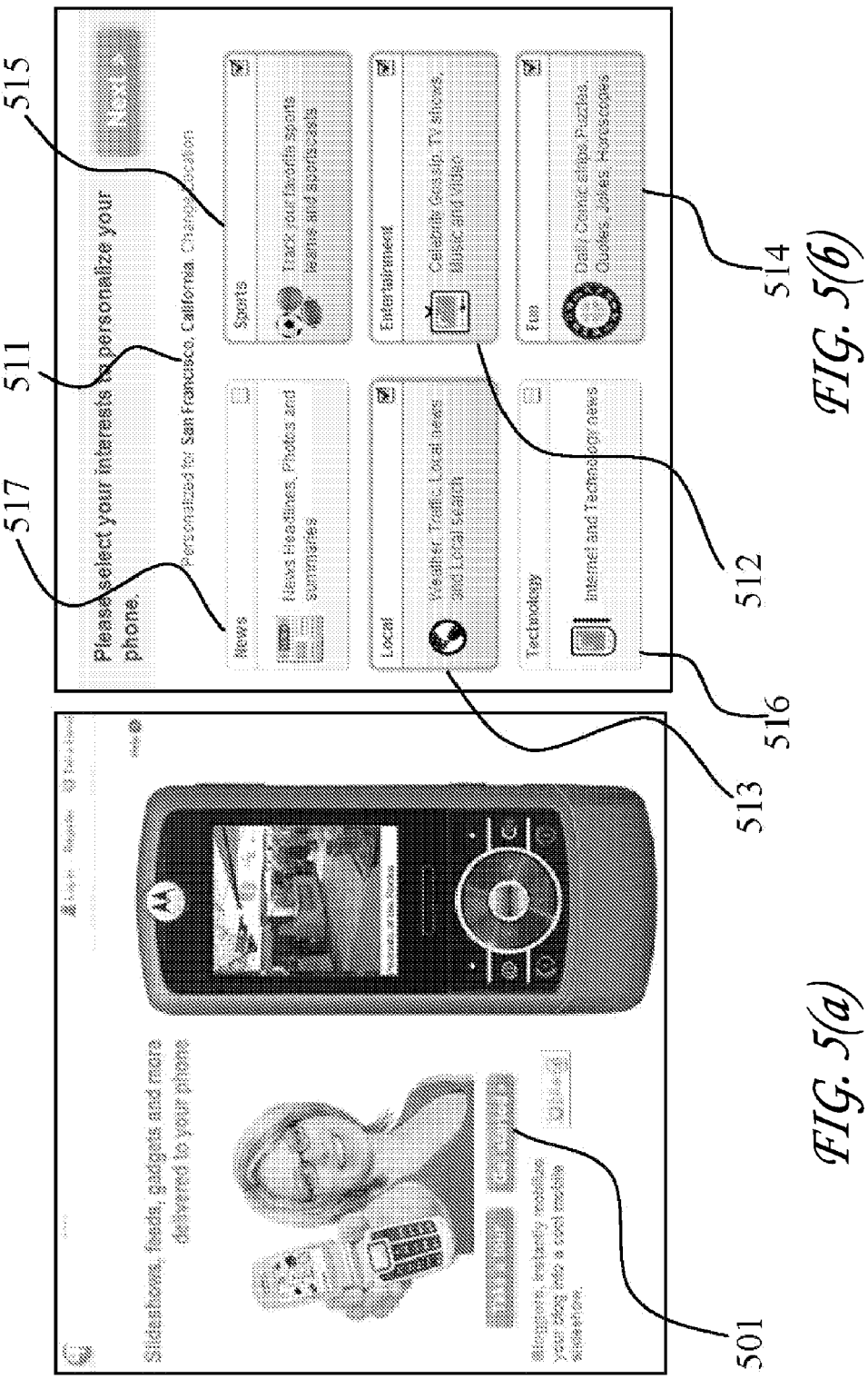

FIGS. 5(*a*) through 5(*d*) show exemplary elements for a user to register from the Web and create user profiles according to one embodiment. A user may get started with mobile widgets by registering on a website provided by the widget service server system 110. The user may use any ordinary web browser such as Microsoft Internet Explorer or Firefox to connect to the widget service web front end. As in FIG. 5(*a*), the user may click on a "Get Started" control 501. The widget service server system may recognize the user's Internet Protocol (IP) address and automatically look up the user's physical location. FIG. 5(*b*) shows an exemplary display for the user to select his preferences according to one embodiment. On this screen, the user may change the location 511 and set up interests such as entertainment 512, local 513, fun 514, sports 515, technology 516, and news 517. Though not shown, several other detailed choices may be provided to further personalize the users' widget experience. Based on the user's selections in FIG. 5(*b*) the system may recommend an initial set of mobile widgets for the user. These may be location specific and based on his preferences. As an example, a user from Paris, France interested in sports and entertainment may get different widgets from another user who connects from Atlanta, Ga. and is interested in fashion and celebrity gossip. The system may otherwise cause selected widgets to be transmitted to a mobile device (or previewed by a user) based on an associated user profile.

FIG. 5(*c*) shows an exemplary display of the system's initial recommendation of widgets according to one embodiment. The user may choose to remove some of the system's widget recommendations 521 or add other widgets. The user may also be provided with a convenient preview of the widget 522 in a mobile phone emulator 523, which may include live data from the data sources used by the mobile widget. When the user is satisfied with his widget choices, he may then proceed by clicking on the "Add to my phone" control 524 or a similarly named control.

FIG. 5(*d*) shows an exemplary registration screen 530 according to one embodiment. The registration screen may request the user's personal information and include fields such as email address 531, password 532, telephone number 533, and telephone provider 534. Using these details, a new personal account may be created for the user. Then an email or SMS message may be sent to the user's mobile phone with an embedded link facilitating installation of the widget service client software on his phone.

When the user receives and reads the message on his mobile device, he may select the embedded link to install widget service client software on the device. The widget service client software may be installed on the mobile device, and on initial launch, the software may synchronize with the widget service website and download all the mobile widgets that the user has chosen. In certain embodiments, the user's registration can be conducted on a traditional home computer. However, in some embodiments the registration can be conducted on a mobile device.

Web Registration

Figure 10:
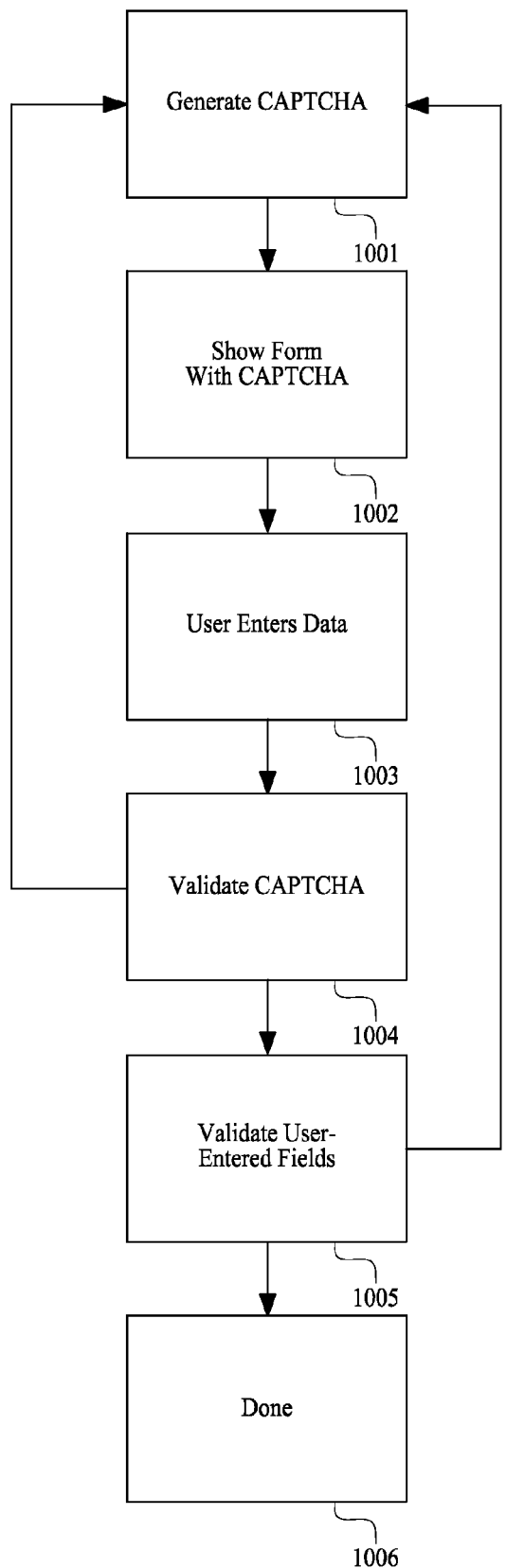
FIG. 10 is a flowchart illustrating a method of registering a user for the access of the widget service according.

FIG. 10 depicts the elements taken in one embodiment of user registration (1001-1006). The registration system may require a user to enter data (box 1003) such as an email address (which may serve as a unique user name), a password to associate with the account, and a duplicate password to confirm that the password was entered correctly. The system may validate the username and password (box 1005).

In addition, the registration system may prompt for a CAPTCHA (Completely Automated Public Turing test to tell Computers and Humans Apart). This may be a raster image with some garbled text displayed such that humans can read the text while computers have a difficult time reading the text. The server may generate the CAPTCHA (box 1001), display the CAPTCHA (box 1002), and validate that the user identified the garbled text correctly (box 1004) and/or that the user entered valid fields (1005). This test is often used to keep automated programs from registering dummy users.

Once registration is successful (box 1006), the user may be prompted for a phone number or additional email address to send installation instructions to. In the phone number case, the system may send an SMS containing a download link for users to download the mobile client. The download may proceed when the user selects a link in the message that appears on their mobile device. The mobile client can optionally be embedded with a unique identifier for user identification. This way, the mobile client can download content from the user's account without having to enter login information.

Unique ID Generation

The ability to track individual users may be helpful. Sometimes, it is desirable to be able to track unique users as they access the server system from various mobile devices. Ideally, a device may transmit its own unique identifier to the system. Such a system exists for some mobile devices. One such tracking mechanism is called an MSISDN (mobile subscriber ISDN number). There could be a unique identifier that is embedded on the device or the user's phone number of the device. However, such tracking information is sometimes filtered by carriers. Therefore, the system may assign unique identifiers to the users when they first initialize the application.

Online Mobile Widget Gallery

Figure 6A:
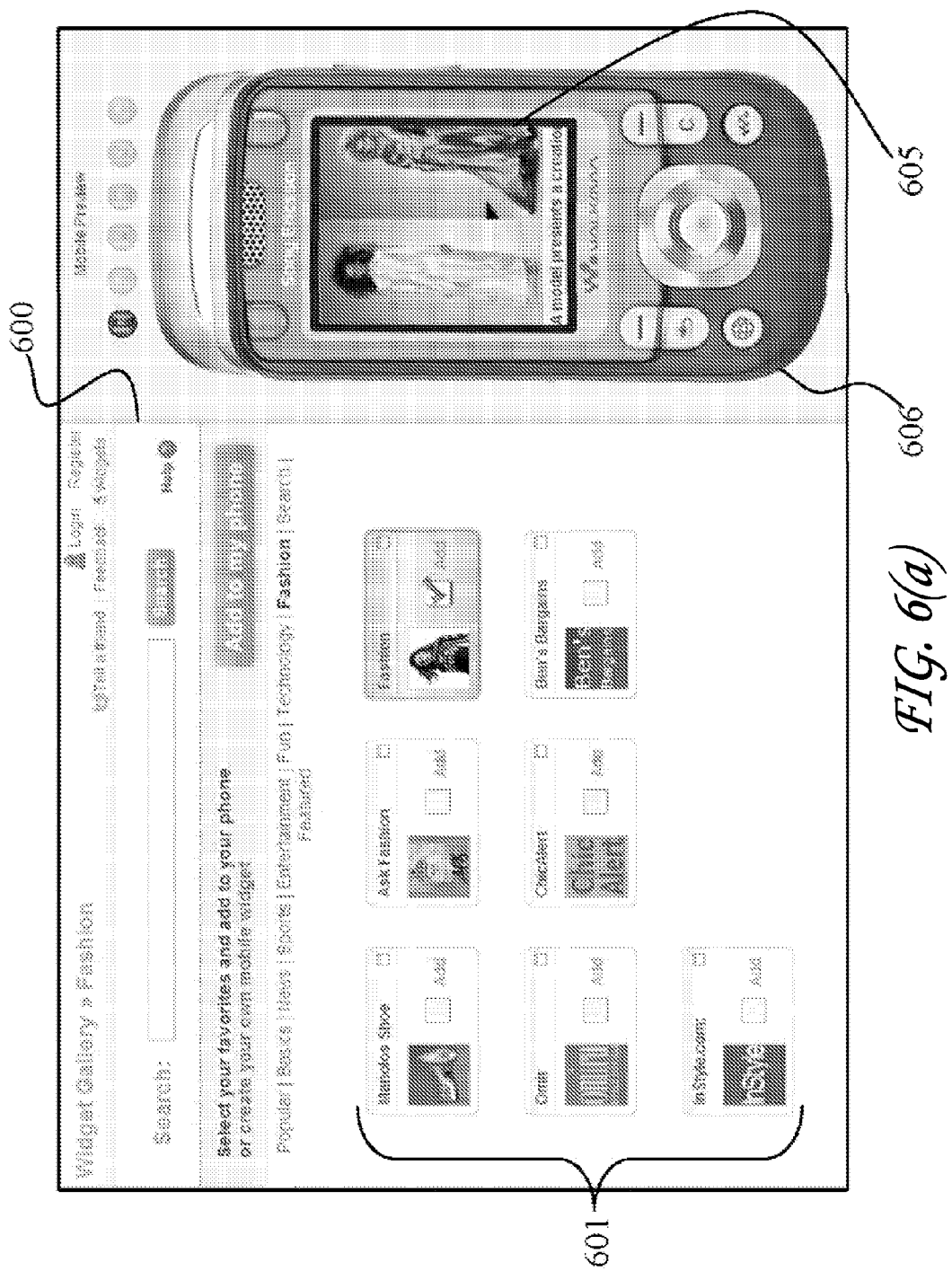
FIG. 6(a) is an exemplary view of the mobile widget gallery provided by a web front-end.

FIG. 6(a) illustrates a gallery 600 of mobile widgets 601 according to one embodiment. Users who visit the web or mobile front end may browse through the gallery and select the ones they want on their mobile device. The gallery 600 may offer categories, tags, and groupings by location and preferences. Users may thereby browse and select mobile widgets 601 to install on their mobile device. A widget-execution engine may be configured to request a download from the gallery. The user may also be provided with a preview 605 of the mobile experience using a mobile phone emulator 606.

Figure 6B:
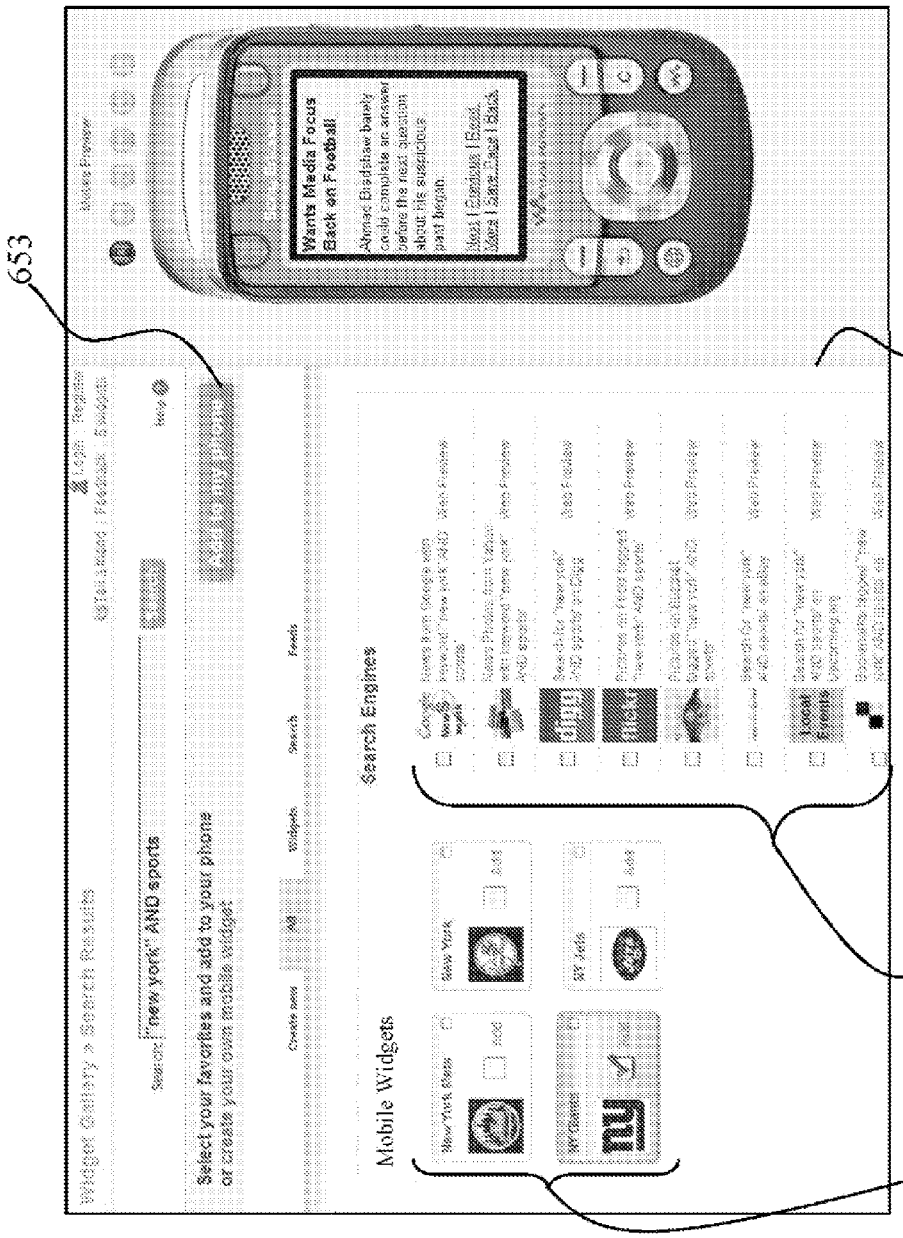
FIG. 6(b) is an exemplary view of the mobile widget search results provided a web front-end.

The gallery may also be searchable. FIG. 6(b) illustrates an exemplary search result display 650 according to one embodiment. Users may select mobile widgets 651 by searching for information such as "New York Giants" or "Tiger Woods". The system may search through all available mobile widgets in the system and provide results. In addition, the user may be provided with links 652 to results generated from popular external search engines such as Google Search or Yahoo Search. As an example, a mobile widget may be generated for Google search results on "New York Giants". Then the user may be able to add this widget to his mobile device by selecting it. Additionally, search results may include external web site results which match "New York Giants". If the user selects these results, a new mobile widget may be created with the selected web site as the data source.

Users may gather all the widgets they need by browsing or searching through the gallery, and all their selections may be saved in the session. When ready, a user may click the "Add to my phone" control 653 to add the selected mobile widgets to his account. At this point all these widgets may be added to his account and become available on the mobile device the next time the device performs a synchronization session (see section "Sync Engine") with the server. If the user is not registered, the user may be presented with the registration element previously shown in FIG. 5(d) to create an account, and may further receive an SMS or email on his mobile device to install the widget service client for the first time.

A server may provide a gallery of software widget applications. Users of mobile computing devices may browse the gallery of widget applications from the mobile devices. The server may receive requests from the mobile devices for downloading widgets and the server may respond electronically sending a widget application to be downloaded and causing it to be installed. The mobile device itself may provide a gallery that provides such functionality, where the objects and information in the gallery may in whole or in part be downloaded in the absence of a request by a user. Thus, a mobile device gallery may download widget information, the user may subsequently (e.g., a week later) review the widget information and may mark a widget for download, and the mobile device gallery may subsequently (e.g. at the next network connection or at a time of cheaper data or bandwidth costs) download and/or install that widget. Both a device-based and server-based gallery may use user profiles to determine which widgets to install or recommend.

Managing Mobile Widgets from the Web

Figure 7A:
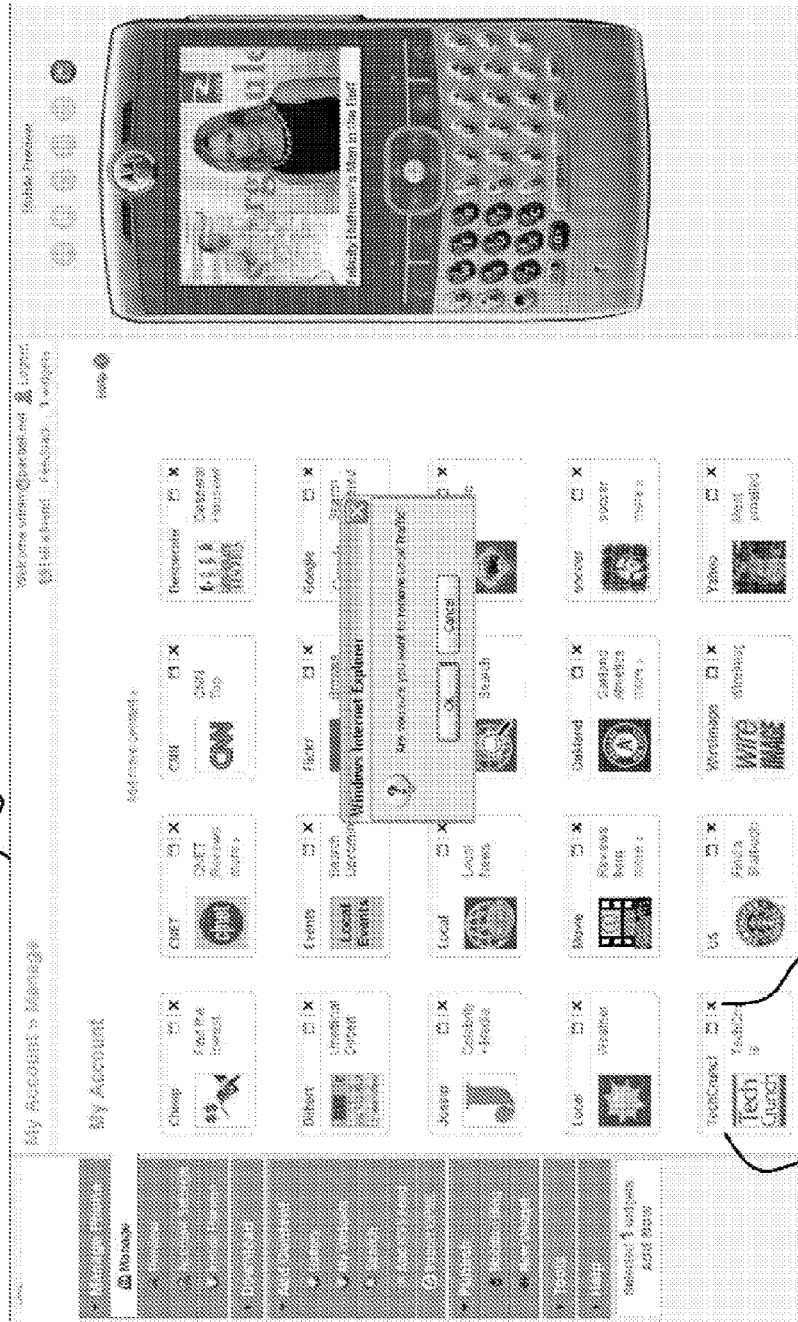
FIGS. 7(a) and 7(b) depict exemplary views for managing mobile widgets from the web front-end.
Figure 7B:
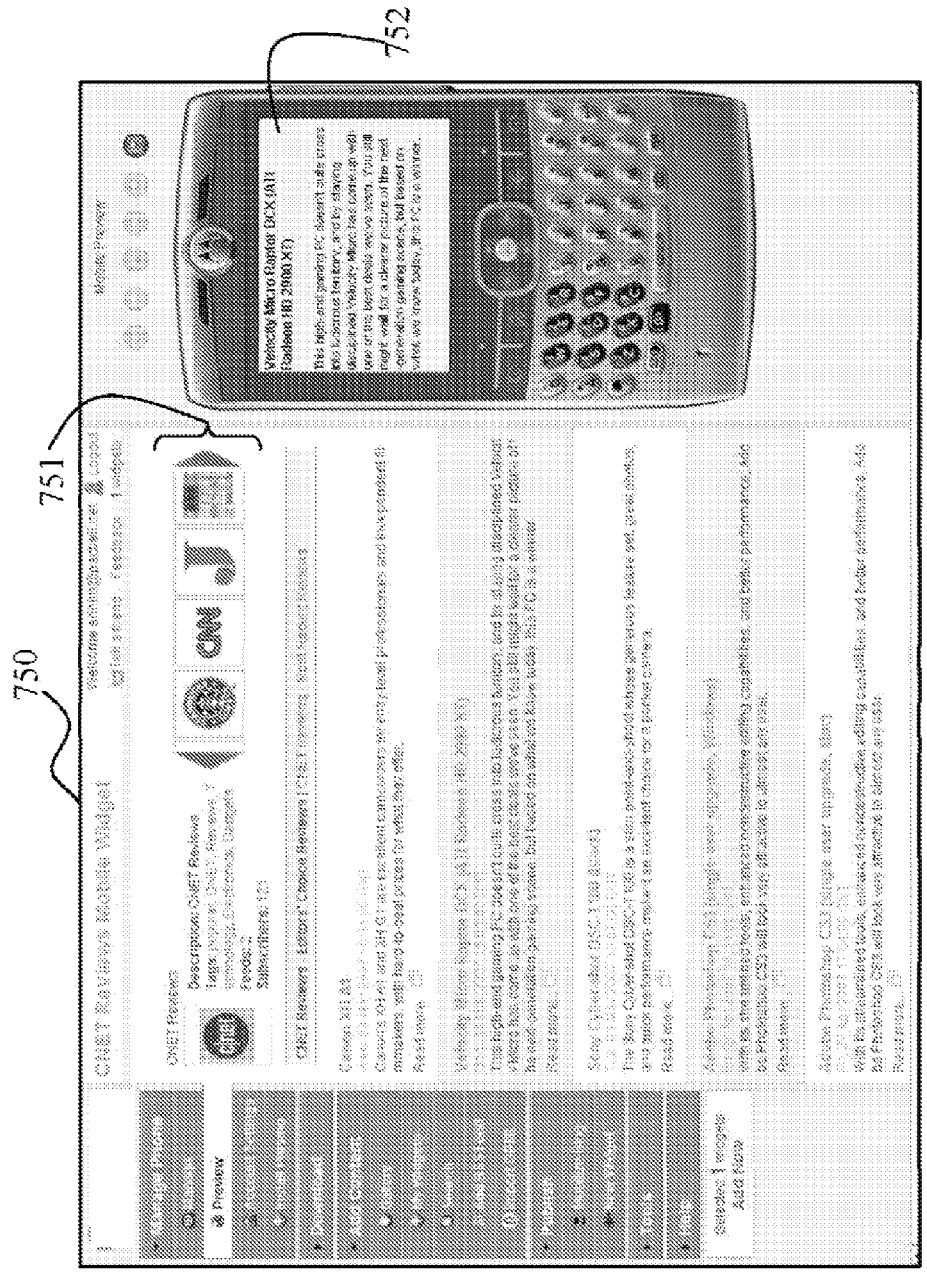

The web front end may also provide an interface for the user to manage his mobile widgets from the web. FIG. 7(a) shows an exemplary mobile widget management display 700 where the user may be provided with all his currently active widgets. Here the user may delete a widget by simply clicking on the "X" 701 on a widget icon 702. Then the widget may be removed from his account. He may also add any widget from the gallery 600 (FIG. 6(a)) to his account. All changes may appear on the mobile device after the next synchronization session. Further, as in FIG. 7(b), the user may preview all his mobile widgets on the web. Though this exemplary preview screen 750 displays the widgets in a horizontal scroller 751, note that they may also be displayed just as they would appear on the mobile client device. For example, a mobile preview screen 752 may replicate how the widgets will actually appear on the mobile device. The mobile preview screen 752 may have the exact screen dimensions, resolutions and appearance as the user's specific mobile device.

In some embodiments, users may also manage their widgets directly from the mobile device. Many users worldwide may never have access to a desktop computer. Such users may perform all actions including registration, login, browse the gallery, search and add mobile widgets, remove mobile widgets, preview the widgets, and the like right from their mobile device from the embedded mobile browser and from the widget service client software installed on the device.

Mobile Widget Recommendations Based on Collaborative Filtering

Since many mobile widgets may be added to the widget service's mobile widget repository, it is desirable to make it easy for users to pick and choose the widgets they may like. According to one embodiment, a built-in recommendation system uses users' preferences, such as interests, reading patterns, and location, and recommends other mobile widgets that the user may be interested in. This may be achieved through integration with a standard available collaborative filtering system such as Taste, CoFI, or Consensus.

According to one embodiment, the recommendation system may suggest other widgets that a user may like. As an example, consider a user from London in United Kingdom. If she has widgets such as Tube Delays, Local TV guide, and BBC news, based on the interests of other users in the same location with the same widgets, the recommendation system may suggest a set of widgets for her to add. The recommendations may be made both in the web front end and in the widget service client software.

Widget Management

In one embodiment, users can manage their widgets on the mobile client. Users can reorder widgets and remove widgets from their mobile client without needing server connectivity. These requests may be queued on the client and rendered appropriately to the user. When the user connects back to the server, these queued requests may be transmitted to the server for the server to process and reconfigure the server-side image of the widget.

In another embodiment, the mobile client 141 may have an offline gallery of applications that the user can browse to add additional widgets. This gallery may be periodically downloaded by the server against the server. Users can browse this gallery to add new widgets without connecting to the server. Then, when the widget is to be added, a server connection is created and the widget is downloaded and subsequently installed.

The mobile device or mobile client 141 may contain a widget-adding component which may be designed to view and/or obtain widgets for testing or installation on the device. The widget-adding component may access the server 110 or the offline gallery.

In one embodiment, installation of new widgets occurs as follows: A user adds the widget to their account. This may be done either through web/WAP site or through another mechanism that has a real-time connection to the system. The system can perform the request as follows: First, the appropriate widget may be located. Then, an entry may be created in the database that marks the widget as "installed" for a user. The widget may then be transmitted to the mobile client when the client 141 connects to the server. Widgets may have server-side and client-side portions of each package. The client-side portion is transmitted to the client 141. The client 141 accepts the package, which is then unpacked by the client. The widget may then be stored in the widget storage with meta information describing the widget. Then, as the client runs, it may pick up the widget for display when appropriate.

The mobile client may include a widget discovery manager component. The discovery manager may contain a pointer or other reference to an online gallery of widgets, or other repository or network location of data. The discovery manager may, from time to time, download widgets, information, or other references to or descriptions about widgets, from the repository. The discovery manager may store the widgets, information, or other references on the mobile device for offline access and availability to the user. Such widgets or information may be displayed or previewed for the user. The discovery manager may perform such a download in the absence of a request by a user, and the manager may preempt, interrupt, or otherwise notify the user of downloaded (or to-be-downloaded) content, including widgets and references. The discovery manager may provide for any downloaded widgets to be installed, either automatically or pursuant to authorization by a user. The discovery manager may further provide for deletion, uninstallation, or reset/reinstallation of widgets or information, either automatically or at the request of a user or transmission, of preferences or other information to a server (and thus perhaps changing the types of information to be downloaded in the future). Installation may include placing a widget (or other data) in a memory or store of a device such that the widget may be accessed, displayed, selected, or terminated repeatedly Widget discovery or download may make use of user profiles associated with the user or mobile device.

The discovery manager may generally access any network or interactive resource as a location for widgets, including an online gallery. The discovery manager may generally search or crawl a network resource, may browse a collection of resources, or may visit a URL. The gallery may display widgets, or crawl for widgets, based on a query by the user. The query may be handled by the discovery manager or the network resource or gallery. Query results may be presented to the user on a display. The discovery manager, or another component, may also personalize widgets, such as by causing them (or creating them) to display specific data representative of a user, user attribute, or user interest or content.

Widget Sharing

Figure 32:
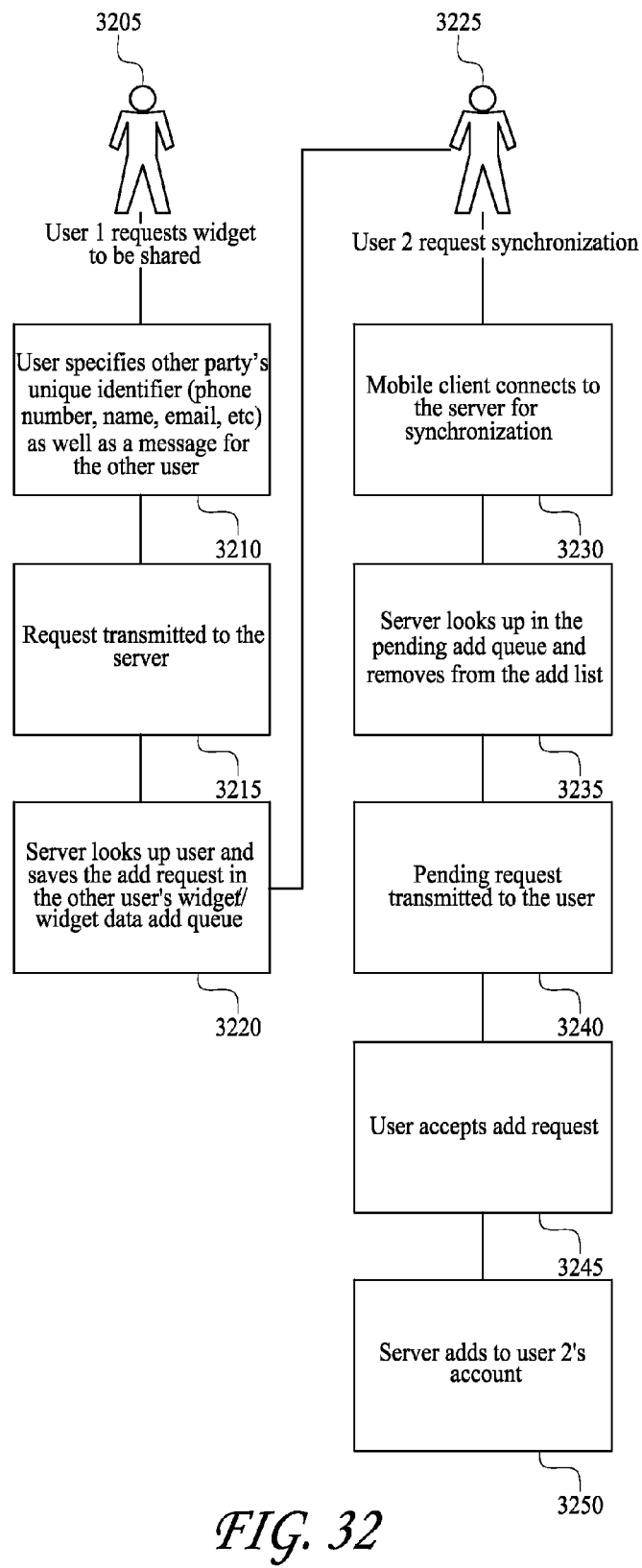
FIG. 32 is a flowchart illustrating the processes for sharing widgets amongst users.

In one embodiment, the widget meta-data may be stored on the server 110 as a database entry. Widgets and widget data can be forwarded to others regardless of the accepting party's mobile operator or device. FIG. 32 depicts one embodiment of this process. In this embodiment, the originating party makes a request to send a widget to another party (3205). This can be by specifying the widget and the other party's identifier (3210). The identifier could be an email address, phone number, or any other unique property of the user's account. A connection may then be made to the server, and the request is transmitted (3215). The server accepts the request and then makes an entry in the database in the other party's account with the widget and a message from the originator (e.g. "Hello friend, try this widget.") (3220). Then, when the other party connects to the server, they may receive this message along with an option to install the widget (3225-3240). Installing the widget may include the client connecting to the server (3230), the server checking a pending add queue and add list (3235), transmitting the request to the user (3240). If the user accepts the installation (3245), the widget may be installed as described above (3250). Otherwise, if the user refuses installation, the widget is removed from the database queue.

Mobile Registration—All Handset Experience

Users can also download the mobile client directly without having to register on the web site first. In this case, the system can create an account for the user from the mobile device.

Figure 20H:
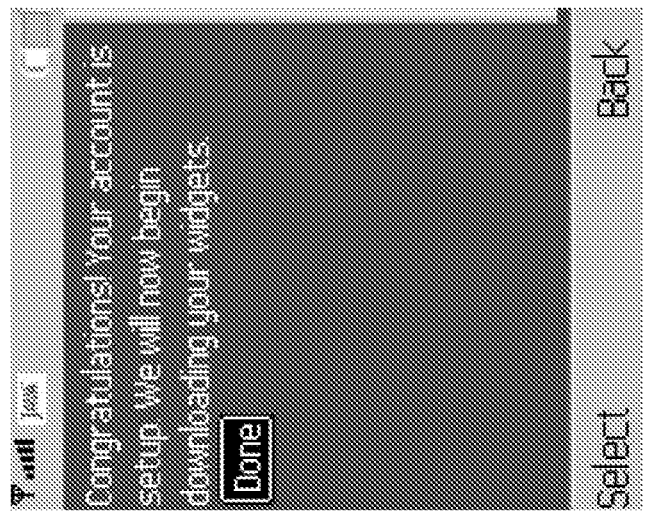
Figure 20G:
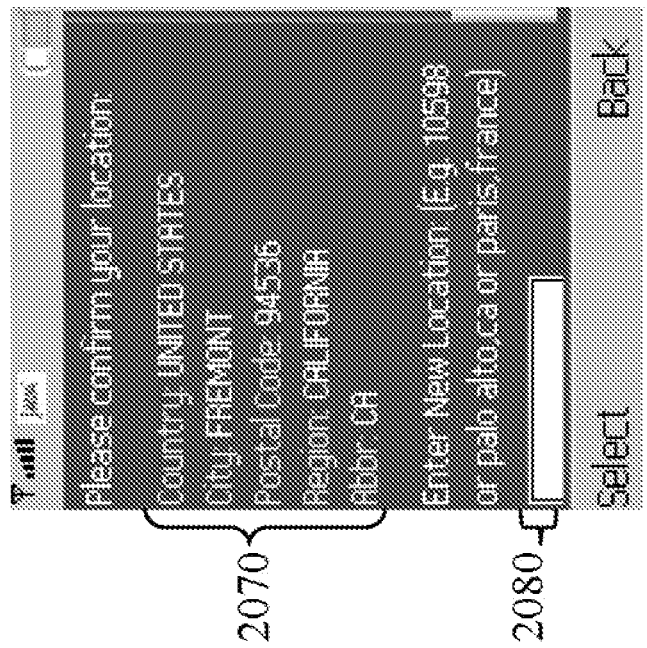
Figure 21C:
FIGS. 21(a) through 21(e) are exemplary displays of a download idle screen according to embodiments.
Figure 21B:
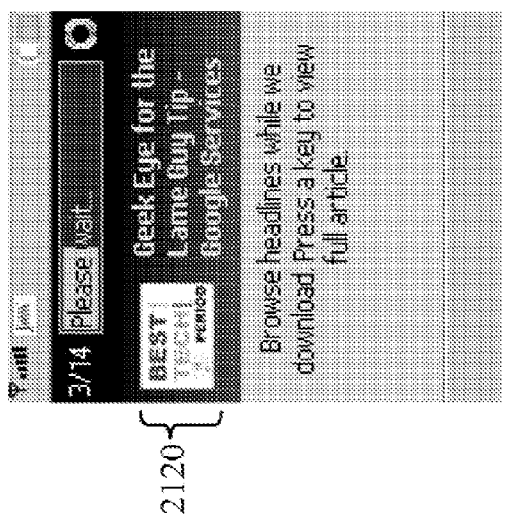
Figure 21A:
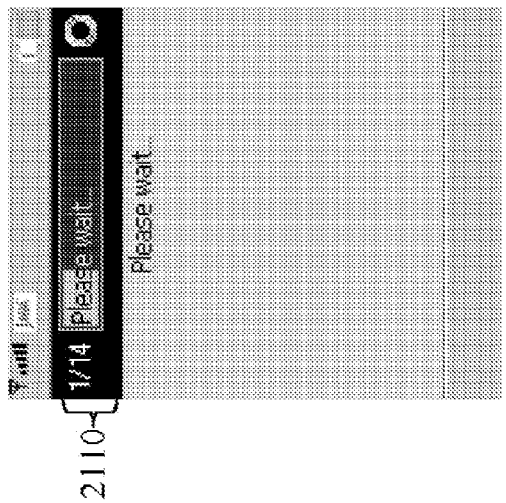
Figure 21D:
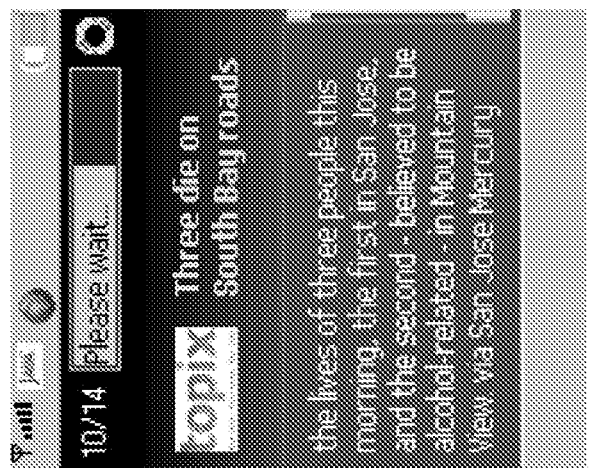
Figure 21E:
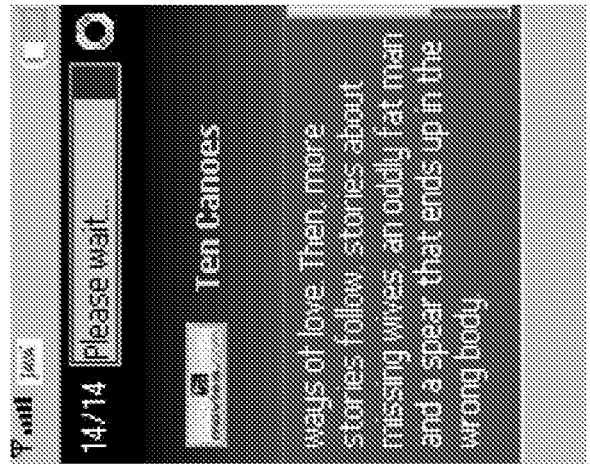

FIG. 20 illustrates one embodiment of the post-download user interface. According to this embodiment, the mobile device connects to the system after download. A login welcome screen may appear (FIG. 20(*a*)). If the user has already registered on the web site, he may enter his login information in a form field 2010. On successful login, FIG. 20(*b*) may appear.

Otherwise, users can select to create a new account. They enter an email address in a form field 2020 (FIG. 20(*c*)). The email address is checked to ensure uniqueness. If not unique, a message 2030 (FIG. 20(*d*)) may appear and a prompt 2040 to enter another email address appears. If the entered email is available (unique in the system), the user can optionally have the system generate a password (to avoid more typing on a mobile device) or to enter the password in a form field 2050 (FIG. 20(*e*)).

Users can then select some categories 2060 that contain predefined widgets for the user (FIG. 20(*f*)). This may be a quick way to get started on the mobile device without having to browse or search for widgets to add.

Further personalization of the user's account is also possible. In FIG. 20(*g*), the user is prompted for their location. Here, the user's location may be approximated by determining the connecting IP (internet protocol) address from which the mobile device is connecting from. Based on this address, the system can map an IP address to a physical real world address via a lookup table of IP addresses to physical addresses. The system may present the computed location 2070. If the automated determination is incorrect, users can enter their location on the form field 2080.

On successful registration, a finish screen may appear (FIG. 20(*h*)).

Provisioning from Website

Figure 11:
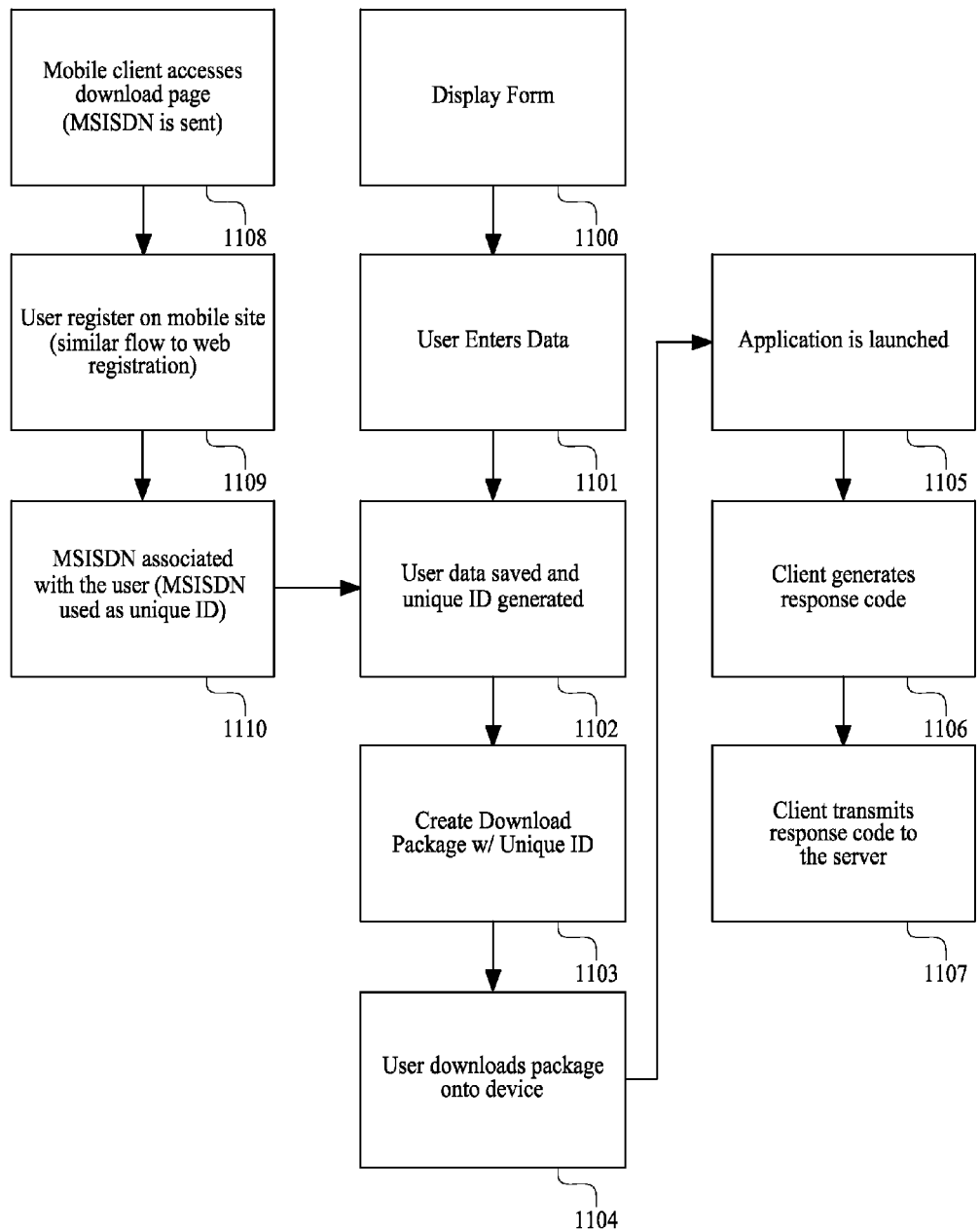
FIG. 11 is a flowchart illustrating a method of generating unique identifiers for users.

In some embodiments, unique provisioning allows tracking of users so that users do not have to re-enter login information from the client 141. It may be easier for users to enter their user information on a PC accessing a web site rather than entering the information from the device. An exemplary method of provisioning from a website according to one embodiment is shown in FIG. 11 and described below:

1. User logs on to a website (1100).
2. User enters registration information such as real name, login name, password, phone number, etc. (1101).
3. Registration information gets validated and saved (1102).
4. A unique key is generated for the user (1102).

5. A download package is created with the embedded key (1103).
6. The user downloads this package onto their device (1104).
7. When the application is launched (1105), a response key is generated on the client (1106). The response key may be hashed against some unique identifier on the device (if possible). This response key along with the key embedded in the package gets sent to the server (1107).
8. The server responds with user account information if valid.
9. Response key gets saved on the device, locking that device to the account.
    a. If the application is copied to another device, the application will not work because it is locked to the previous device.
    b. User can reset the locking from the web site to allow installation on another device. Previously working application becomes locked on the old device.

Provisioning on Mobile

According to another embodiment, provisioning may occur from a mobile device as follows:
1. Mobile user accesses download page. Optional MSISDN (unique identifier for a mobile user) is transmitted to the server (1108).
2. User enters registration information (if required) (1109). MSISDN is associated with the user (if there was one) (1110).
3. Elements 3-9 above in "Provisioning from Website" apply.

Widget Creation

Mobile Widget Creation

Figure 41:
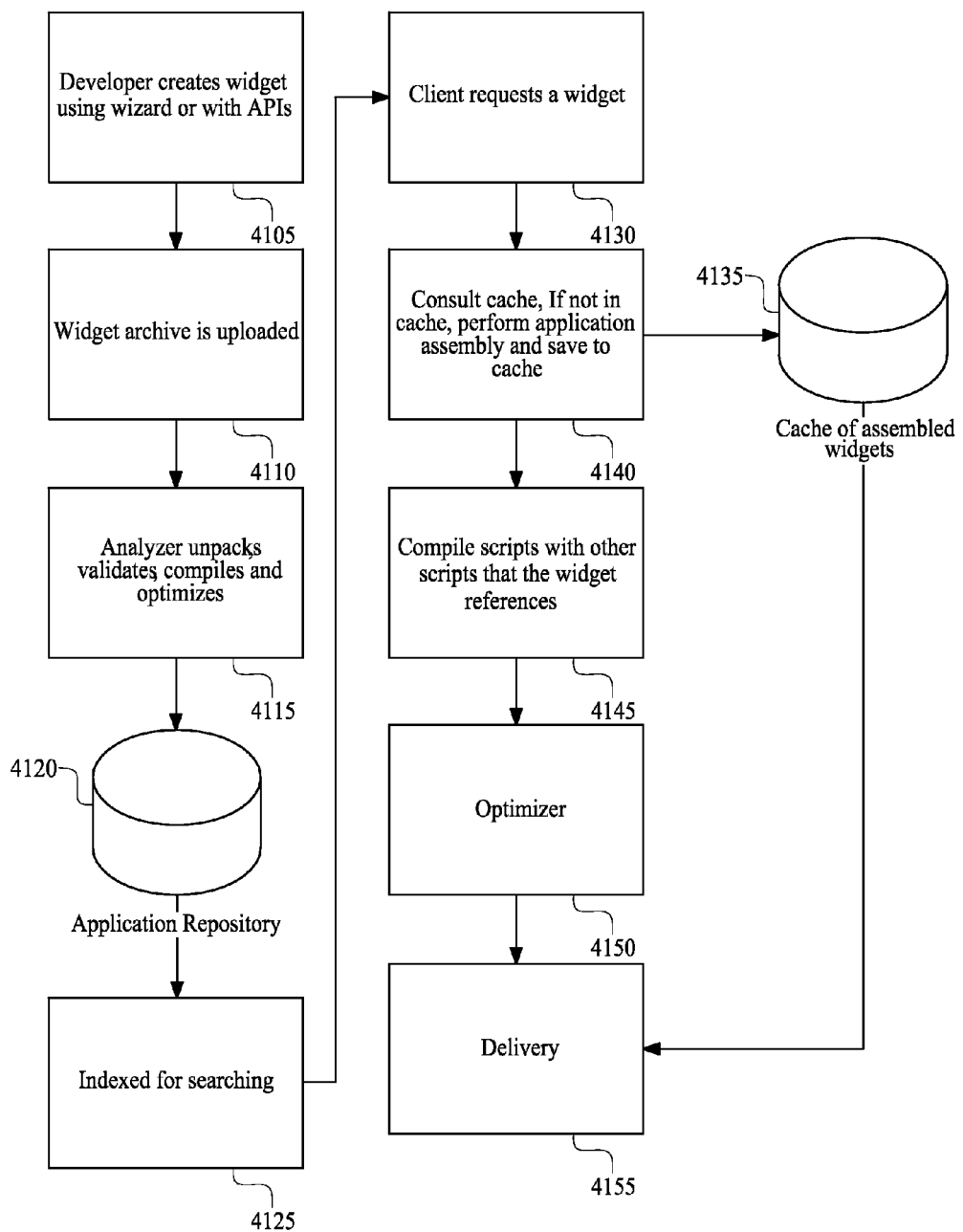
FIG. 41 is a flowchart depicting the elements performed by the widget service to create a mobile widget.

A widget or application archive can contain code, resources, data, and meta information. Code includes the application instructions to execute. Resources include media such as images, sounds, etc. Data is bundled data. Meta information describes the application. FIG. 41 is a flowchart depicting the elements performed by the widget service according to one embodiment, which are:
1. The developer creates a widget using the wizard or with APIs (4105)
2. The widget is uploaded to the server (or fetched from the server) (4110).
3. An analyzer unpacks the archive and accesses and analyzes its content (4115).
    a. Content may include multiple sections of declaratory or markup code (or other code), other sections of code (such as a scripting language, JavaScript or C or Perl or a proprietary or hybrid language), and other resources such as video, text, and/or images.
    b. Compiles some or all of the code into executable byte code, checking for valid syntax and resource usage.
    c. Validates images and transforms as appropriate for different device capabilities.
    d. Validates application size for limits on various devices.
4. Once validated, contents are extracted and stored into an application repository 4120. This repository 4120 is indexed so that applications are searchable by various attributes (4125). Resources are also indexed so that resources are shareable across applications if desired. This can become public libraries of code that get pulled in by other applications as desired. The repository 4120 contains application descriptors that point to the resources required. It also has versioning of applications where correct versions get pulled out.
5. A request comes in for an application (4130). The cache 4135 is first consulted (4140). If not in cache 4135 yet, the assembler builds the application archive given the version and required resources (4140).
6. The script compiler and aggregator combines the resources and code into an archive (4145).
7. The optimizer 4150 makes a small package of at least some of the resources for delivery. This includes compression, unreferenced resource elimination, etc.
8. Results are cached.
9. Delivers to the user using a download method (4155), whereafter the package may be installed on the mobile device.

The server may transmit a given widget to a plurality of mobile devices of different types and different APIs, and may change or not change the widget or the package as necessary to for execution of the widget on the device.

Web-Based Tool for Extracting Data Sourced from Web Pages

Figure 42:
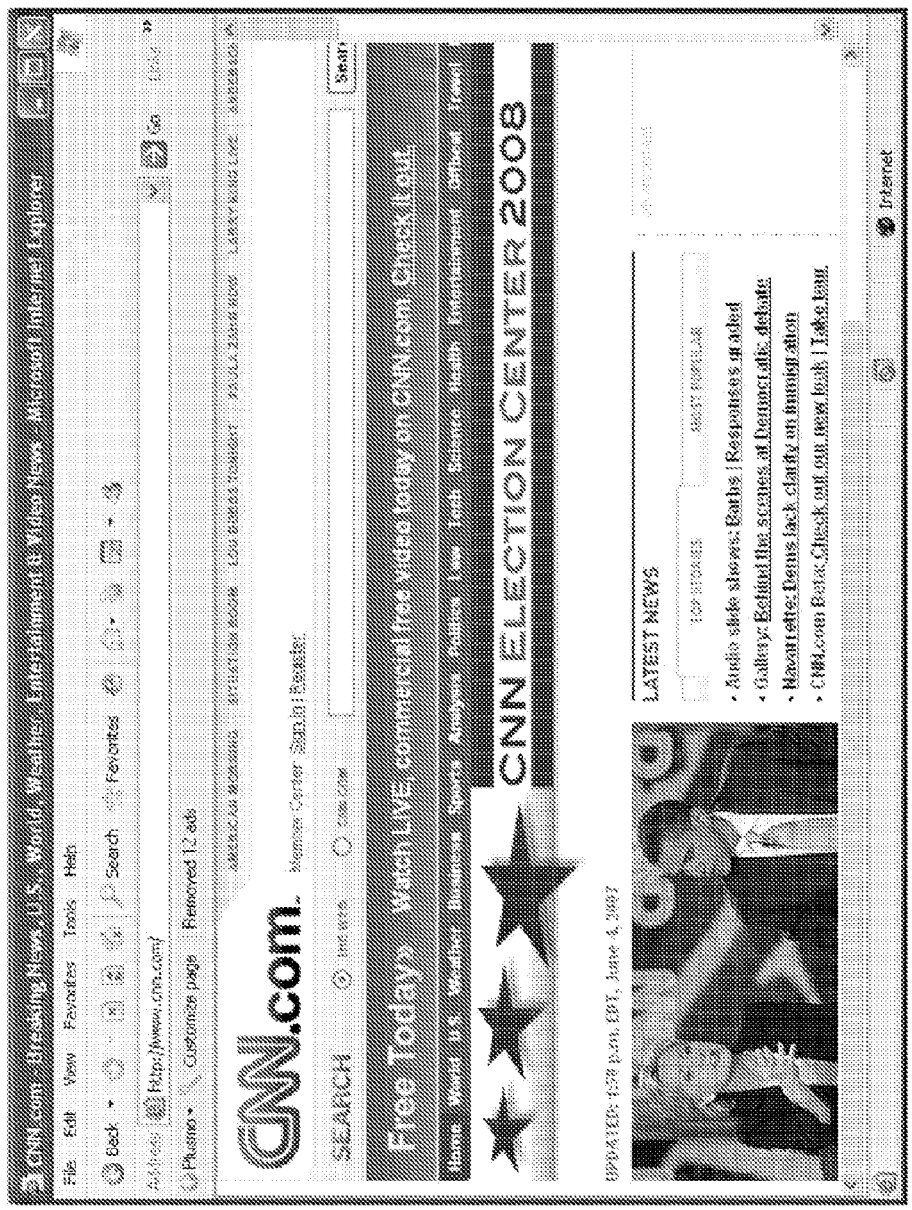
FIG. 42 depicts an exemplary web browser with the data extraction tool installed as a plugin.

The system may include a tool that can be installed on an end-user's web browser that allows for extracting specific areas from a web page and creating a mobile widget using that information as a widget data source. One embodiment of this tool is a plugin for browsers such as Microsoft's Internet Explorer product or a Mozilla Organization Firefox application. According to one embodiment, the tool installs as a plugin that users interact with (see FIG. 42). As a plugin, the tool accesses various browser APIs to determine the page that the user is currently viewing, the elements on the page, etc.

Figure 43:
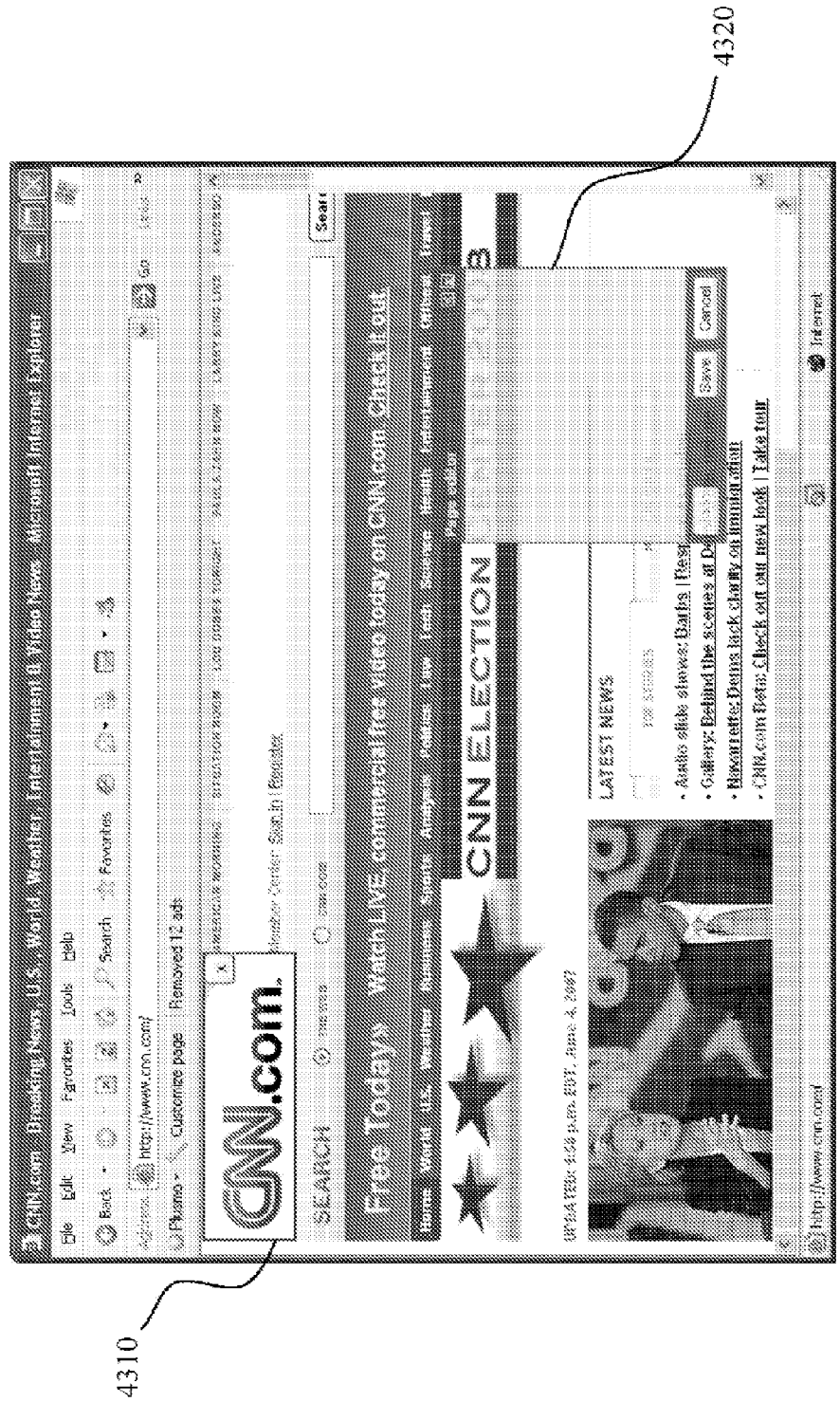
FIG. 43 depicts an element in the extraction process where the user is allowed to highlight and remove various elements of a web page.
Figure 44:
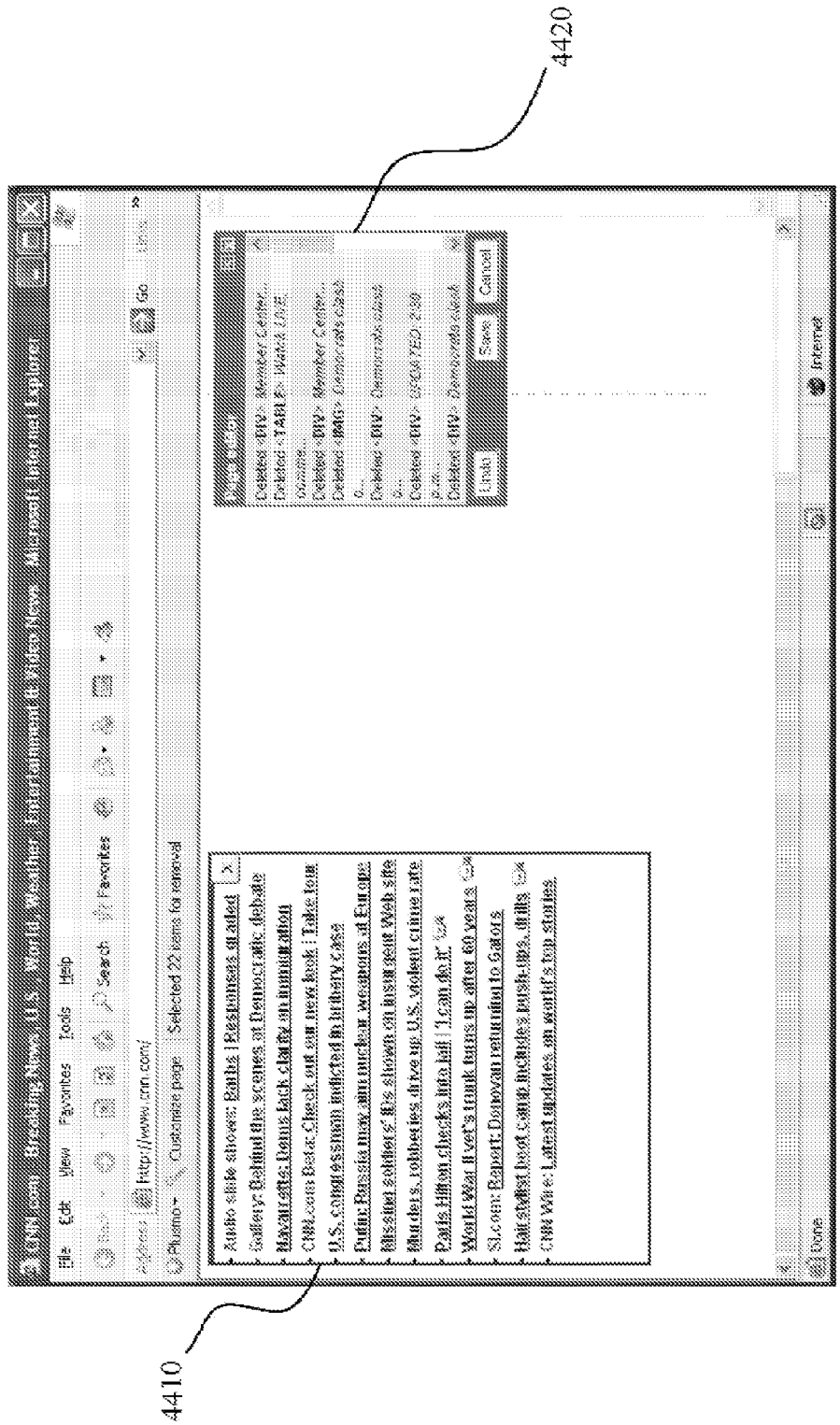
FIG. 44 depicts a final element in the extraction process where the user has isolated a specific information source from the web page for a mobile widget.

Because this tool is able to access information about the page, it can provide features that allow users to select various portions of a page to represent a source of data that the server can consume and hence allow the mobile clients to download. FIG. 43 displays one embodiment of this functionality. In this figure, users use their pointing device (e.g. computer mouse) to highlight areas of a web page, as shown at 4310. A floating window 4320 may display the various actions, commands, and status that users can use to refine the data selection. FIG. 44 displays the completed data selection 4410 whose starting point was from FIG. 43. In this example, the user has omitted the surrounding extraneous images and text and chose to obtain only the entries for "Top Stories". The floating window 4420 may display the various actions that the user took to filter the content in order to obtain the refined data.

Figure 45:
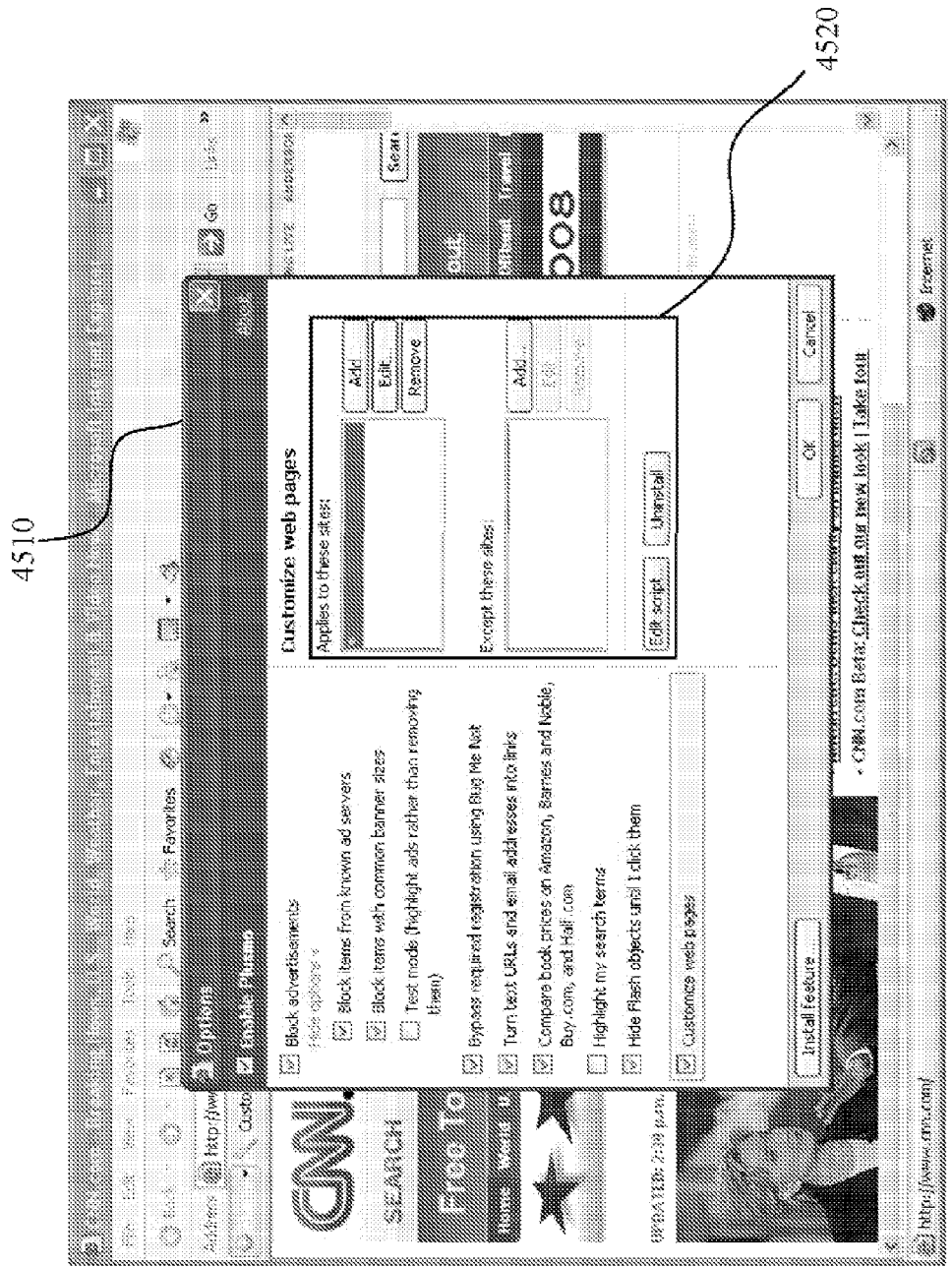
FIG. 45 depicts an options panel offered by the extraction tool where the user can apply different kinds of filters helpful for data extraction.

FIG. 45 displays an options panel 4510 where users can further configure the tool commands according to one embodiment. On the right of the panel is a section 4520 for the user to select how to apply the changes that the user has made. The panel may expose configuration information to filter out web sites to apply the changes to. These filters may be specified using standard regular expressions (regex). So, in the example above, suppose there are two web pages that follow the same page layout and the user wants to apply the changes to both of the pages. To do this, the user may specify the URLs that the changes apply to in this configuration panel.

The various actions as summarized in the floating window 4420 may be then sent to the server once the user has completed the user interface portion of the data definition. When the widget 142 on the mobile browser needs data from this data source, the server 110 may first fetch the web page just as an end-user would do on a web browser. The server 110 may then take the commands and apply them in the same manner as the user did using the tool. Because the dataset is now in a simpler format, the server may take the resulting data and format it for consumption by the widget 142.

Alternatively, this functionality can be applied on the user's web browser without sending to the server. This case is useful for when users want to format a particular web site to the way that they want the web site to appear. For example, FIG. 42 might be too cluttered for a user's liking. Instead, the user can apply the tool to render the view as FIG. 44 such that whenever the user visits this web site, FIG. 44 displays instead of FIG. 42.

Some embodiments may access the Document Object Model (DOM) elements on a web page. These DOM elements may be manipulated to trim, add, and remove entries on the page. The web browser may take care of rendering the result to the user. The tool manipulates the data through the DOM elements. The tool may also trap information about mouse cursor positions, key presses, etc so that users can interact with the tool. If the tool has access to the elements on the page that the user is viewing, this tool can also contain other functionality, such as advertisement filters, search term highlighters, hide animations, etc. FIGS. 43, 44, and 45 show other example functions for which the tool can be in addition to web data filtering.

Mobile Widget API for Building Custom Widgets

Publishers may also create mobile widgets programmatically. A framework for generating mobile wizards may be provided so that developers may create different types of mobile widgets that are not supported by the wizards such as those depicted in FIGS. 37 and 38.

OPML Import from RSS Readers

Figure 8A:
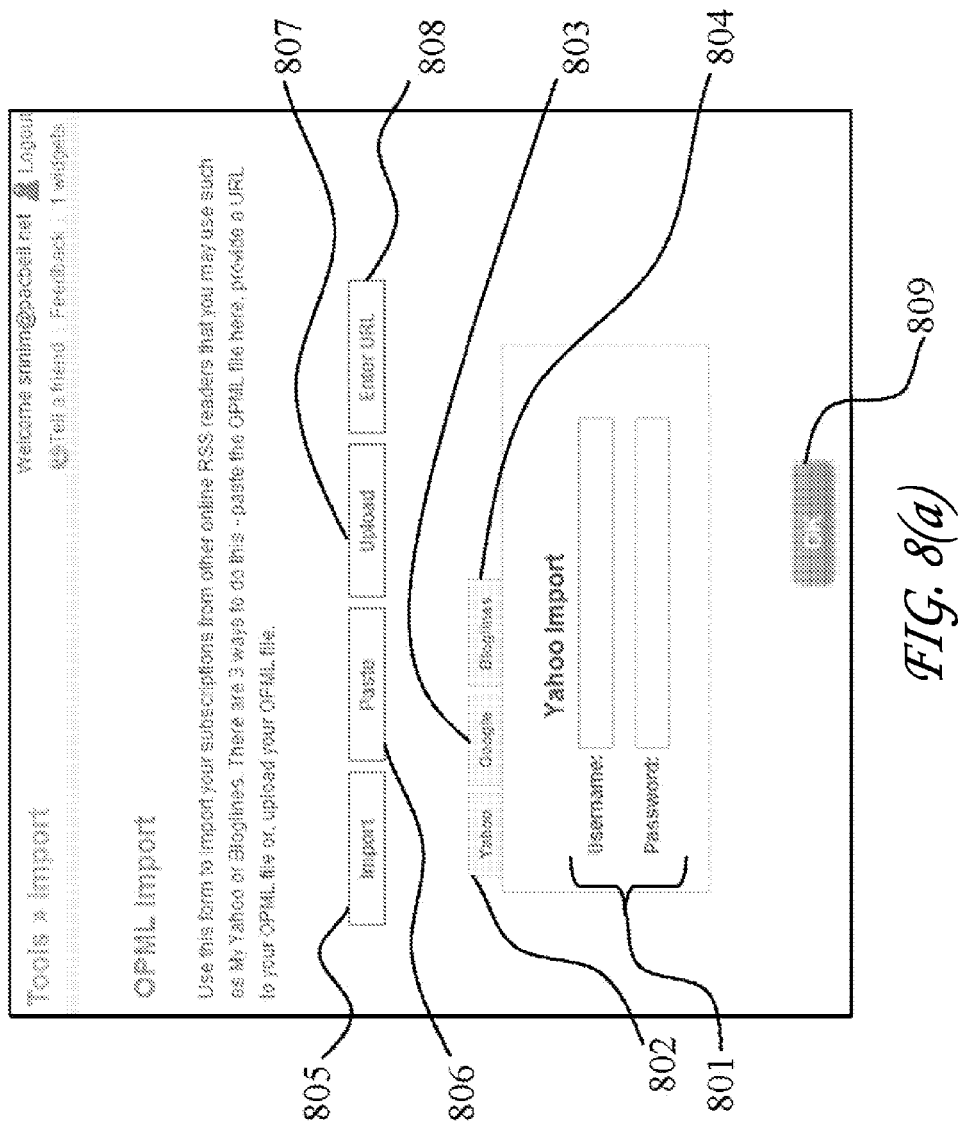
FIG. 8(a) depicts illustrations of several methods of importing user profiles from external systems.
Figure 8B:
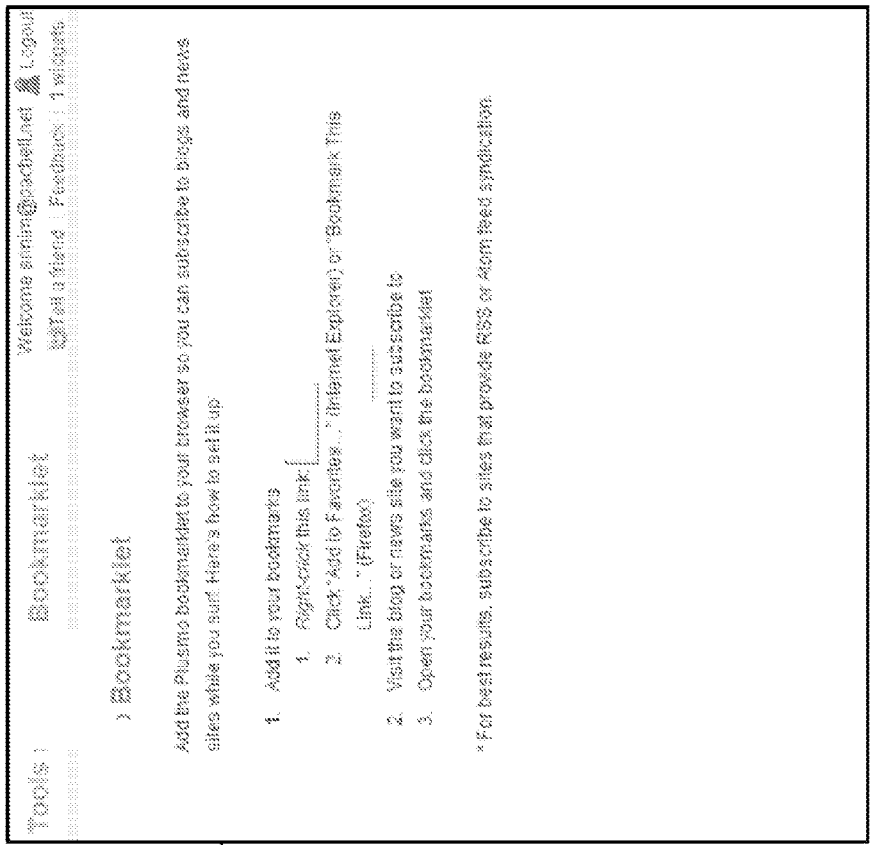
FIG. 8(b) shows an exemplary display for users to obtain the widget service mobile widget bookmarklet and install it on popular web browsers.

Many web users may have accounts on several RSS reader, portals and other aggregator sites such as My Yahoo, Bloglines or Google Reader. The web front end may offer a process for a user who has an account on one of those web sites to import their preferences into the widget service website. Several methods of import may be supported as depicted in FIG. 8(*a*). In one embodiment, a user may enter his login information in an import field 801 and select a control for an external reader suite such as Yahoo 802, Google 803, or Bloglines 804. A second exemplary method is for the user to provide a list of his subscriptions via OPML (Outline Processor Markup Language), a standard XML format for outlines.

There are many possible methods for importing an OPML file to the web front end. For example, the user may paste the OPML file, upload it, or provide a web URL to the file. In one embodiment, the user may select a control labeled Import 805, Paste 806, Upload 807, or Enter URL 808. The system may parse the OPML file and add equivalent mobile widgets to the user's widget service account when he selects an "OK" control 809.

As an example, if the user had a Bloglines account where he had CNN News, CNET News and BBC News as subscriptions, the widget service server may search for similar mobile widgets in the widget service gallery and add it to the user's widget service account. If a particular data source is not available as a mobile widget on the widget service website, a new mobile widget may be created with that specific data source and then added to the system.

Bookmarklet Tool to Add Mobile Widgets while Browsing the Web

Bookmarklets may include lengths of code, such as JavaScript, that users may add to their browser bookmarks. This code may perform some action, either directly or by executing other code which performs an action. As an example, the system may contain a series of bookmarklets to help users add RSS feeds as data sources into various widgets. The user may visit a site containing an RSS feed to add. The user may then execute a bookmarklet which instructs the widget server to add the feed as a widget. Bookmarklets may be saved and used as normal bookmarks. When used as such, they are simple "one-click" tools which add functionality to the browser.

FIG. 8(*b*) shows an exemplary display 850 for users to obtain the widget service mobile widget bookmarklet and install it on popular web browsers such as Microsoft Internet Explorer or Firefox. Users that have the bookmarklet may be able to gather mobile widgets to their mobile device while browsing the web from their desktop. The bookmarklet may appear in the web browser as an "Add to Widget Service" bookmark link.

As an example, a user with the bookmarklet installed, visiting the web site www.about.com, may simply click on a bookmarklet link while the web browser is pointed to www.about.com. The bookmarklet may then add a mobile widget that represents this selected web site to the user's account on the widget service website. If a widget does not exist, a new mobile widget may be created for the selected web site. Note that even in this case, if the user does not have a widget service account, he may be presented with the elements to register and get the widget service software on his mobile device. After he downloads and installs the widget service software client on his mobile device, he may then able to use the specific widgets added by him via the bookmarklet on his mobile device.

In one embodiment, bookmarklets work as follows: The bookmarklet may contain JavaScript code that may be saved in the user's web browser bookmarks entry. When the user selects the bookmark to execute while the user is viewing a web page, the script may run. The script may get the web site URL that the user is currently viewing. It then passes this URL to the server 110. The server 110 may receive this URL. It may then process the URL by grabbing the page that the user was viewing. From that, it may collect information about the page to be referenced and may even create a new mobile widget if one doesn't already exist for that page. Once the data is in the system, the user may proceed to browsing to other sites with his browser. This mobile widget may be available in the user's account while using the widget client on his mobile device.

Adding a Mobile Widget from an Affiliate Web Site

Figures 9A, 9B:
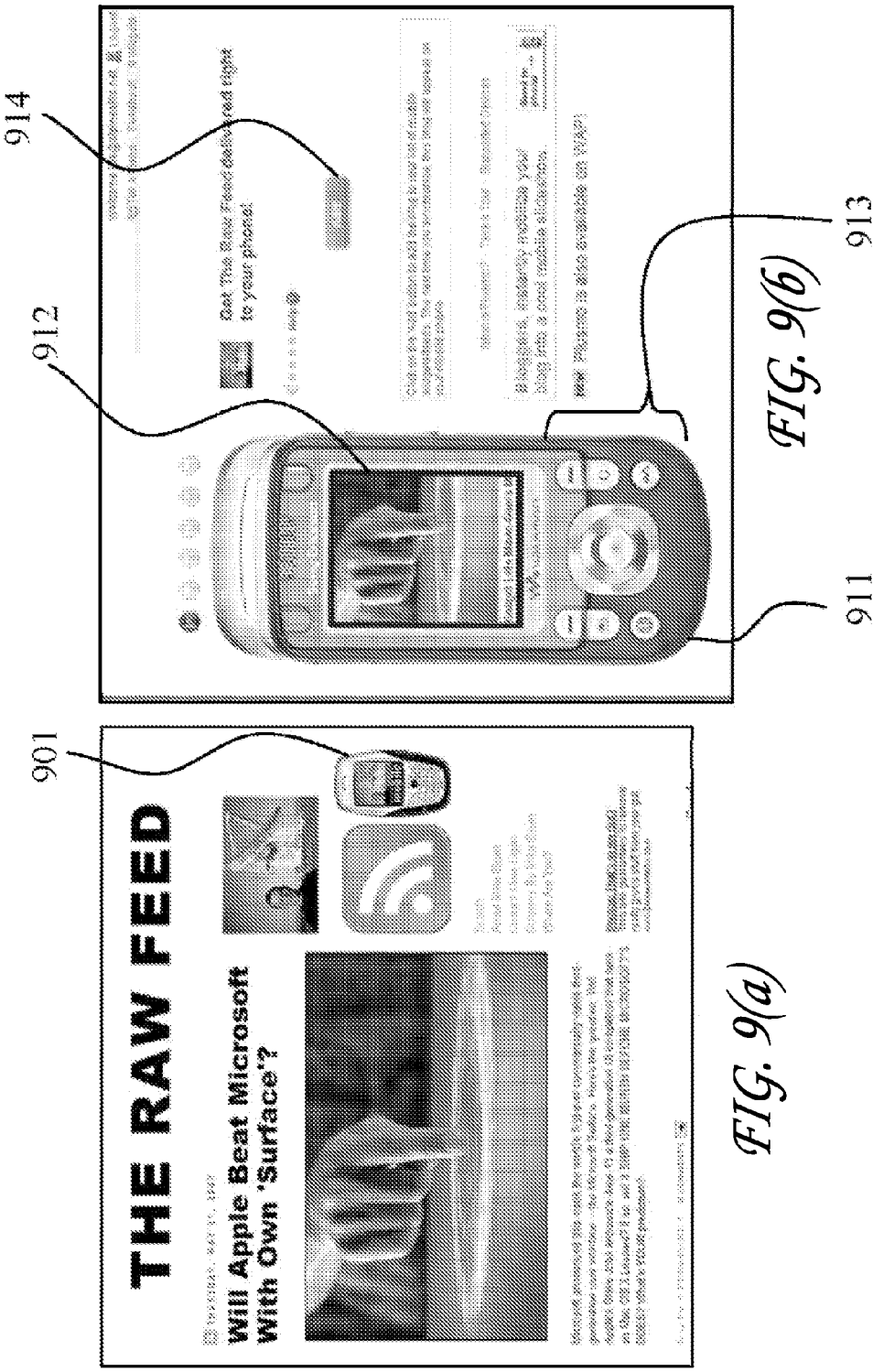
FIGS. 9(a) through 9(d) depict exemplary views for adding mobile widgets from external affiliate web sites.
Figure 9D:
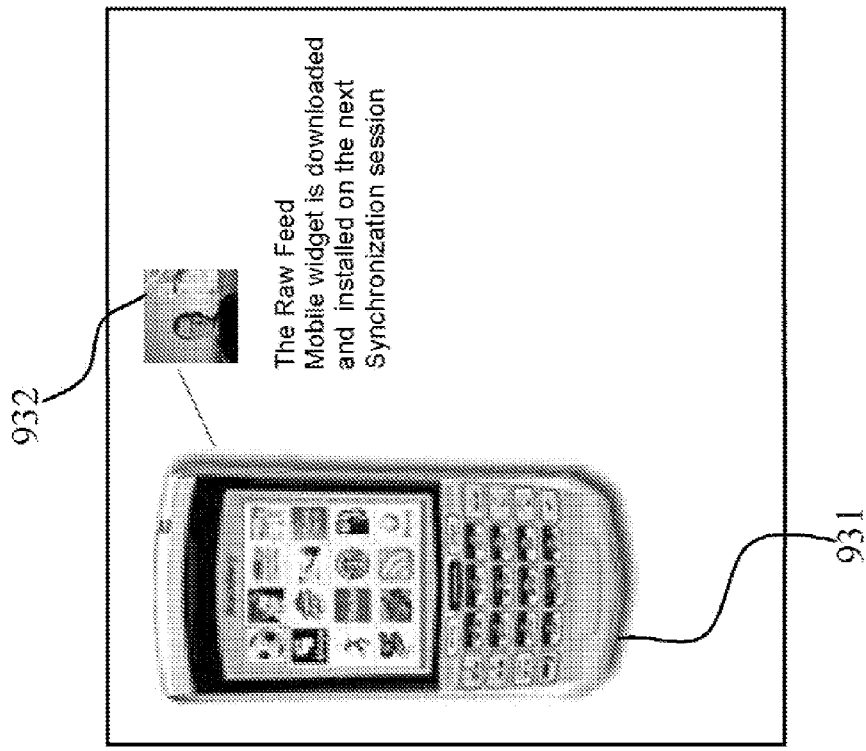
Figure 9C:
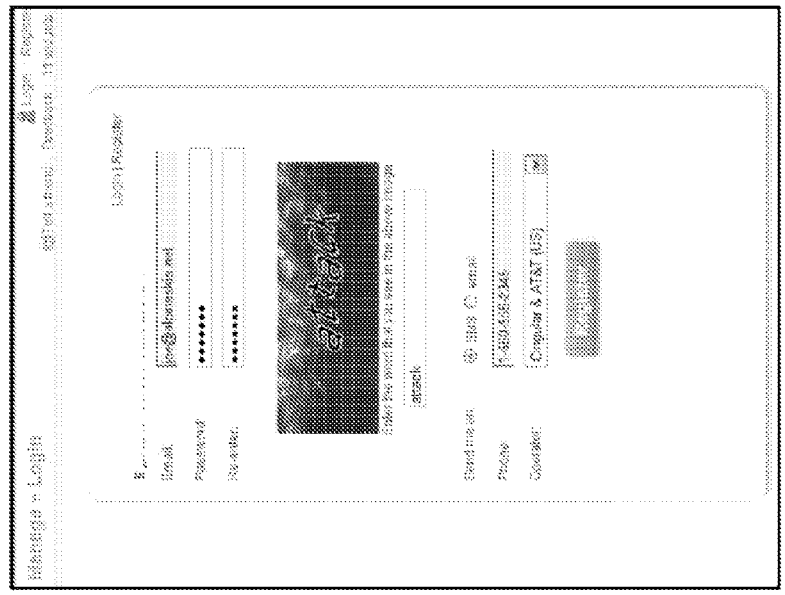

FIG. 9(*a*) depicts an exemplary web site "The Raw Feed". The publisher of this website has generated a blog control 901 and has displayed it prominently on his web site. The elements for generating the blog control are described below in "Creating a Blog widget" and depicted in FIG. 38. A web site visitor who visits the "Raw Feed" web site may click on this blog control to obtain the "Raw Feed" mobile widget.

According to one embodiment, when the visitor clicks on this control, he may be redirected to preview page of that blog widget (see FIG. 9(*b*)), where the user can see a live preview of the blog widget in various mobile phone emulators 911. In this exemplary preview, users may be able to experience the mobile widget 912 right on the computer. The emulator 911 may display the widget in several popular devices from vendors such as Sony Ericsson, Motorola, Nokia, and BlackBerry. Users may be able to use the emulator controls 913 to view a simulated experience of the Raw feed as a picture slideshow. Once the user decides that he wants the widget on his mobile device, he may register and add this mobile widget to his phone. If the user is registered on the widget service server system, he may login at this element. If he is not registered, he may be asked to register first with a form as depicted by the exemplary form in FIG. 9(*c*). If he is already registered and logged in, he may have the option of directly adding the mobile widget to his phone by clicking the "Add" control 914. Text may be presented to the user, e.g., "Click on the 'add' control to add the blog to your list of mobile widget feeds. The next time you synchronize, this blog will appear on your mobile phone!" or similar. Additional text may say, "Bloggers, you may instantly mobilize your blog into a cool mobile slideshow . . . Click here to send to someone's mobile phone!" or similar.

In one embodiment, if the user has created an account for the very first time, and registered for the mobile widget service this way, the user may get an email or SMS message on his mobile device to install the widget service client software, and, once installed, this mobile widget may then be downloaded onto his mobile client. If he already has an account, he may automatically receive the widget on the next synchronization session with the server system. FIG. 9(d) shows a view of an exemplary user account with the widget service client software running on a Blackberry device 931, where the exemplary "Raw Feed" widget is downloaded and displayed as an icon 932.

Thus, it is possible for web users to directly add mobile widgets from publishers' web sites as they browse their favorite sites on the Internet. Note that while this example describes a use case from a web log publisher, similar elements may be used by any content publisher including web portals, aggregators, web services, web video sites, and the like.

Metrics and Analytics

Upload/Download Metrics

The client and server may maintain counters for data usage. This data usage may be used to limit the amount of content a user is allowed to send and receive. This is helpful when a user wishes to limit their bandwidth usage to save on mobile data costs, for example. These metrics are also useful in collecting usage information. This information may in turn be used to optimize server performance by allocating more resources for certain types of content that requires more bandwidth.

The user interface may contain configuration parameters that end-users can specify to limit their bandwidth usage. When the server determines that the client has received the limit on the amount of information, it may stop sending data to the client. Similarly, the client may also store size limits locally so that if it receives more data than the threshold set on the device, it can stop receiving more data. This limit may be parameterized to reset at certain times (e.g. once a month after a billing period).

Analytics and Measuring Usage

Information of widget usage by end-users may be gathered for analytics, learning user behavior and for recommending other mobile widgets based on a user's tastes. Here we describe the kinds of information gathered by the system and how the information is gathered by the analysis subsystem. The UniqueID method described earlier allows uniquely identifying a specific user. Since widget service client software 141 (FIG. 1(b)) enables mobile widget usage in an offline mode even while not connecting to the server, such as on an airplane or when there is no wireless connectivity, it is desirable to gather analytics even when the users are not connected. Thus, each time the application is used by an end-user to view a mobile widget, the client may gather information on, for example, when the application was launched, which widgets were used by the user, and for how long the user stayed on each widget. This data may be saved locally on the mobile device 140 and then posted to the server 110 during synchronization.

The server 110 can gather and allow processing of this information to learn both macro level patterns and individual patterns using standard business intelligence software such as Cognos or BRIO. Examples of macro level usage patterns include being able to answer questions such as: "what are the reading patterns and interests of male users ages 18-25 in the Continental United States?" or "How popular is the weather widget during winter in Canada?". Examples of individual patterns would be "Who are all the active subscribers to the NFL and College Football mobile Widgets?". The system 110 may be able to perform various kinds of analytics on the usage of mobile widgets based on the data gathered by the system.

Some embodiments of the system can also use this data for recommendations to other users by providing some usage data. An example is the number of subscribers to a widget or the number of times a widget is accessed or by user rankings of widgets.

Ad Syndication Engine

Some embodiments of the server 110 include an ad syndication engine 409 (FIG. 4(a)). The ad syndication engine 409 may store and determine when and how to deliver advertisements to users. Advertisement delivery can be based on user demographics, capable devices, certain events, etc. Advertisements may be presented in real-time, offline, online, and/or contextually.

Location Engine

Even without the benefit of specific location-detecting mechanisms on mobile devices (such as GPS), the location of a device may be determined by using the connecting IP address. Each mobile device 140 that connects to the server may send an address to send a response back to. According to one embodiment, the server 110 may use this response address to approximate the user's location. The server may perform a mapping to a physical real world address via a lookup table of IP addresses to physical addresses. The mapping may occur in a database that contains the IP addresses to physical address mappings. The structure of the database may contain IP address ranges (from and to addresses) and a real-world physical address for each entry. A comparison of an IP address against the IP address range may determine a match.

Widget Hosting in the Application Repository

Along with the client-side components of a widget 142 (FIG. 1(b)) that the mobile client 141 can download, server-side components can also exist. According to one embodiment, widgets exist in packages that contain a manifest. The manifest may describe the package contents as well as additional external resources that are required.

A widget package can contain resources that the client keeps (and hence does not need to access the server for functionality). Examples include images, HTML page snippets, scripting code, etc. Further examples include widget-specific data such as currency rates, audio and video files, svg files, text files, general data files. The manifest may describe the resources, the name of the application, version, external resources (that need to be downloaded), etc.

The server 110 can host resources that are required but not downloaded by the client. Examples include database queries where it may be infeasible to download an entire database to a mobile client and each of the examples listed above. Instead, the server 110 can host a component that makes database requests and relays results to the mobile client.

Device Detection

Figure 18:
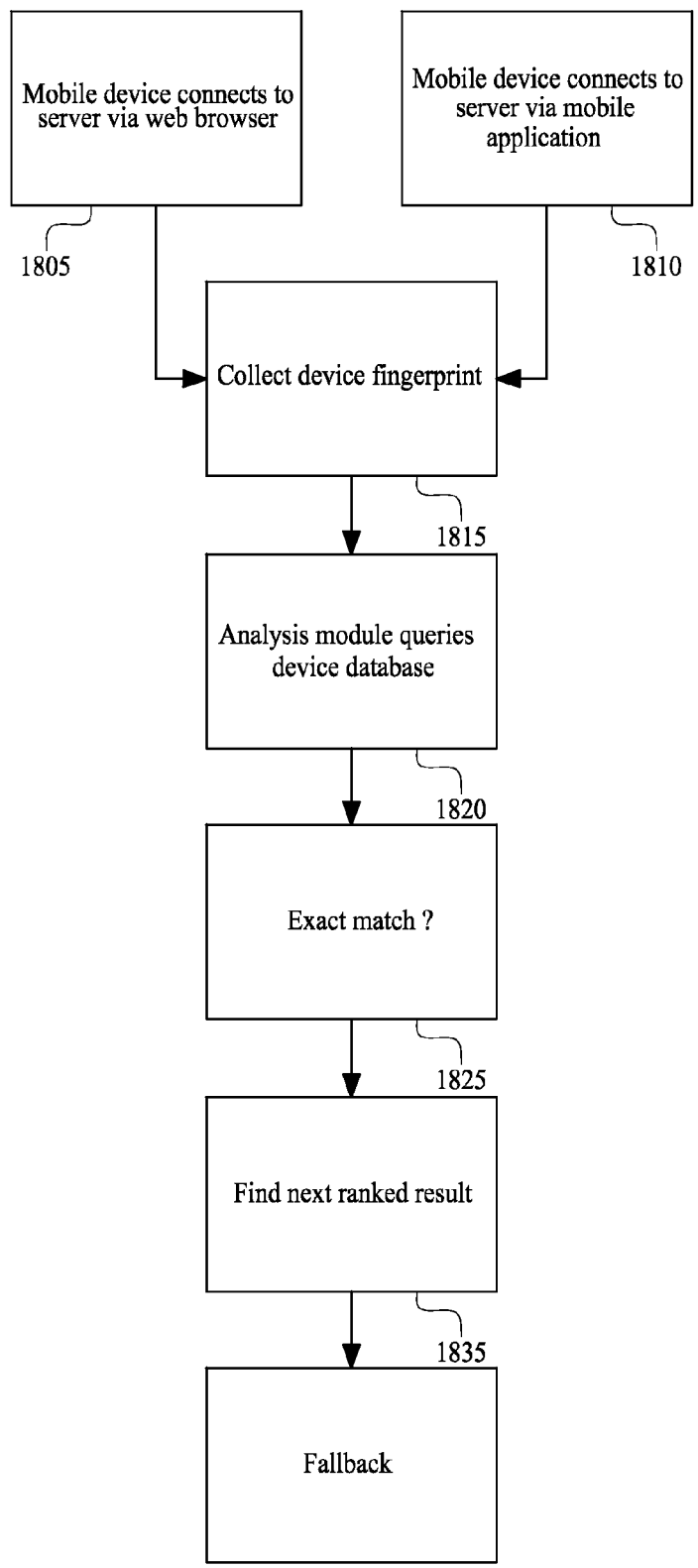
FIG. 18 depicts a process used to detect the type of device connecting to the widget service.

FIG. 18 illustrates a device detection process according to one embodiment. This process may be used to detect the type of device connecting to the server so that the server can determine the best experience to deliver to the end-user. This subsystem may include a device database, a device "fingerprint" collector, and an analysis module.

The device fingerprint collector may gather clues as to the type of device connecting to the server. This may be accomplished via device HTTP browser headers that are transmitted by the mobile browser and optionally the mobile gateway through which mobile browsers could connect. These headers may include some identifying information about the device browser, version, make, acceptable media types, etc. This information, however, may not be standardized and it may be up to individual device manufacturers to decide how much or how little information to provide through the headers.

As such, a device database on the server 110 may fill in the gap. According to one embodiment, the device database contains full information about a device's characteristics such as screen size, available memory, color depth, etc., that usually are not transmitted when the mobile device connects. In addition, the device database may have fallback mapping such that if a specific model of a device does not exist in the database, a mapping is available to get to a generic version of the device characteristics. For example, a fingerprint might identify a device as a "Nokia 6030 version 2.3". The database might not have an entry for that particular model of device. However, it might have characteristics for a "Nokia 6030" device and would hence return that result, and so on, comparing manufacturers and phone models. The analysis module described below may sift through the data in the database to return a correct result.

A second method of collecting a device fingerprint is through downloadable software that may be also included in the mobile client. It may be possible for the client engine 141 to determine device class (e.g. a Java-based device or a Windows PDA device). From that, the client engine 141 can load some additional detection code or diagnostic tests that get sent to the client. When run, this detection code and tests may use the device's platform APIs to determine more information about the device and send that information back to the server. The results of the diagnostic tests and code may be used as the basis for determining what types of content to transcode for a mobile device and how to transcode the content. The results of the diagnostic tests may be sent to a server, and the results may be used to select which widget applications, versions of the mobile client engine, or other data to send to a mobile client. The diagnostic tests may be used as part of an installation method.

With reference to FIG. 18, according to one embodiment, when a device connects to the server (either via web browser 1805 or via mobile application 1810), the analysis module may collect all information from the fingerprinting system (1815) and query the device database (1820). It may first look for specific matches on the fingerprint (e.g. model, make, firmware version, supported media types, etc). Weights may be assigned to different identifying marks. For example, the model number might have the most weight while supported media types have the least weight. From this, a query is performed on the database. If an exact match is found, that match may be used (1825). Otherwise, the system may return a list of possible matches, the highest ranked of which may be used (1830). Alternatively, if no matches are found, a fallback mechanism may used (1835). For example, a firmware version may not match exactly. If device characteristics of an earlier firmware version are defined, that may be used. If a phone model is specified, that may be used. And if nothing other than manufacturer is defined, that can be used, etc.

Widget Tools

Various tools may be provided to allow developers and users to create additional widgets that can be uploaded to the widget service. Tools may exist in hosted form, as user-installed tools, and as mobile tools.

Download Idle Screen

FIG. 21 illustrates one embodiment of the download process of downloading widgets. According to this embodiment, the data is downloaded as quickly as possible. Once data is downloaded, the user may not have to connect to the network again since the experience is on the handset only using cached data.

However, the mobile client can choose to show the current progress of the download. A screen may appear (FIG. 21(*a*)) with a progress bar 2110 to indicate the current download progress. While the user waits, the mobile client can begin to show a preview 2120 of the items that have already been downloaded (FIG. 21(*b*)). The items may automatically rotate at a predetermined interval. Users can also interact with the screen (FIGS. 21(*c-e*) to view other downloaded items and to scroll down the item to show more text.

In another mode, the mobile client may be configured to download in the background and allow users to begin interacting with the widgets as they are downloaded. A network content download manager, as a component of the widget client 141, may receive requests from widget applications to download network content. The download manager may manage the downloading of requested content while the widget is running, or alternatively, when the widget is not running, is terminated, or is blocking. The download manager may resume, restart, callback, or launch the widget at certain points in the download or after the download is complete. The download manager may store the downloaded content permanently or ephemerally. The download manager (or the widget) may, from time to time, cause the deletion of stored network content.

In some embodiments, the device or client engine may be configured to download network content at the request of a widget, without requiring the user to request the content and without necessarily immediately displaying the network content. Rather, the downloaded content may be stored in a memory of the device for later sue and consumption by the widget, especially in the later absence of a network connection. Content may, of course, be transcoded into a form more suitable for use or display on the device before being downloaded. For example, content may have its volume lowered or increased, dynamic range changed, color palate changed, width or size adjusted, images scaled or compressed, and so forth.

In some embodiments, a software widget may receive a first request for data from a user. The widget may initiate a downloaded of the content (perhaps via the download manager described above). The widget (or the download manager or client software) may thereafter initiate requests for other, additional network content that has not been specifically requested or instructed by the user. The identity of which data to prefetching may be determined by heuristics located on the server or the client device and may be private to a widget.

Widget Launchpad

Figure 22F:
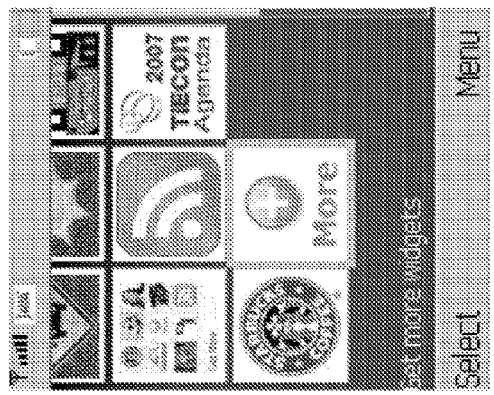
Figure 22E:
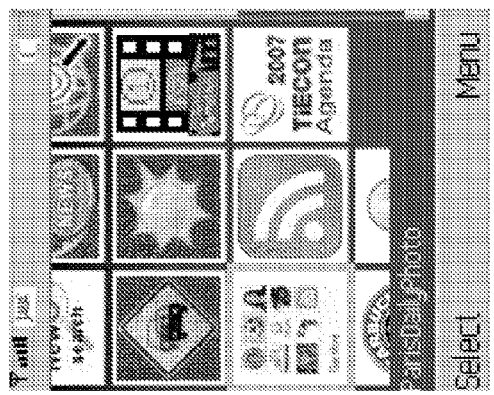
Figure 22D:
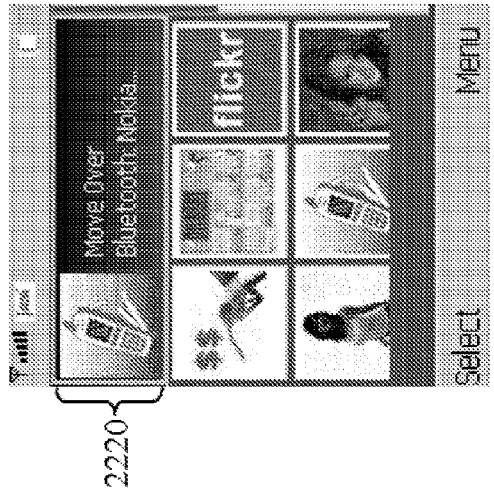

After download is complete, the user can enter a widget launchpad screen, FIG. 22 illustrates one embodiment of the widget launchpad screen. In this embodiment, the launchpad displays the set of widgets that the user has chosen and personalized based on his preferences. A user may select any widget icon 2210 to launch it and see more detail. The user can use a multi-directional selection key on a cellular telephone to move around the screen. Other input mechanisms such as a stylus or voice input may be used as appropriate. The illustrated widget icons are displayed in a grid. They may also be displayed in other layouts such as a list or a dynamic homepage canvas (FIG. 26(*a*)) as appropriate. For example, widgets may also be displayed in a carousel format, where selecting or hovering over a widget may cause more information to be displayed, possibly above the widget, and where widgets may slide horizontally or vertically in a manner akin to a CD carousel.

There may also be a dynamic information display 2220 which rotates information from the widgets. As one example, a few of the widgets installed include CNN News, Local Traffic, Local Weather and news from the POPSugar weblog. The dynamic information display 2220 may rotate headlines or status messages from these widgets every few seconds. The user may click on the information display 2220 to view more detail such as an article summary or a traffic incident detail or weather for a certain day. (See top of FIGS. 22(a-d).)

Types of Widgets

Figure 23A:
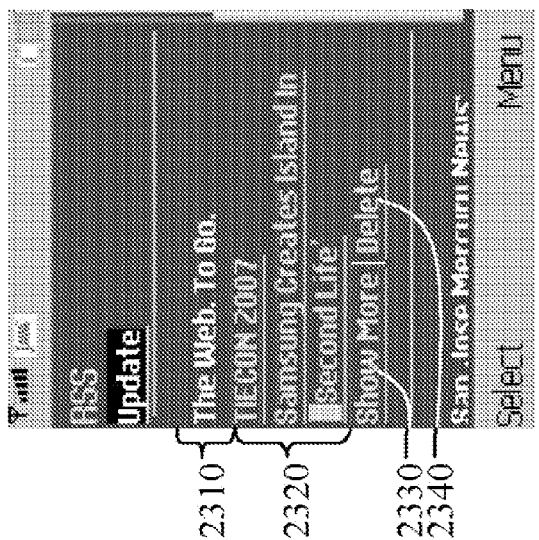
FIGS. 23(a) through 23(h) are exemplary displays of widget displays according to embodiments.
Figure 23B:
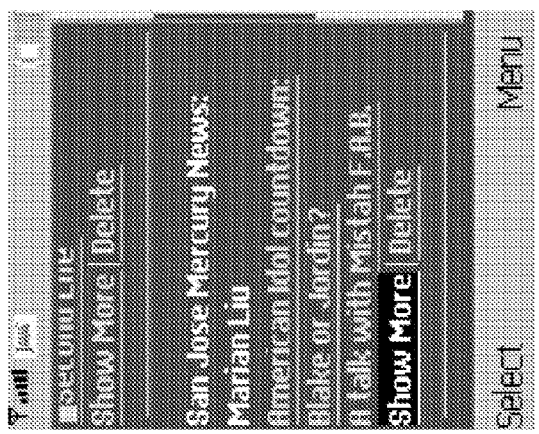
Figure 23C:
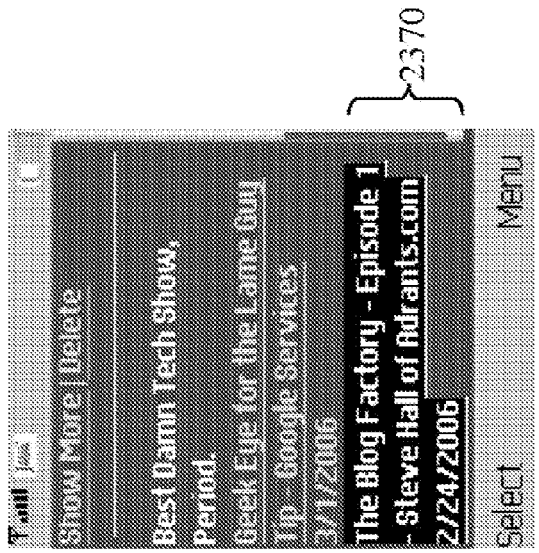

When a user selects a specific widget, the maximized (detail) view of the widget may be displayed. FIG. 23 illustrates detailed views of an example widget according to one embodiment. In this embodiment, the user has added an RSS widget that shows headlines from various sources. FIGS. 23(a), 23(b), and 23(c) show three different RSS feeds that the user has configured for the RSS widget. The feed title 2310 as well as a random sample of articles 2320 in the feed is displayed. Links appear for the user to show more articles in a particular feed (the "Show More" link 2330) or to remove the feed from the RSS widget (the "Delete" link 2340). Users can also choose a different view in which the feed icon appears to the left and just the feed title appears along with the number of unread articles in a particular feed. Users can configure different display representations by configuring parameters of the RSS widget.

Figures 23D, 23E:
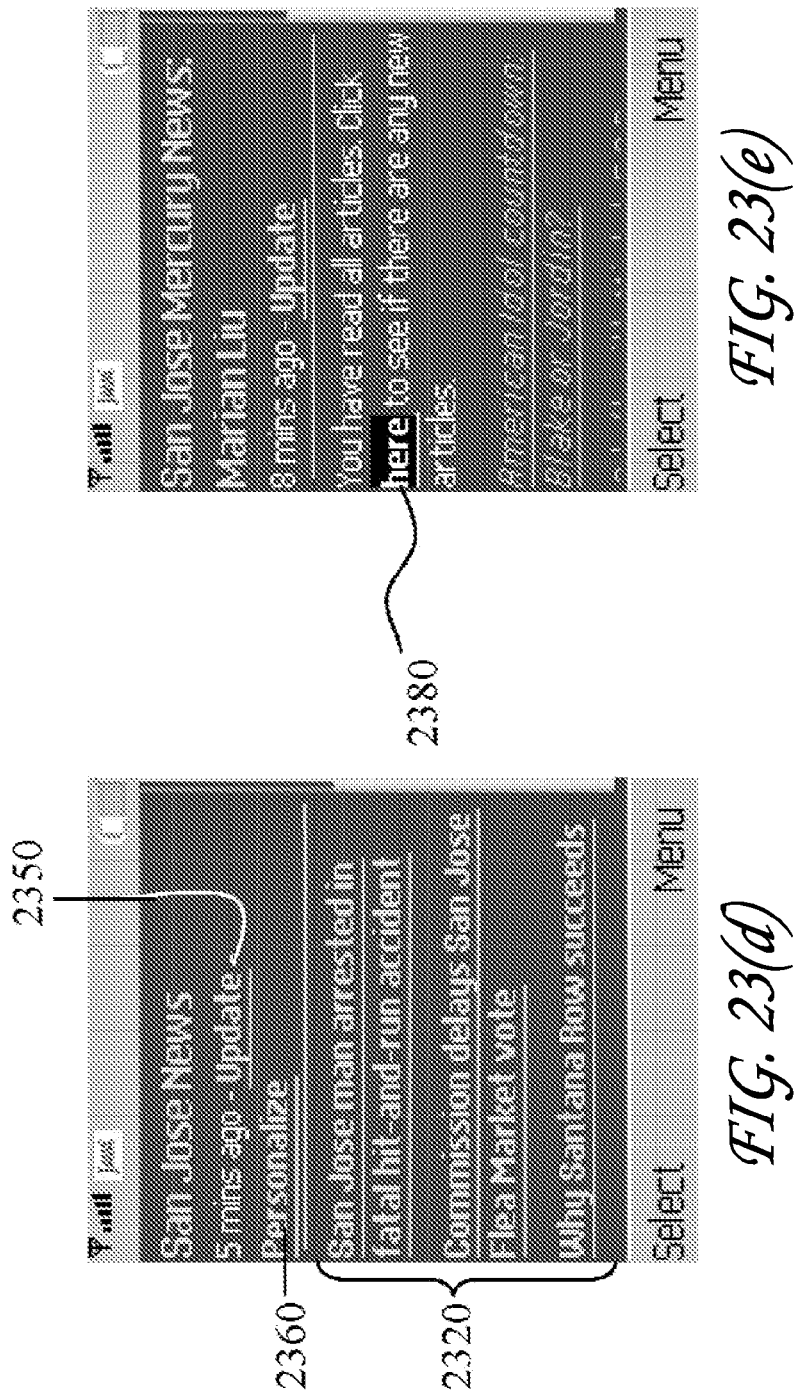

FIG. 23(d) is a sample of what appears when users select the "Show More" link 2330 in FIG. 23(a). The view depicted by FIG. 23(d) shows the articles 2320 that appear in that feed. Users can choose to personalize the feed (the "Personalize" link 2350) or to update (the "Update" link 2360). Personalization may include changing filtering parameters, changing user locations, etc that affect the results of certain feeds. In the example in FIG. 23(d), the feed has been configured to accept location as a user preference. Therefore, the user may receive only news pertinent to that user's location. As users read the articles, they become marked in a block 2370 of different font/color so that the user knows they have read that particular article (see FIG. 23(c)). In addition, once the user has read all of the articles on the device, they may choose to download more articles from the server via a link 2380 (FIG. 23(e)). Each article may have shortcut navigations that can be hidden or displayed. There may be numbers next to the articles correspond to the mobile device keyboard keys. When users press the character corresponding to the article, they may immediately jump into that article without having to use the directional navigation keys to navigate and then select the item link.

Figure 23H:
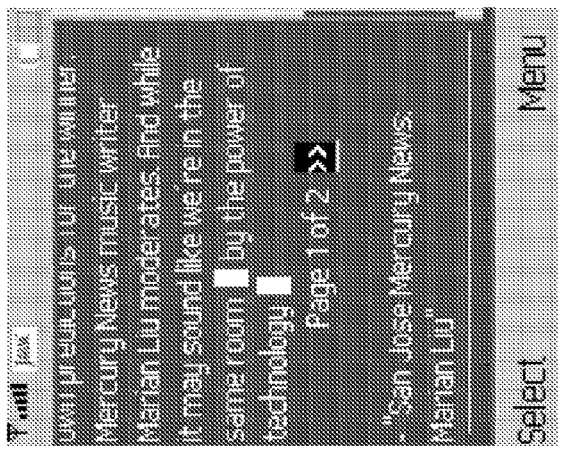
Figure 23G:
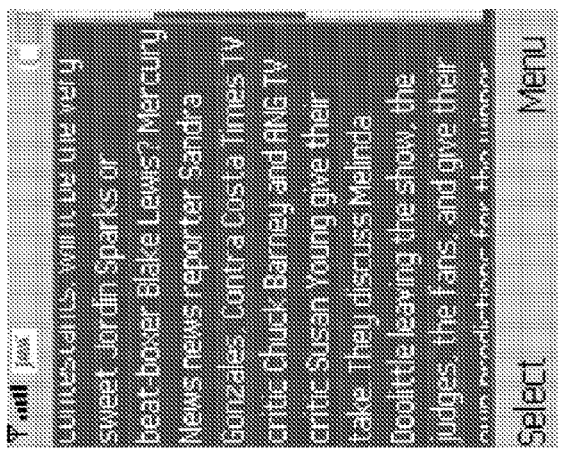
Figure 23F:

FIG. 23(f) shows one embodiment of an article that contains a media attachment. The system presents a selectable icon 2390 depicting that there is a media attachment. Users can select the icon to start downloading the media. The media could be an image, video, audio, etc. Because of client restrictions and different device capabilities, the system may automatically transcode the media into an appropriate format for the client. FIGS. 23(g) and 23(h) show that there is more text to the article. Users can scroll down to see more text. In addition, the mobile client can support pagination by which large documents are broken up into multiple pages.

Figure 24E:
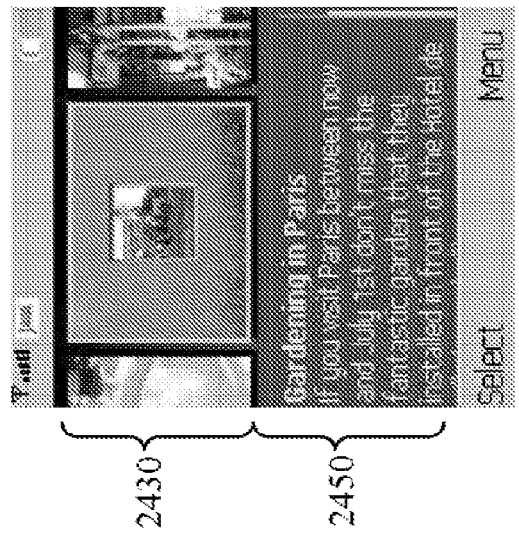
FIGS. 24(c) through 24(e) are exemplary displays of a widget showing scrolling images along with text underneath according to embodiments.
Figure 24D:
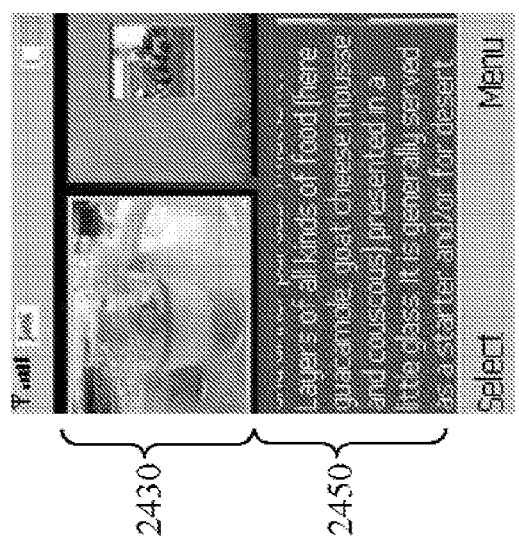
Figure 24C:
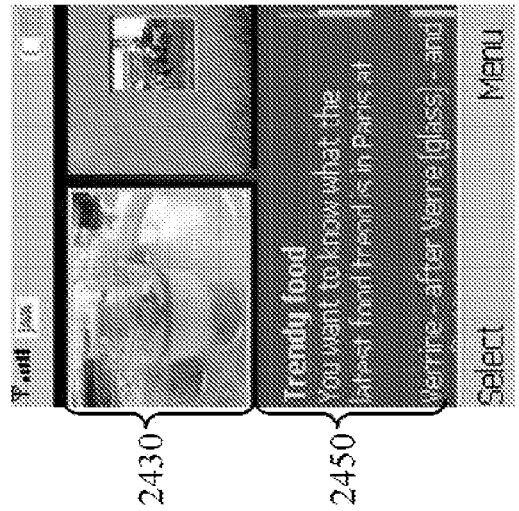

FIGS. 24(a-b) depict one embodiment of a widget for displaying the current weather and the weather forecast. Users can use the mobile device's left and right keys to move to the next or previous day's forecast. A text summary 2410 may appear at the bottom of the display for the particular selected item 2420.

FIGS. 24(c-e) depict one embodiment of a widget for displaying images 2430 along with scrollable text 2450. Users can quickly see all of the images 2430 in the source along with the text descriptions 2450 at the same time. Users can use the directional keys on the mobile device to move to the next or previous image 2430. Users can also use a stylus or mouse to drag the scroll left or right. When users select the image 2430, they can view additional information about the article.

Figures 25D, 25E:
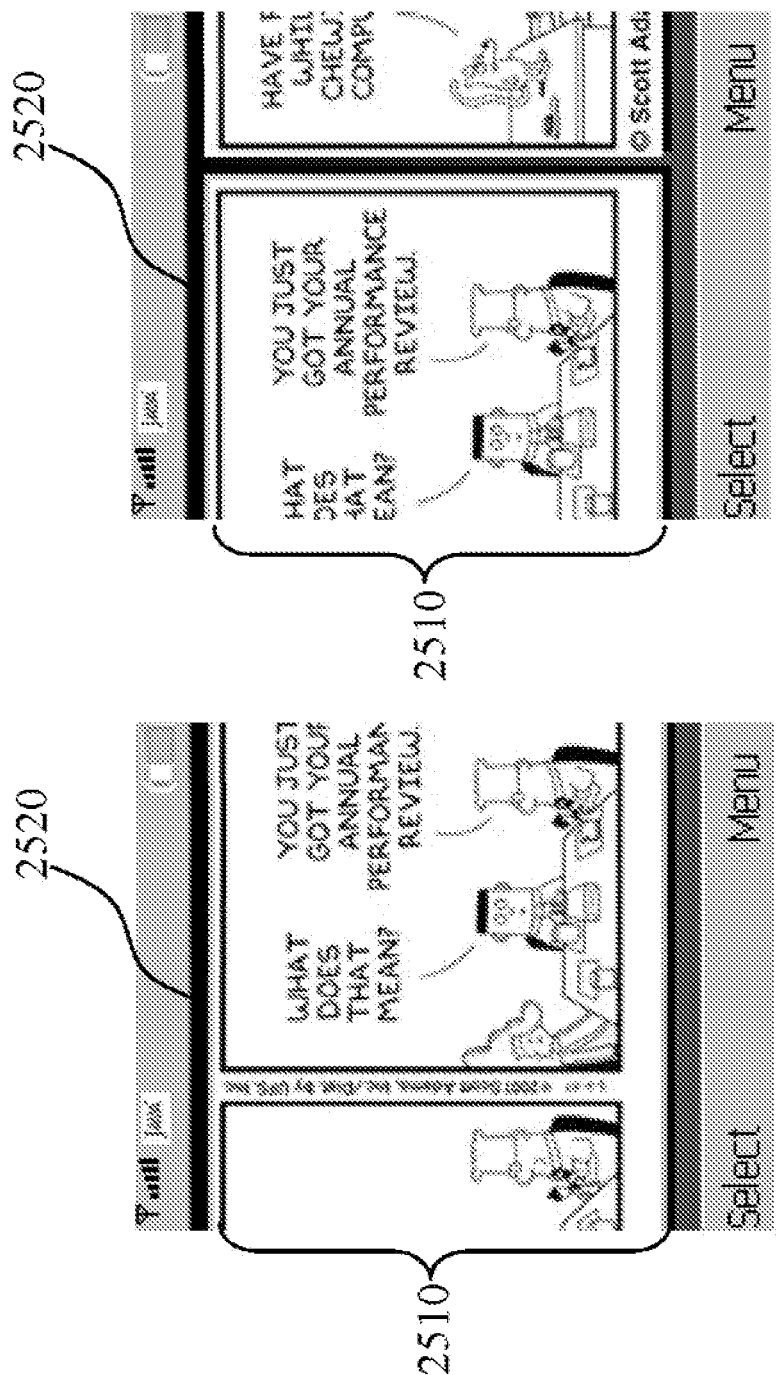

FIGS. 25(a-e) depict one embodiment of a widget for displaying comic strips 2510. Users may use the directional keys on a mobile device to slide the comic 2510 around the viewport 2520. Because comic strips 2510 are usually wide or long, this widget may display the comics in a 2-dimensional scrollable view. This ensures that the comic 2510 is of sufficient size to be viewable on a mobile device display. This type of widget can also be used to display large images. The widget may also employ some animation with motion acceleration to indicate to the user the direction that the image is scrolling. The images can also be zoomed and panned while scrolling.

Figure 25F:
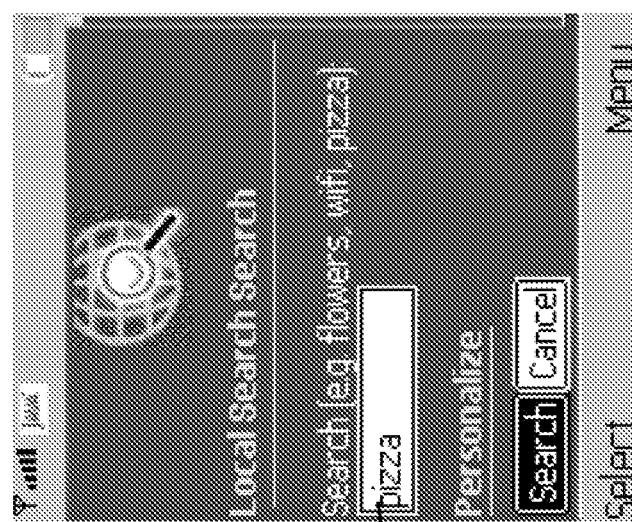
FIGS. 25(f) and 25(g) are exemplary displays of a search widget according to embodiments.
Figure 25G:

FIGS. 25(f-g) depict one embodiment of a search widget. Users can interact with the widget by entering search terms 2530. The example in FIG. 25(f) is a local search widget that takes user input, the user preferences (their current location), and performs a search. For example, a search of "pizza" might yield pizza restaurants around the user's location (FIG. 25(g)).

FIGS. 27(d-f) and 28(a-h) depict one embodiment of a sports widget. This may allow users to receive real-time game scores. The depicted example embodiment shows cricket games. FIGS. 27(d), 27(e), 28(b), and 28(e) show full-screen alerts 2750 of major events. Users can scroll around text information 2760 (FIGS. 27(f), 28(c), 28(d), and 28(f)). The top banner 2810 may rotate between the team scores, player scores, ads, etc. The bottom ticker 2820 can show news events (See FIGS. 28(b) through 28(f)). In this particular widget, users can also interact with the widget beyond scrolling up and down. For example, if there is a video clip associated with a particular event, users can select that event to display the video clip. The video clip may get displayed on the mobile device as per the media transcoding description in the system description.

Widget Homepage

Figure 26C:
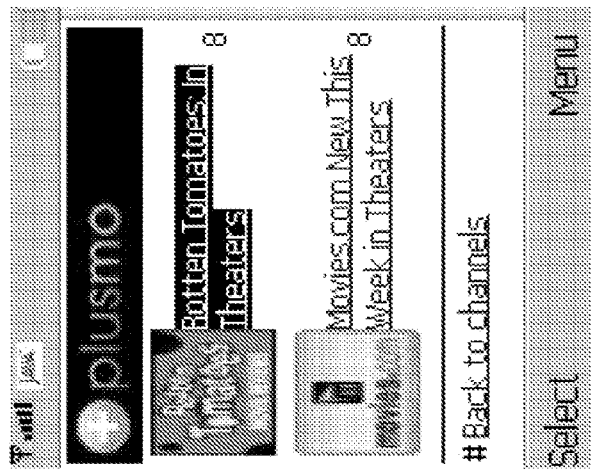
FIG. 26(c) is an exemplary display of a feed aggregator widget showing subscribed feeds and the number of unread articles in each feed according to embodiments.
Figure 26B:
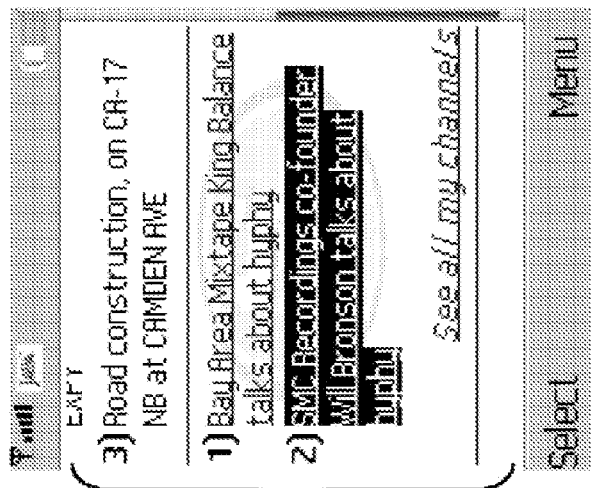
FIGS. 26(a) and 26(b) are exemplary displays of a widget launchpad according to embodiments.
Figure 26A:
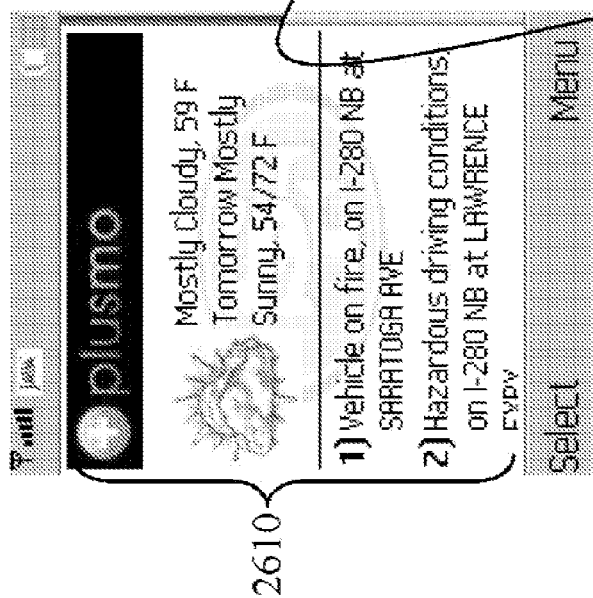
Figure 26D:
FIG. 26(d) is an exemplary display of a widget displaying a list of articles in a subscription according to embodiments.
Figure 26E:
FIGS. 26(e) and 26(f) are exemplary displays of a news article according to embodiments.
Figure 26F:
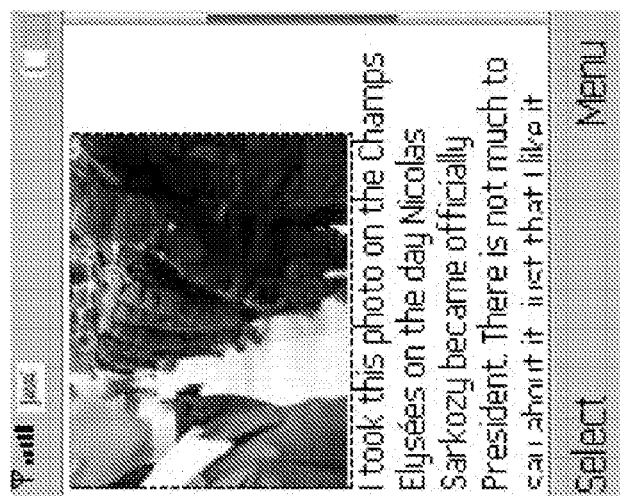
Figure 26I:
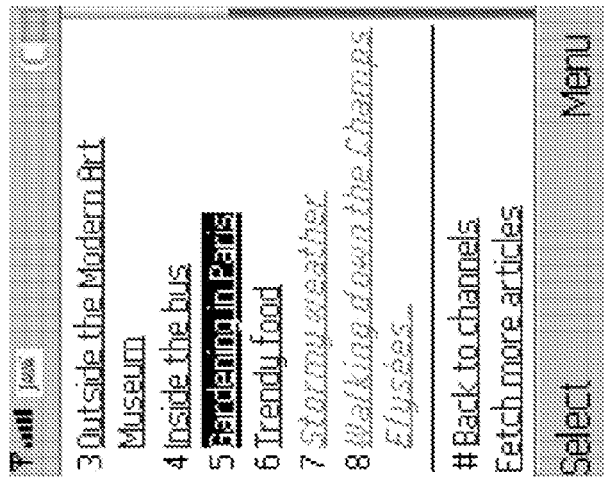
FIG. 26(i) is an exemplary display of read and unread articles in a list.
Figure 26H:
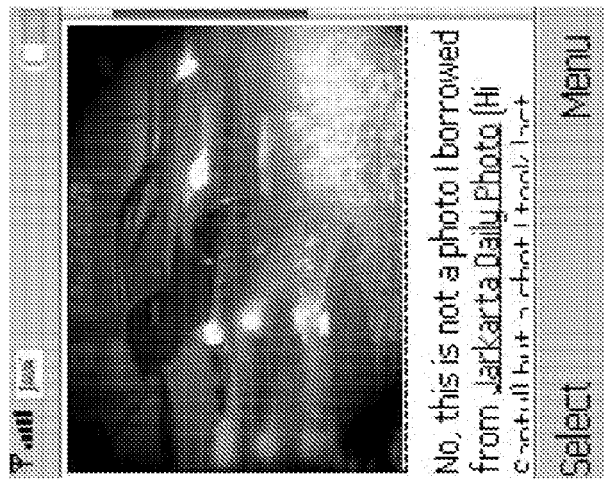
FIGS. 26(g) and 26(h) are exemplary displays of incremental resource loading according to embodiments.
Figure 26G:
Figure 27C:
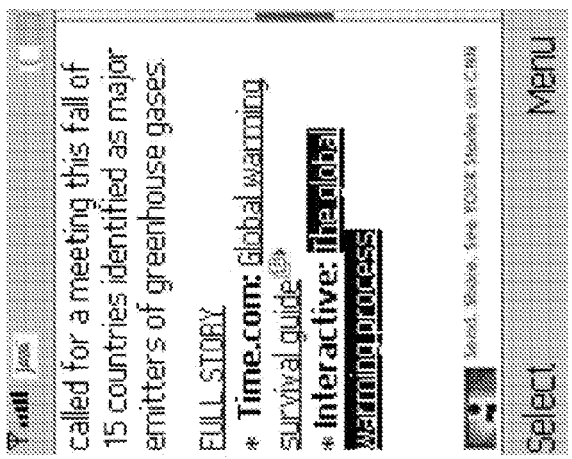
FIGS. 27(a) through 27(c) are exemplary displays of the result of transcoding large web sites for mobile widgets.
Figure 27B:
Figure 27A:
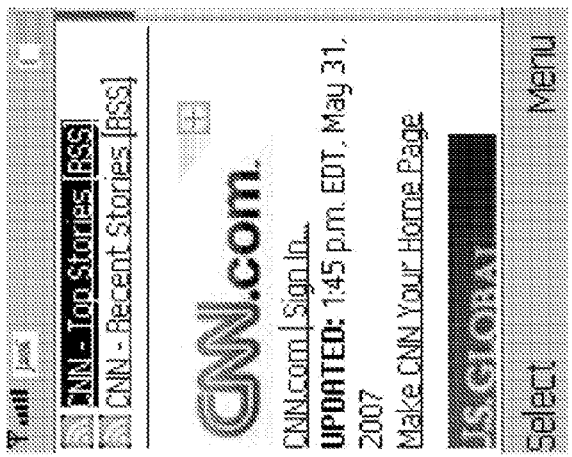
Figure 27F:
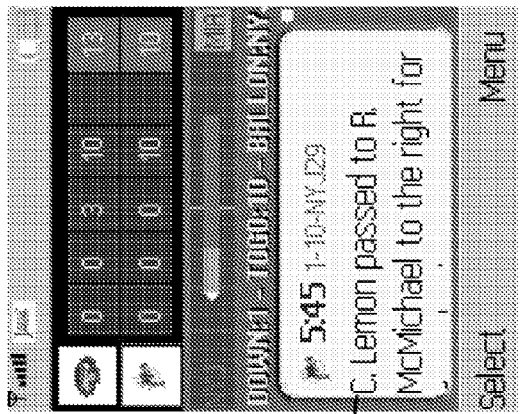
FIGS. 27(d) through 27(f) are exemplary displays of sports widgets.
Figure 27E:
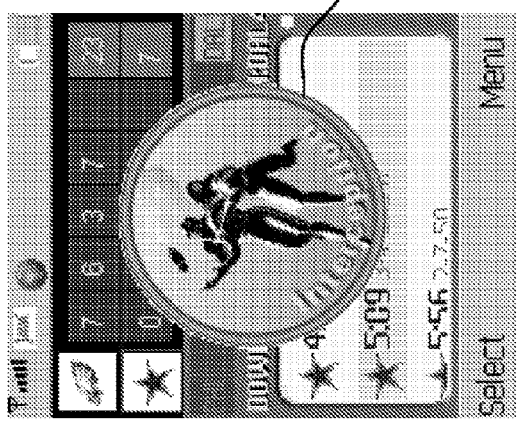
Figure 27D:
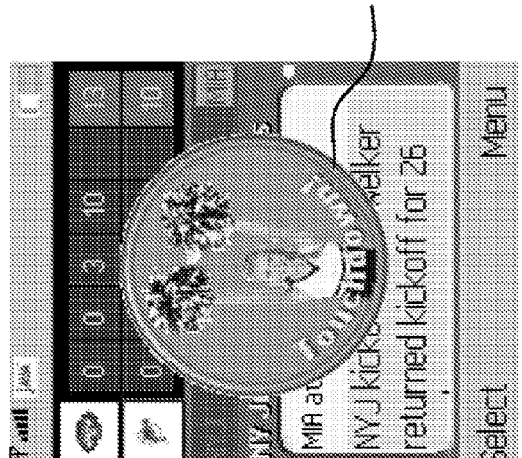
Figure 29:
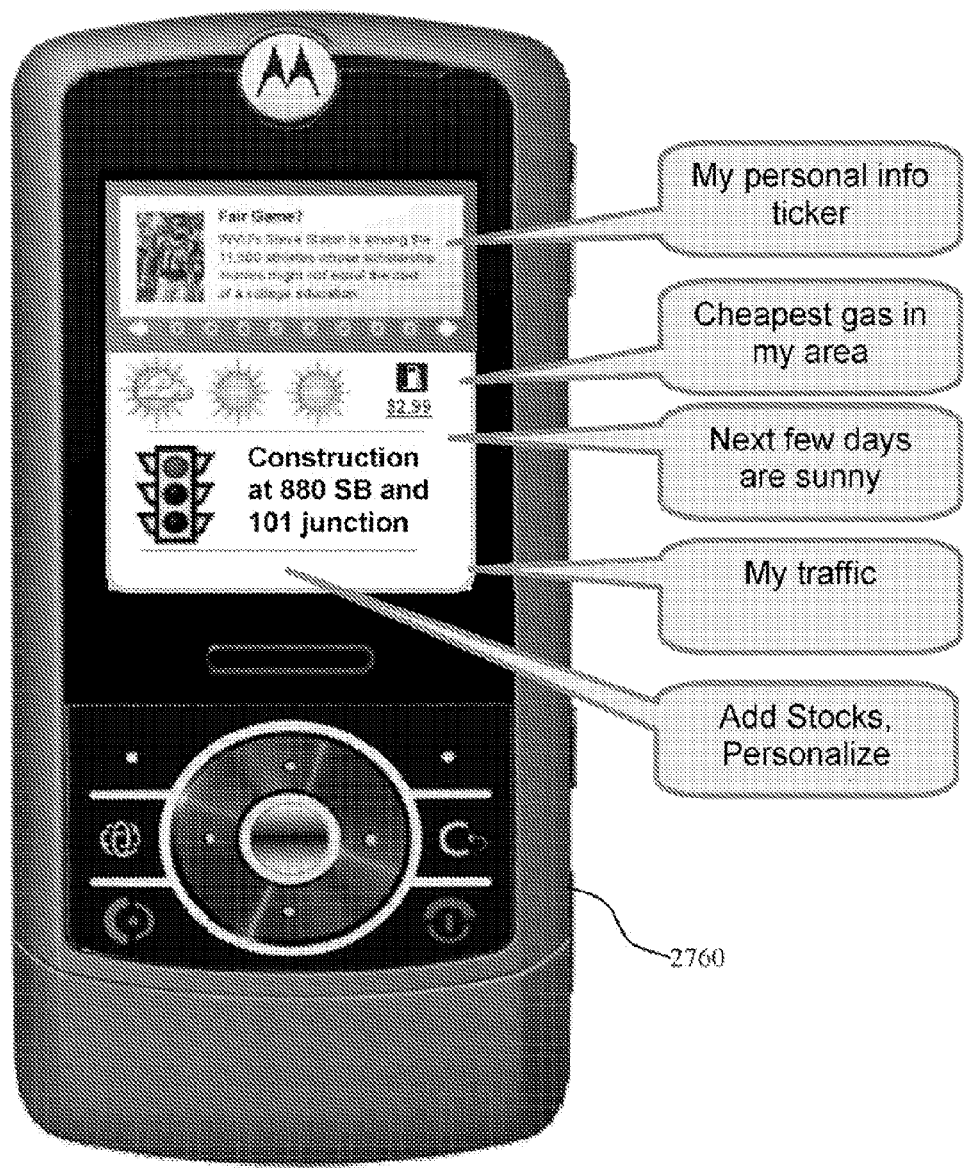
FIG. 29 is an exemplary display showing multiple widgets used as indicators on a single view.

FIGS. 26(a), 26(b), and 29 depict embodiments of widget homepages 2610. End-users can configure and customize this homepage to add and remove different views of widgets. The user may configure a background image to display on the page. In one example, the user has configured a weather widget to display on the page. This may be the same weather widget as in FIGS. 24(a) and 24(b). Widgets may have different views and modes by which they can render themselves.

A widget can present itself in multiple formats, depending on the mode, screen size, and capabilities of the mobile client. Some of these modes may include a minimized state, a full screen view, and a summary screen view. In a minimized state, one embodiment of this application can be a grid of icons 2210 (FIG. 22(a)). Each icon 2210 represents a "minimized" view of the application. When users select the icon 2210, a full screen view of the widget may be displayed (FIGS. 24(a), 24(b)). In the summary view, a screen 2220 of important (user defined to appear) widgets can be displayed (FIG. 22(a)-(d)).

For the "minimized" view, the icon can be static, or it can show a state of the application. For example, a weather widget may display a cloudy icon if it's currently cloudy. A traffic widget might show a stop sign if there is traffic on a predefined route. A clock widget might show the current time.

In the summary view, a larger space may be allocated for display of some status information. For example, a weather widget might show a five-day forecast as five icons that represent the weather for each day. A stock widget might show a scrolling ticker of stock symbols and current prices. A clock widget might show the current time as well as the current date.

In the full screen view, the widget may have the entire screen of the mobile device to render on. In addition, the full input capabilities may be available for the user to interact with the user interface. For example, there may be more space for text input fields.

Mobile Client Home Screen Integration

Figure 30:
FIG. 30 is an exemplary display of widgets added to a home screen display of a mobile client device.

In addition to being available in the mobile client as maximized, minimized, or summarized views, widgets 142 can preferably be hosted on native "home" screens on mobile clients. Certain mobile devices have the capability to display application information on a home screen. Examples include a Windows Mobile PDA. The home screen of a PDA may contain the time 3010, signal strength, upcoming appointments 3020, etc. (see FIG. 30).

In some embodiments, the mobile client may contain a plugin on supported platforms. These plugin hosts widgets that are otherwise displayed in the mobile client. The plugin may be registered with the native "home" screen. The mobile widget may be displayed on a native display canvas on the native "home" screen.

Advertising

Types of Mobile Advertisements:

FIG. 34 depicts several embodiments of mobile advertisements. The client may support several types of advertisement rendering formats all capable of being displayed offline. Some possible advertisement types are described below:

Full Screen Transitional 3410: This advertisement may appear for a few seconds encompassing the full screen of the mobile device and disappear if ignored. If the user clicks the advertisement an associated action is performed.

Popup Bubble Alert 3420: This may be a small popup that appears on the screen of the mobile device and may not encompass the whole screen.

InPlay Advertisement 3430: This may be an advertisement that is embedded in the content. For example during a play-by-play session this may be displayed between each play.

Advertisements may also be animations and have transition effects such as the following:

Fading: The advertisement fades in, stays on for a few seconds and fades out.

Sliding: The advertisement slides from a side of the phone, stays on for a few seconds and slides out.

Advertisement Actions:

The following are examples of system/widget responses to user selections of advertisements:

None: If there is no action associated with an advertisement, it's only an impression with no click through defined.

Click to Call—A telephone number or a Voice Over IP (VoIP) call detail is associated with this advertisement. When a user clicks, a voice call is made to connect the user to the advertised service.

Microsite: This is a link to mode detail about the advertisement. This may launch the WAP browser on the device. Alternatively, the user may stay in the current context of the widget service application and the microsite is displayed. If the user is watching a game or a live event via the widget service, the experience might not be interrupted.

URL: This is a link to an external web site. The URL may be launched in the mobile device's browser.

Media: This is a link to media such as a ringtone, podcast or video clip. The widget service website downloads this clip in the background and plays it.

On the client 141, there may exist an advertisement (ads) store 455 (FIG. 4(*b*)) where ads are stored and queued in. When the mobile client receives commands to display these ads, the mobile client can pick up the appropriate ad from the ads store 455 to display. Also, the mobile client can determine when to pick up the ad from the store and display it. In some embodiments, the mobile client does not need to be connected to the server in order for the ads to be rendered. The ads may get displayed even if there is no connection to the server. If a user interacts with an ad, such as by clicking it, the ad or client may be configured to perform an additional action, such as accessing a URL, initiating a telephone call to a service or company, show additional information (e.g., popups) relevant to an ad, or play audio or video relevant to the ad.

As the ads are displayed, information may be logged about the displayed ads and the user interaction with the ads. This may include the number of times the ad has been shown, in which context, whether the user "clicked" on the ad, whether the user initiated a voice call based on the ad, the times these events occurred, etc. All this information may be stored locally on the mobile client so that a network connection need not be created. Then, when the mobile client establishes a network connection, this information may be transmitted back to the server.

A server may contain a repository of adverisement to be displayed on mobile devices and in association with widget applications, where the server may select advertisements based on user actions (such as downloading history) and/or user profiles.

Bandwidth Optimized Advertisement Delivery:

The client may support a mechanism to cache mobile advertisements. The widget service server may support a technique wherein advertisement commands are sent once to the client and the client caches the advertisements and displays them when required.

The advertisement server component may maintain a list of advertisements in the current campaign and the total impressions required over a period of time. When a client connects to the server 110, one or more delayed advertisements, referred to herein as AdCommands, may be sent to the client. An AdCommand may contain some or all of the following details:

Advertisement identifier: A number to uniquely identify the advertisement on the client Weight: A fraction between 0 and 1 that is used to control the frequency of appearance of the advertisement.

Advertisement Content: An advertisement, possibly formatted in a declaratory markup language such as HTML, that may include a graphic.

Action: None, Click to Call, Microsite, URL, Media, as described above.

Action Detail: Contains details of the landing page. For example, details could include a phone number for a click-to-call advertisement, an embedded WAP microsite or an external WAP or WEB site link; or embedded or downloadable media such as a ringtone or mobile video preview.

In some embodiments, one or more AdCommands can be sent to the client 141. The client 141 may maintain a round robin queue of these advertisement commands and render the advertisements whenever the user uses a widget. The user may use the widget application in a disconnected mode and these commands may execute and display the advertisements even when the user is not connected over a mobile data network. In some embodiments, the advertisements need only be downloaded once to the client. The weight may be used to control the frequency of the advertisements. Higher weights may represent advertisements that are displayed more often.

The client may maintain a log of all the advertisements displayed and these metrics may be collected and posted back to the server each time the client 141 performs a synchronization session with the server 110. In some embodiments, new AdCommands may be sent to the client at any time to augment the current set or reset the advertisement queue.

Techniques to Increase Relevance of Dynamic Information Display

Figure 31:
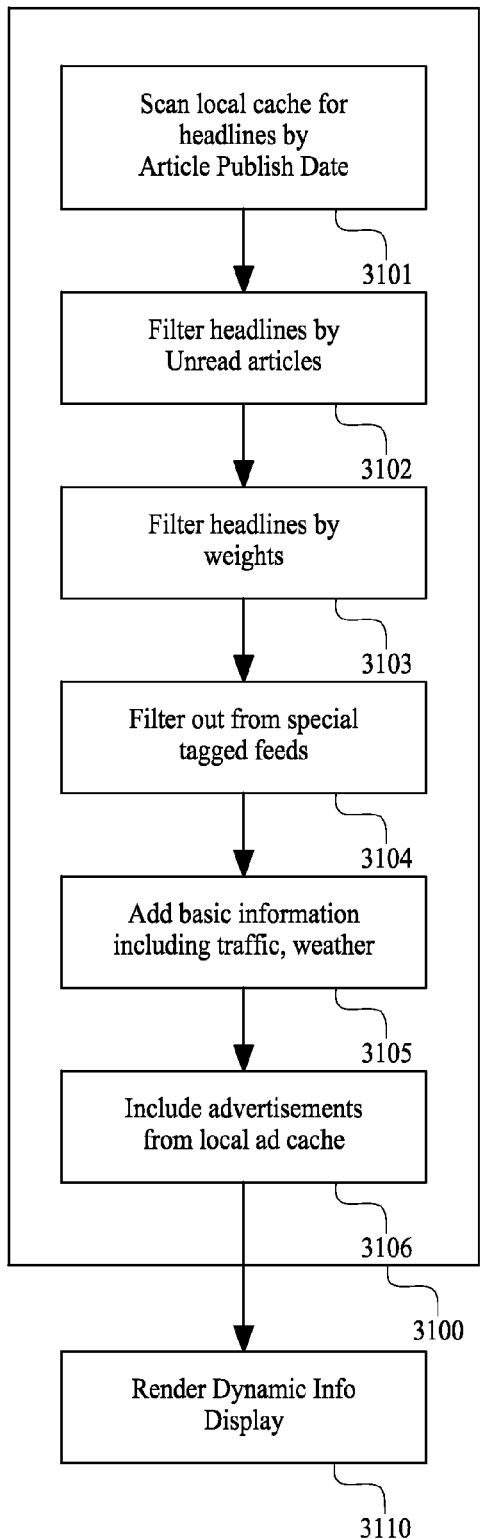
FIG. 31 is a flowchart illustrating the processes performed on the client device to increase relevancy of the articles.

As described earlier, the client software may be capable of displaying a dynamic information display such as a ticker or a dynamically formatted homepage. According to one embodiment, when headlines are rotated on such a ticker, users can glance at these articles and may click on headlines that they are interested in. It may be desirable to increase the relevance of the articles to the user so that they click more on these articles. Here we describe techniques and methods to increase the relevancy of the information displayed based on a variety of factors. FIG. 31 illustrates these techniques according to one embodiment.

Box 3100 shows processes performed on the client device to increase relevancy of the articles. Initially in Box 3101, a list of articles is scanned from the local storage on the mobile device. The dynamic information ticker may be functional even when the mobile client is not connected to the wireless network. Initially, the most recent articles from all the widgets that have a dynamic content source associated with them may be added to the information ticker display and may be rotated at an interval in a circular queue. Elements described in Boxes 3102, 3103, 3104, 3105, 3106 may be performed to increase the relevancy of the information to the user. Box 3102 represents filtering by unread articles so that there is no repetition of articles. Box 3103 represents prioritizing the articles based on weights. Initially a weight of 1.0 may be assigned to all widgets. As users use the widgets, possibly based in part on the number of times a particular widget is used and based on whether the users click on a headline pertaining to a widget, the weights are modified. Thus, as the user uses the widget service client 141 software, the system 110 may deliver headlines more in line with what the user clicks. In addition, the weights may be manipulated by external factors. As an example, it is possible to use standard user ratings and collaborative filtering systems to identify "hot topics" and automatically offer them as headlines even though the user has not subscribed to those widgets, and therefore may be missing important updates.

The next element (3104) may filter out specially tagged feeds such as graphics-only feeds (e.g. comic strips that require a big display for them to be effective), search results from search engine widgets, or static widgets (if desired) such as to-do lists. The next element (3105) may add any updates of desirable essential widgets such as weather and local traffic periodically if there is an event. As an example, if there is a change in traffic conditions, a headline could be added from traffic. Otherwise, no traffic information is added in the ticker. The next element (3106) may add advertisements from the local cache based on the advertisement cache. If there are any advertisements that need to be included in the ticker, they may be inserted based on the rotation frequency specified by the AdCommand.

Finally (box 3110), this filtered list of headlines may be rendered periodically in the information display. At the end of each cycle, a scan may be made to see if new articles have arrived on to the local store of the client software. If so, elements described in box 3100 may be repeated.

It is possible to further improve the relevance of the articles by using other parameters such as local time, current weather, and semantic knowledge of current headlines. As an example, if there is a winter storm in the local area, the system may include more weather headlines. If it is closer to the afternoon, the system may show the traffic updates more often. Therefore, though not mentioned here, anyone skilled in the art may be able to add such rules to increase article relevance for the dynamic information ticker.

Creating Mobile Widgets

A Topical Mashup Mobile Widget

Figures 37A, 37B:
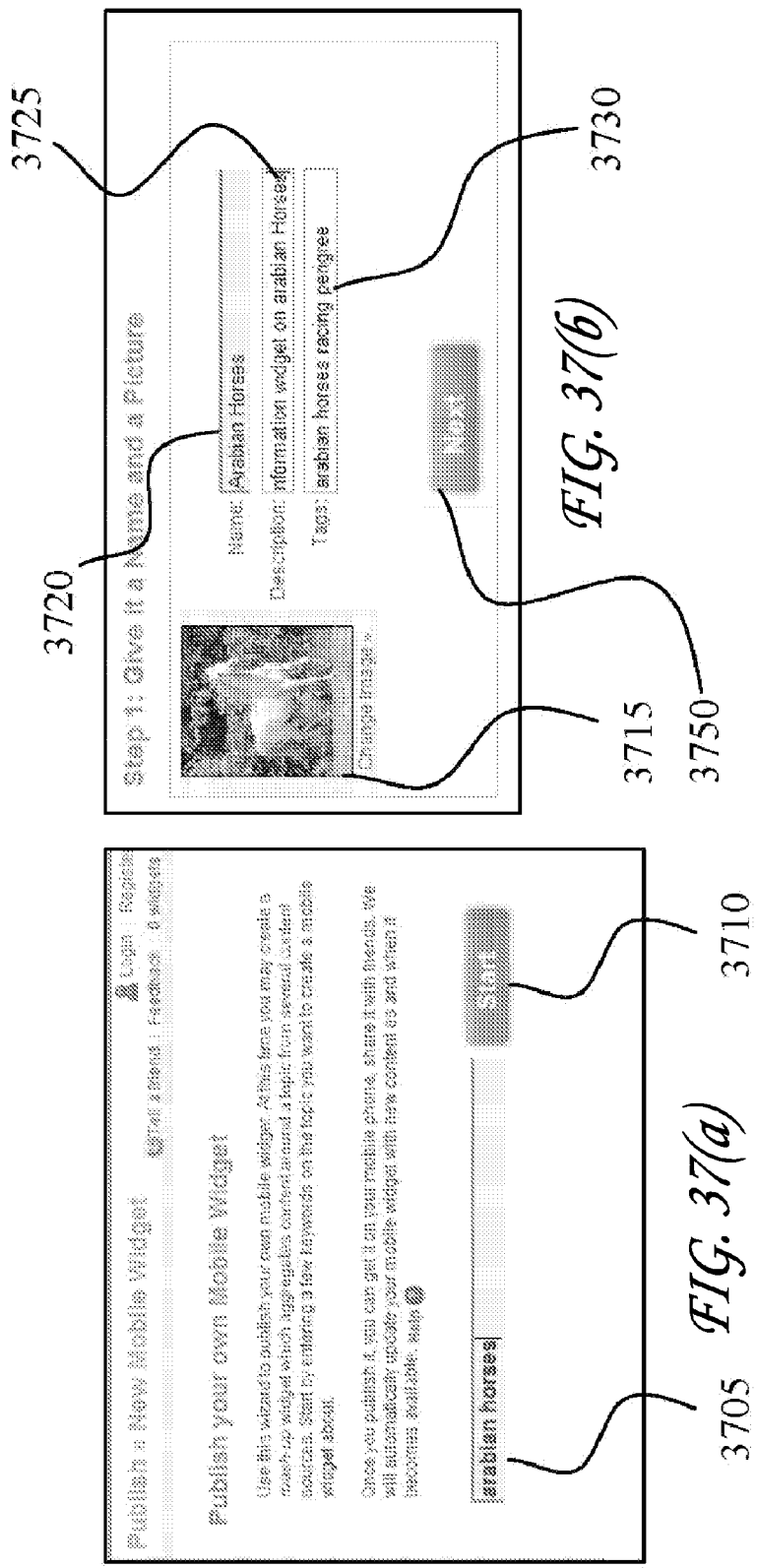
Figure 37D:
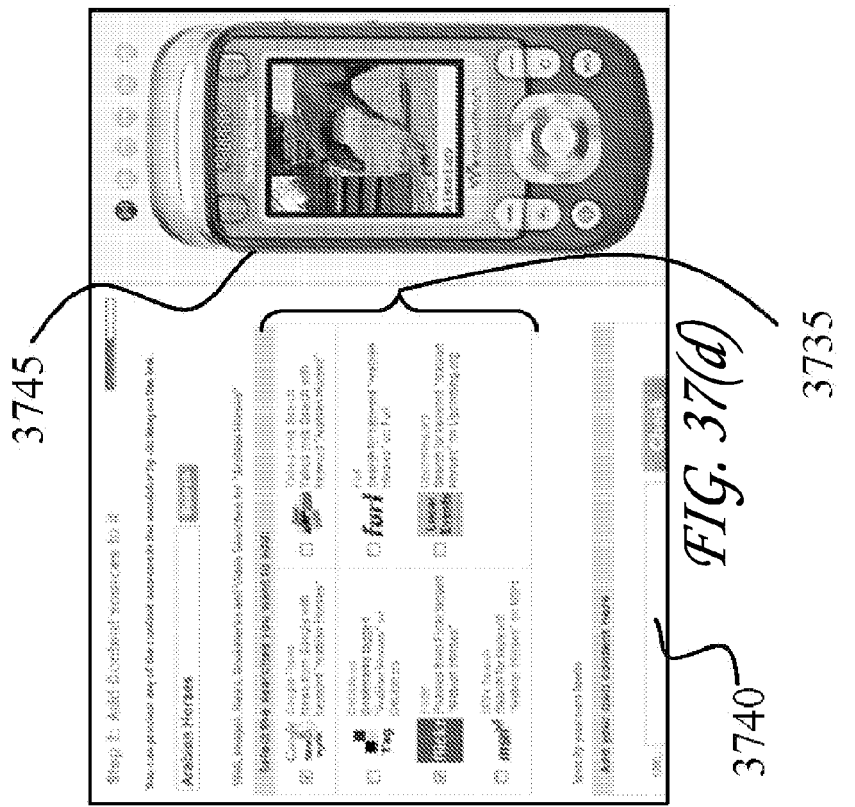
Figure 37C:
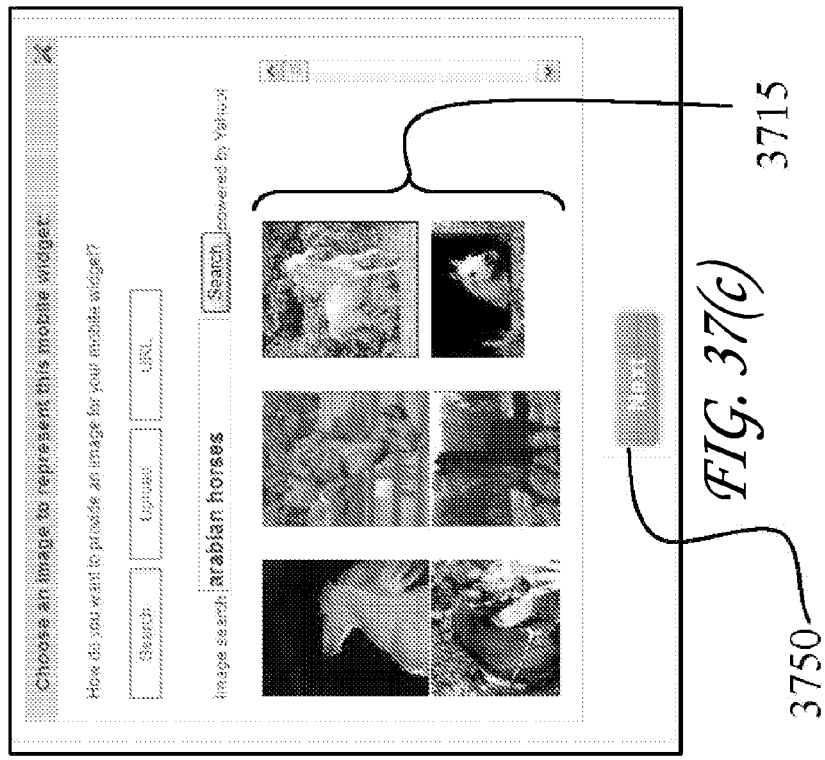

FIG. 37 shows various embodiments of web user interface displays that a user may be presented with to create a mobile widget. In some embodiments, an end-user is not required to do any programming that generates the mobile widget. As such, anyone capable of using a web browser and filling web forms can use such a user interface to publish a mobile widget. As an example, a topical expert, a blogger, a website owner or a content publisher can use this user interface to publish a mobile widget. Though not mentioned, the same user interface may also be presented via mobile web browser so that mobile users may also create and publish new mobile widgets and share them with others.

Referring to FIG. 37, according to one embodiment, a user may create a "topical mash-up" mobile widget. In this example, the user creates a widget on the topic of "Arabian Horses". A "topical mash-up" is a type of mobile widget that may continually aggregate information from several content sources and present it as one mobile information stream. A user who adds this widget onto their mobile device may receive regular information updates about the topic "Arabian Horses" on her mobile device.

As in FIG. 37(*a*), the widget publisher may be asked to enter a few keywords on the topic on which he wants to create a widget. Text may be presented to the user, such as "Use this wizard to publish your own mobile widget. At this time, you may create a mash-up widget which aggregates content around a topic from several content sources. Star by entering a few keywords. Once you publish the widget, you can get it on your mobile phone, share it with friends. We will automatically update your mobile widget with new content as and when it becomes available!" The user may enter the information in a text box 3705 and submit it by selecting the "Start" key 3710 or an equivalent. The query may be transmitted back to a central server and parsed. A next control 3750 can be provided to enter the inputted data and proceed to the screen of FIG. 27(*c*). In FIG. 37(*b*) the user selects an image 3715 that visually represents the widget, provides a title 3720, and enters optional descriptive information such as description 3725 and tags 3730. FIG. 37(*c*) shows an exemplary method of selecting images 3715, in which the user picks the image 3715 by clicking on a particular image 3715. This information may be associated with the widget and used later to categorize the widgets in a repository. Another next control 3750 may be provided.

The display in FIG. 37(*d*) allows the widget publisher to pick information sources 3735 to aggregate into his widget. The user can select one or more sources to add to the widget. Several information source choices 3735 may be presented to the publisher. One set of information sources represent search engine resources on the web such as Google search, yahoo search, Google News search, Yahoo Image Search, Flickr Image search, Upcoming.org event search, MySpace Blog search, eBay product search, and the like. An information source may be the result of running the query on any of these search engines. The publisher can select this by selecting the checkbox next to any of these provided choices. The sources may also include data repositories, news sites, and so forth.

Another information source 3735 in FIG. 37(*d*) may be already-available content sources on "Arabian horses" that other widget service users have added previously thus far into the system. Another information source 3735 is similar content sources derived from running the query "Arabian horses" on external search engines. Further the user may know a specific web site, and he may also be able to enter that specifically as a URL in a text box 3740. FIG. 37(*d*) illustrates an emulator preview 3745 that enables the user to click on any information source 3735 on the page any preview portions of the widget on a mobile emulator. Once the user is satisfied with his selections to include in the mash-up widget, he may submit the information by selecting a "Next" key 3750 or equivalent.

FIG. 37(*e*) is an exemplary confirmation element where the user may make final modifications to the content sources. The user may publish the channel by logging into the system or anonymously without logging in. Once published, the mobile widget on "Arabian Horses" may be generated and may be published into the directory of Widgets. FIG. 37(*f*) shows an exemplary search by any user on the keyword "racing" 3755. One of the search results 3760 displays the newly published "Arabian Horses" widget 3765, that this user may select to add to his or her mobile device.

Weblog Mobile Widget

Figures 38C, 38D:
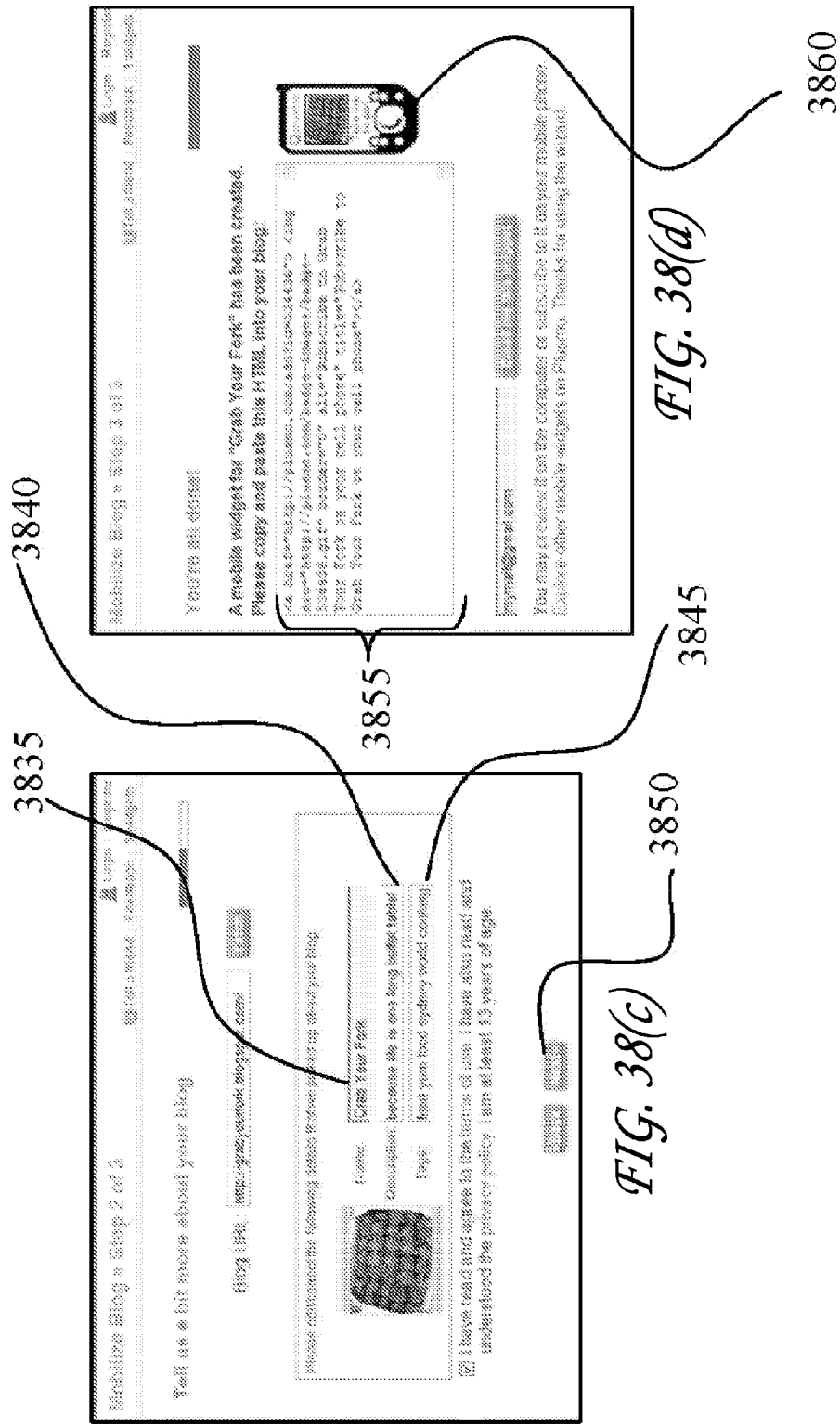
Figure 38E:
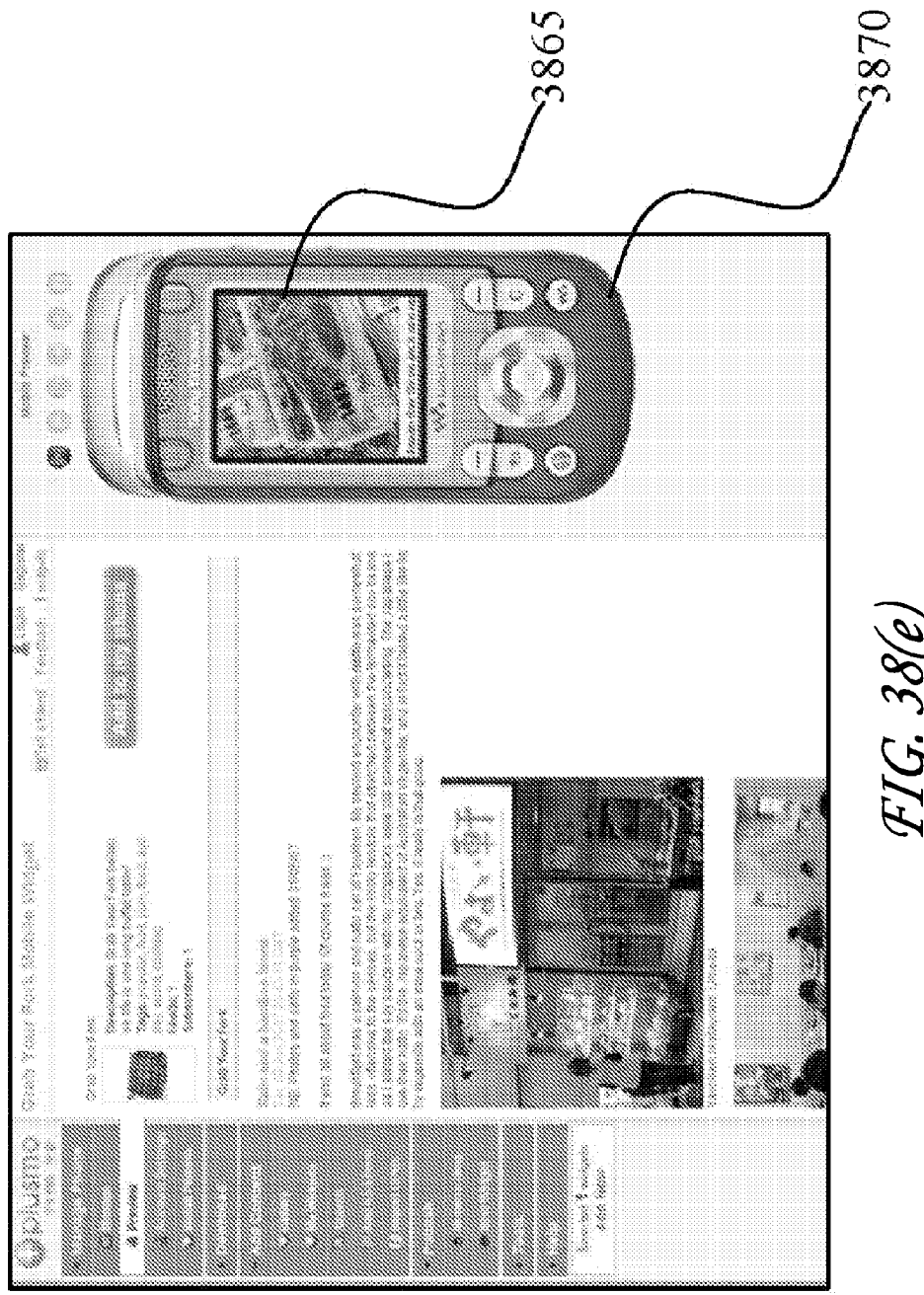

Yet another widget type is a blog widget that encapsulates a web log, commonly referred to as blog. An exemplary set of elements, according to one embodiment, for creating a web log widget non-programmatically is disclosed in FIG. 38. A blogger who is the publisher of a weblog may use this publishing wizard tool to generate a mobile widget. In FIG. 38(*a*), an exemplary element is provided where the blogger chooses one of various kinds of graphical controls 3805. These controls 3805, also referred to as "blog controls" may be standard widget service controls 3810 or personalized controls 3815. Some bloggers prefer to personalize these controls. The exemplary display in FIG. 38(*b*) shows the control personalization element. Here the blogger may select a background graphic 3820 presented by the system and also upload a graphic 3825 that represents his or her blog. A new personalized blog control is then generated for blogger. The blogger may further try out variations by loading different graphics, cropping the images until satisfied. Then he clicks the "Next" control 3830 or equivalent to proceed to the next element.

An exemplary display representing this next element is shown in FIG. 38(*c*). The blogger may enter a title for the widget 3835, a short description 3840 and a few keywords 3845 that relate to the blog. All of these fields may be used to search and categorize the blog widget in the gallery. The blogger clicks the "Next" control 3850 to complete generation of the mobile blog widget representing his blog. As in FIG. 38(*d*), he may be presented with a short snippet of HTML, JavaScript, or other code 3855 with instructions to use it. In this display the code may be emailed to him for convenience.

In addition to the generated blog control 3860, a mobile widget with the same graphic may also be generated. The mobile widget may be added to the gallery on the widget service for other users to use and share. The blog control may be used by the blogger to put on his website to advertise the fact that his blog is now available as a mobile widget. The blog controls may be standard "Send to Phone" controls, or personalized picture controls or also dynamic slideshows that show the entire preview of the mobile widget experience itself. In addition to bloggers, though not shown in this figure, in some embodiments, any user with a web home page on social sites such as MySpace, Facebook or any web site owner can create a mobile widget and an associated blog control using the Wizard. When a reader of that blog clicks on that control on the blog site, he or she may be redirected to the widget service web front end and may be allowed to register to widget service and add that specific blog widget on to his widget service client software 141.

Further as shown in FIG. 38(*e*), in some embodiments, the blogger may preview the mobile widget 3865 on the web. Current information may be fetched from his web log and may be rendered as a live preview in the exemplary mobile emulator 3870. Here the blogger may fully navigate through the widget 3865 and view the blog widget 3865 that he just created.

Example of a Widget Published from the Phone

Another set of widget publishing wizards may be offered to mobile users. These mobile widget publishing wizards may be available on a client device via a mobile web browser on a client device, or as a widget itself. Similar to the web interface, the mobile user may be presented with a series of elements to create and publish a new widget.

Figure 39:
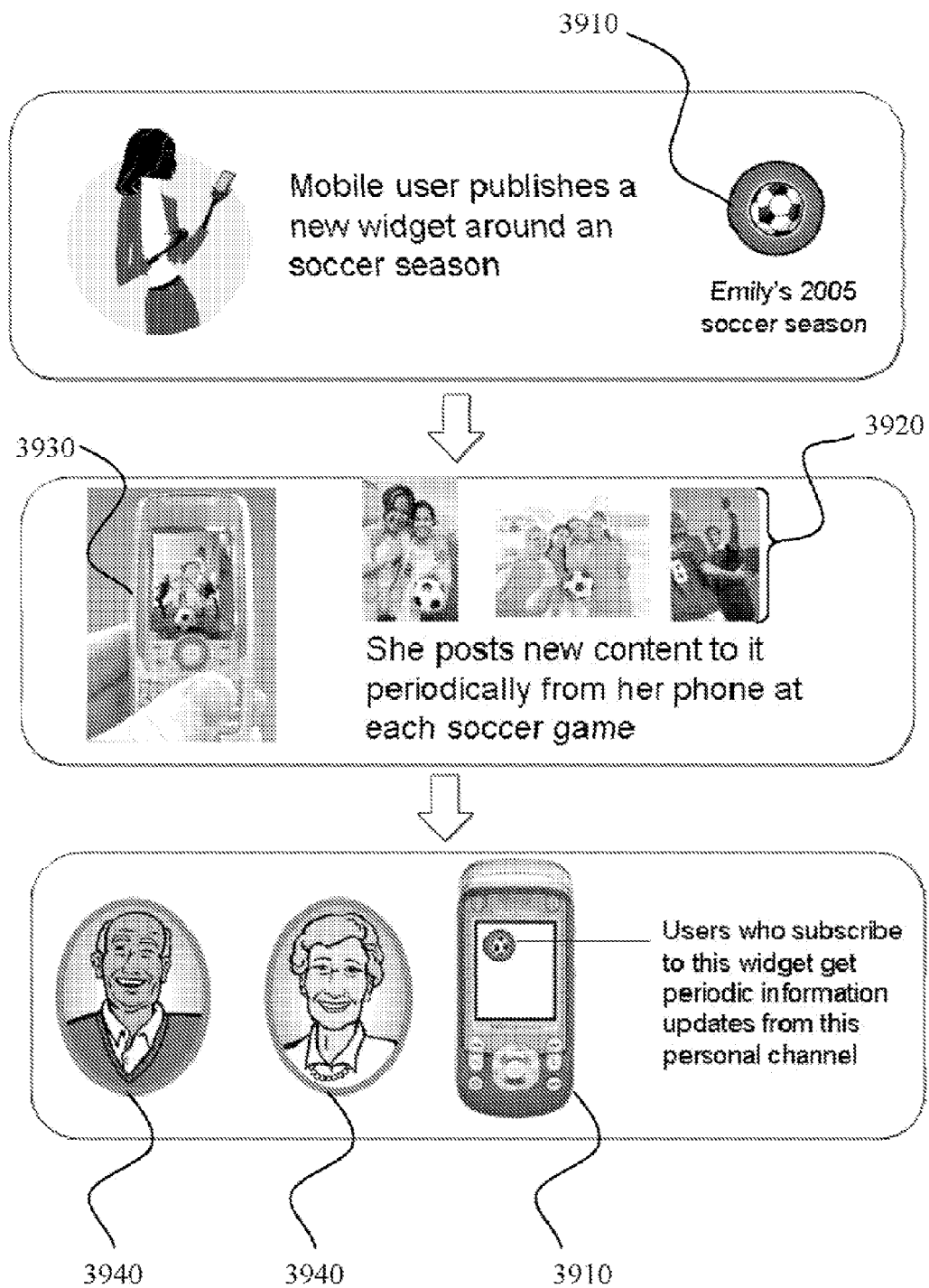
FIG. 39 depicts an exemplary use case that illustrates the need for publishing a widget from a phone and sharing it.

The example of FIG. 39 illustrates a parent creating a mobile widget 3910 for her daughter's soccer season. She periodically takes pictures 3920 from a camera of her mobile phone 3930 during every game and posts it to that widget 3910. Grandparents and other family members 3940 that may subscribe to this widget 3910 to periodically receive a photo stream as and when new pictures are uploaded. This whole use case may not require a desktop computer since the widget 3910 is both created and subscribed to from a mobile client device.

Other Types of Mobile Widgets

Though not shown, it is possible to present the user with several such wizards to publish various kinds of mobile widgets. Other examples include a mobile widget that shows a picture slideshow of personal pictures, music or videos. In this case the user may be asked to input URLs to upload the specific media and a mobile widget may be generated with the associated media. Yet another widget could be a personalized weather widget where the user specifies a location and a weather mobile widget would be generated for him.

Figure 40:
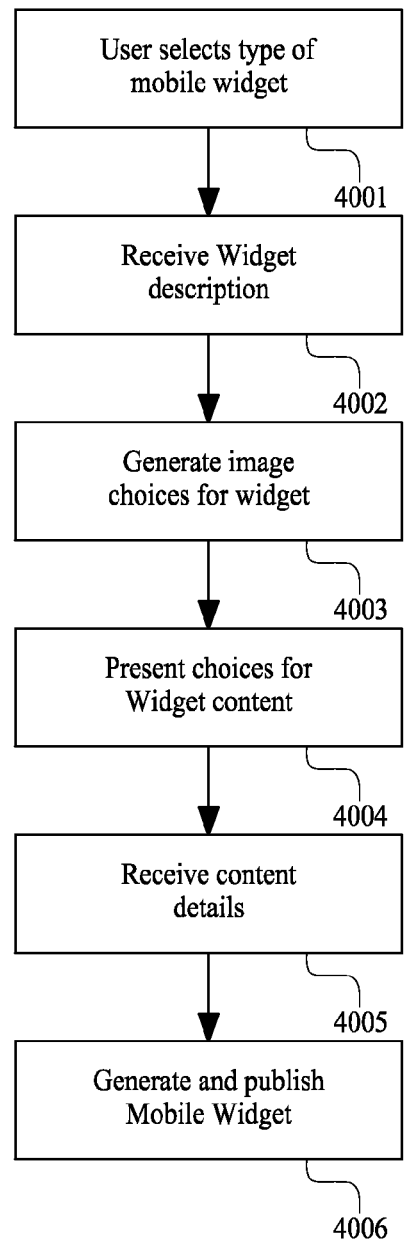
FIG. 40 is a flowchart depicting the supporting server-side process to create a mobile widget.

FIG. 40 shows the supporting server-side process to create a mobile widget according to one embodiment. The first element in box 4001 is to present the publisher with widget type choices to select the types of widget. The system supports several types of widgets that may be created non-programmatically using these "wizards". More such wizards may be added as desired for convenience. Mobile widgets preferably have an icon associated with them. In box 4002 the user enters a title, keywords, and description for the widget. In box 4003, the system performs a keyword search based on the widget description, title and keywords and presents the publisher with image choices to represent the mobile widget. These images may be search results from an external image search engine such as Yahoo or from an internal repository of images in the system.

As described in the previous example in FIG. 37(*d*), the system may then present the user with one or more choices where the user selects the type of information to be added in the mobile widget (box 4004). For a weather widget this may be the zip code or location, for a mashup-widget, this may be a list of content sources, for a photo album widget this may be a list of image URLs. The user may then add the content details and submits these choices to the system (box 4005). The widget service server system may then generate the mobile widget in a element depicted by box 4006. The details of process 4006 are depicted in FIG. 41 and described in the section named "Mobile Widget Creation"

CONCLUSION

In the embodiments described above, each flowchart is shown for the illustrative purposes. Some blocks in the flowcharts can be omitted or combined with one another in other embodiments.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications thereof. Thus, it is intended that the scope of the present invention herein disclosed should not be limited by the particular disclosed embodiments described above.

APPENDIX A

BNF

CompilationUnit:
    (Statement|FunctionDecl)*
Expression:
    Assignment
    |ConditionalExpression
    |FunctionExpression
Assignment:
    PrimaryExpression AssignmentOperator Expression
AssignmentOperator:
    "="|"*="|"/="|"%="|"+="|"-="|
    "<<="|">>="|">>>="|"&="|"^="|"|="
ConditionalExpression:
    ConditionalOrExpression ["?" Expression ":" ConditionalExpression]
ConditionalOrExpression:
    ConditionalAndExpression ("||" ConditionalAndExpression)*
ConditionalAndExpression:
    InclusiveOrExpression ("&&" InclusiveOrExpression)*
InclusiveOrExpression:
    ExclusiveOrExpression ("|" ExclusiveOrExpression)*
ExclusiveOrExpression:
    AndExpression ("^" AndExpression)*
AndExpression:
    EqualityExpression ("&" EqualityExpression)*
EqualityExpression:
    RelationalExpression (
        "==" RelationalExpression
    |"!=" RelationalExpression
    )*
Relational Expression:
    ShiftExpression (
        "<" ShiftExpression
    |">" ShiftExpression
    |"<=" ShiftExpression
    |">=" ShiftExpression
    )*
ShiftExpression:
    AdditiveExpression (
        "<<" AdditiveExpression
    |">>" AdditiveExpression
    |">>>" AdditiveExpression
    )*
AdditiveExpression:
    MultiplicativeExpression (
        "+" MultiplicativeExpression
    |"-" MultiplicativeExpression
    )*
MultiplicativeExpression:
    UnaryExpression (
        "*" UnaryExpression
    |"/" UnaryExpression
    |"%" UnaryExpression
    )*
UnaryExpression:
    "+" UnaryExpression
    |"-" UnaryExpression
    |PreIncrementExpression
    |PreDecrementExpression
    |UnaryExpressionNotPlusMinus
PreIncrementExpression:
    "++" PrimaryExpression
PreDecrementExpression:
    "--" PrimaryExpression
UnaryExpressionNotPlusMinus:
    "~" UnaryExpression
    |"!" UnaryExpression
    |PostfixExpression
PostfixExpression:
    PrimaryExpression ["++"|"--"]
PrimaryExpression:
    PrimaryPrefix (PrimarySuffix)*
PrimaryPrefix:
    Literal
    |Name
    |"this"
    |"(" Expression ")"
    |AllocationExpression
PrimarySuffix:
    "[" Expression "]"
    |"."<IDENTIFIER>
    |Arguments
Literal:
    <INTEGER_LITERAL>
    |<STRING_LITERAL>
    |"true"
    |"false"
    |"null"
    |"undefined"
Arguments:
    "(" [ArgumentList] ")"
ArgumentList:
    Expression ("," Expression)*
Name:
    <IDENTIFIER>
AllocationExpression:
    "new" Name Arguments
FunctionExpression:
    "function" "(" FunctionParameters ")" Block
FunctionDecl:
    "function"<IDENTIFIER>"(" FunctionParameters ")" Block
FunctionParameters:
    [<IDENTIFIER>(","<IDENTIFIER>)*]

Statement:
  Block
  |EmptyStatement
  |StatementExpression ";"
  |VarStatement
  |SwitchStatement
  |IfStatement
  |WhileStatement
  |DoStatement
  |ForStatement
  |BreakStatement
  |ContinueStatement
  |ReturnStatement
  |TryStatement
  |ThrowStatement
Block:
  "{" (Statement)* "}"
EmptyStatement:
  ";"
StatementExpression:
  PreIncrementExpression
  |PreDecrementExpression
  |Assignment
  |PostfixExpression
VarStatement:
  "var" VariableDeclarator ("," VariableDeclarator)* ";"
VariableDeclarator:
  <IDENTIFIER>["=" VariableInitializer]
VariableInitializer:
  Expression
  |"{"
    [HashInitializer ("," HashInitializer( ))*]
  "}"
HashInitializer:
  (<IDENTIFIER>|<STRING_LITERAL>) ":" Expression
SwitchStatement:
  "switch" "(" Expression ")" "{"
    (SwitchLabel (Statement)*)*
  "}"
SwitchLabel:
  "case" Expression ":"
  |"default" ":"
IfStatement:
  "if" "(" Expression ")" Statement ["else" Statement]
WhileStatement:
  "while" "(" Expression ")" Statement
DoStatement:
  "do" Statement "while" "(" Expression ")" ";"
ForStatement:
  "for" "(" [ForInit] ";" [Expression] ";" [ForUpdate] ")"
    Statement
ForInit:
  StatementExpressionList
StatementExpressionList:
  StatementExpression ("," StatementExpression)*
ForUpdate:
  StatementExpressionList
BreakStatement:
  "break" ";"
ContinueStatement:
  "continue" ";"
ReturnStatement:
  "return" [Expression] ";"
TryStatement:
  "try" Block [CatchBlock] [FinallyBlock]
CatchBlock:
  "catch" "(" <IDENTIFIER> ")" Block
FinallyBlock:
  "finally" Block
ThrowBlock:
  "throw" Expression ";"

APPENDIX B

```
Mark and Sweep:
function gc( ) {
for each root variable obj {
    mark(obj);
}
sweep( );
}
function mark(obj) {
    if (!obj.marked) {
obj.marked = true;
for each property referenced by obj {
    mark(property);
}
}
}
function sweep( ) {
    for each obj in heap {
        if (obj.marked) {
            obj.marked = false;
        } else {
            release(obj);
        }
    }
}
Store and Copy:
function gc( ) {
    for each root variable obj {
        ref = copy(obj, inactiveHeap);
    }
    swap(activeHeap, inactiveHeap);
}
function copy(obj, destinationHeap) {
    if (obj==null) {
        return null;
    }
    if (obj.forward==null) {
        ref = destinationHeap.newInstance(obj.class);
        obj.forward = ref;
        for each field f in obj {
            if (f is a primitive) {
                ref.f= obj.f;
            } else {
                ref.f = copy(obj.f, destinationHeap);
            }
        }
        ref.forward = null;
    }
}
Mark and Compact:
function gc( ) {
    for each root variable obj {
        mark(obj);
    }
    compact( );
}
function mark(obj) {
    if (!handle[obj].marked) {
        handle[obj].marked = true;
        for each object q referenced by obj {
            mark(q);
        }
    }
}
function compact( ) {
    long offset = 0;
    for each object obj in heap {
        if (handle[obj].marked) {
            handle[obj].object = heap.move(obj, offset);
            handle[obj].marked = false;
            offset += sizeof(obj);
```

-continued

```
            }
        }
    }
```

APPENDIX C

APIs: Platform APIs to the system.
File input/output:
array=File.getRoots( )
File.mkdir(path)
File.delete(path)
array=File.list(path)
boolean=File.exists(path)
fileObj=File.open(path)
buffer=fileObj.read(numBytes)
fileObj.write(buffer)
fileObj.close( )
Database:
DB.delete(path)
boolean=DB.exists(path)
db=DB.open(path)
db.removeItem(id)
db.setItem(hash)
hash=db.getItem(id)
hash=db.getFirstItem( )
hash=db.getFirstItem(function)
hash=db.getNextItem( )
db.close( )
Network operations (e.g. HTTP, sockets):
sock=Socket.open(url)
sock.read(numBytes)
sock.write(buffer)
sock.registerCallback(function)
sock.close( )
HTTP:
conn=HTTP.open(url, headers)
conn.write(buffer)
buffer=conn.read(numBytes)
integer=conn.getResponse( )
string=conn.getHeader(name)
conn.registerCallback(function)
conn.close( )
Graphics display (e.g. browser API and graphics canvas)
User input
Text parsing (e.g. XML)
DOM elements
Node->children (array)
Node->attributes (hash)
Node->text
Node->type (1=node, 2=text)
Mathematical operations and functions
Math.random( )
Math.sin( )
Math.cos( )
Math.sqrt( )
Math.PI
PIM API
For contact, calendar, tasks:
list=open(type)
list.close( )
list.getField( )
list.enumerateFields( )
data=list.create( )
data.setField( )
list.add(data)
Time
seconds=Time.getCurrentTime( )
Time.wait(milliseconds)
String
str2int
charAt( )
indexOf( )
lastIndexOf( )
substr( )
length( )

APPENDIX D

OP_NOP
No operation. Performs no operation and moves to the next instruction.
OP_PUSH_COPY Makes a copy of the value at the top of the stack and pushes that value onto the stack.
OP_PUSH_INT <int_value>
Push the following integer constant onto the stack.
OP_PUSH_STRING <index>
Push the following string onto the stack. The following value is an integer index into a constants table with the string values indexed by the integer index.
OP_PUSH_TRUE
Push a "True" value onto the stack.
OP_PUSH_FALSE
Push a "False" value onto the stack.
OP_PUSH_NULL
Push a NULL value onto the stack.
OP_PUSH_UNDEFINED
Push an "undefined" value onto the stack.
OP_PUSH_FUNCTION <int_function_ref>
Push a function reference onto the stack.
OP_PUSH_OBJECT
Push a new object onto the stack.
OP_POP
Pops a value off the stack and discards that value.
OP_GET_VARIABLE <index>
Get the value of the specified variable and pushes that value onto the stack. First, we'll check the local scope. If the variable doesn't exist, we'll look in the global scope.
OP_SET_VARIABLE <index>
Pops a value off the stack and stores that value for the specified variable in the local scope if a variable has already been defined in a local scope. Otherwise, save into the global scope.
OP_SET_LOCAL <index>
Pops a value off the stack and stores that value for the specified variable in the local scope. Also sets the accumulator with the value.
OP_GET_PROPERTY <index>
Gets the value of the specified property on an object. Pops the object to retrieve a property from off the stack and then references the specified property. The value is pushed onto the stack.
OP_SET_PROPERTY <index>
Sets a property on an object with a specified value. Pops the value to store and then pops the object to apply. Then the property is applied on the object with the value.
OP_CALL_FUNCTION <int_function_ref>
Calls the function at the specified program counter. First pops the number of arguments that are going to be passed in. Then pops the arguments one by one in reverse order. So, the first argument popped in is the last argument to the function. Next, we push the program counter of the next instruction onto the stack (so we can return). Finally, we set the program counter to the function reference pointer to begin execution of the function.

OP_FUNCTION_RETURN
Specified at the end of the function to return to the instruction after the function call. First, pops a value from the stack to return to the caller. Then pops the program counter from the stack to return to. Then sets the accumulator to the return value back for consumption after the function call.

OP_DEFINE_FUNCTION
This is to be used at the start of function definitions to map arguments passed into a function into the parameter names that the function declared. The parameter names should have been pushed in reverse order. The top of the stack should contain the number of parameter names. Then for each parameter name, we'll go through the "arguments" array that gets passed into all functions and map the values to the variable names in the stack.

OP_NEW <int_function_ref> (not there)
Calls the constructor function at the specified program counter and creates an object. First pops the number of arguments that are going to be passed in. Then pops the arguments one by one in reverse order. So, the first argument popped in is the last argument to the function. Next, we push the program counter of the next instruction onto the stack (so we can return). Finally, we set the program counter to the function reference pointer to begin execution of the function. On return, we discard the return value. Instead, we'll use the object "this" to be pushed onto the stack.

OP_JSR <pc>
Pushes the next instruction pointer onto the stack. Then jumps to the specified program counter.

OP_JSR_RETURN
Pops an instruction pointer off the stack and jumps to that program counter location.

OP_SUB
Subtracts two values from the stack. Pops the right value and then the left value from the stack. Then subtracts the right value from the left value. The resulting value is pushed back on the stack.

OP_ADD
Adds two values from the stack. Pops the right value and then the left value from the stack. Then adds the right value to the left value. The resulting value is pushed back on the stack.

OP_MUL
Multiplies two values from the stack. Pops the right value and then the left value from the stack. Then multiplies the right value to the left value. The resulting value is pushed back on the stack.

OP_DIV
Divides two values from the stack. Pops the right value and then the left value from the stack. Then divides the right value into the left value. The resulting value is pushed back on the stack.

OP_MOD
Gets the remainder of a division between two values from the stack. Pops the right value and then the left value from the stack. Then divides the right value into the left value and gets the remainder. The resulting value is pushed back on the stack.

OP_NEG
Negates (2's complement) a value on the stack. Pops a value from the stack, negate it, and pushes the value back onto the stack.

OP_NOT
Inverts (1's complement) a value on the stack. Pops a value from the stack, NOT it, and pushes the value back onto the stack.

OP_AND
Performs a bitwise AND of two values from the stack. Pops the right value and then the left value from the stack. Then performs a bitwise AND of the right value into the left value. The resulting value is pushed back on the stack.

OP_OR
Performs a bitwise OR of two values from the stack. Pops the right value and then the left value from the stack. Then performs a bitwise OR of the right value into the left value. The resulting value is pushed back on the stack.

OP_LE
Performs a logical comparison of two values from the stack. Pops the right value and then the left value from the stack. Then compares the left value to the right value. If the left value is less than or equal to the right value, a "True" is pushed onto the stack. Otherwise, a "False" is pushed.

OP_GE
Performs a logical comparison of two values from the stack. Pops the right value and then the left value from the stack. Then compares the left value to the right value. If the left value is greater than or equal to the right value, a "True" is pushed onto the stack. Otherwise, a "False" is pushed.

OP_EQ
Performs a logical comparison of two values from the stack. Pops the right value and then the left value from the stack. Then compares the left value to the right value. If the left value is equal to the right value, a "True" is pushed onto the stack. Otherwise, a "False" is pushed.

OP_NE
Performs a logical comparison of two values from the stack. Pops the right value and then the left value from the stack. Then compares the left value to the right value. If the left value is not equal to the right value, a "True" is pushed onto the stack. Otherwise, a "False" is pushed.

OP_LT
Performs a logical comparison of two values from the stack. Pops the right value and then the left value from the stack. Then compares the left value to the right value. If the left value is less than the right value, a "True" is pushed onto the stack. Otherwise, a "False" is pushed.

OP_GT
Performs a logical comparison of two values from the stack. Pops the right value and then the left value from the stack. Then compares the left value to the right value. If the left value is greater than the right value, a "True" is pushed onto the stack. Otherwise, a "False" is pushed.

OP_COND_JUMP_TRUE <int_pc>
Pops a value from the stack. If its boolean equivalent is "True", then branch to the specified program counter. Otherwise, continue to the next instruction.

OP_COND_JUMP_FALSE <int_pc>
Pops a value from the stack. If its boolean equivalent is "False", then branch to the specified program counter. Otherwise, continue to the next instruction.

OP_JUMP <int_pc>
Branch to the specified program counter.

OP_LOGICAL_NOT
Performs a logical "not" on a value on the stack. First pops the value. Then converts the value into a boolean equivalent. If the value is "True", we'll push "False" onto the stack. If the value is "False", we'll push a "True" onto the stack.

OP_SHR
Shifts a value to the right by the specified number of bits, preserving the sign bit. First pops the number of bits to shift by. Then pops the value to shift. Then, shifts the bits as specified, pushing the resulting value back onto the stack.
OP_USHR
Shifts a value to the right by the specified number of bits, ignoring the sign bit. First pops the number of bits to shift by. Then pops the value to shift. Then, shifts the bits as specified, pushing the resulting value back onto the stack.
OP_SHL
Shifts a value to the left by the specified number of bits. First pops the number of bits to shift by. Then pops the value to shift. Then, shifts the bits as specified, pushing the resulting value back onto the stack.
OP_LOGICAL_AND
Performs a logical AND on two values on the stack. Pops the right value and then the left value from the stack. If the boolean equivalents of both values are "True", then push a "True" onto the stack. Otherwise, a "False" is pushed. Note that the compiler should generate a short-circuit evaluation of this operator so that if the first value is "False", it does not evaluate the right operand.
OP_LOGICAL_OR
Performs a logical OR on two values on the stack. Pops the right value and then the left value from the stack. If the boolean equivalents of either of the two values are "True", then push a "True" onto the stack. Otherwise, a "False" is pushed. Note that the compiler should generate a short-circuit evaluation of this operator so that if the first value is "True", it does not evaluate the right operand.
OP_XOR
Performs a bitwise exclusive OR of two values from the stack. Pops the right value and then the left value from the stack. Then performs a bitwise exclusive OR of the right value into the left value. The resulting value is pushed back on the stack.
OP_TRY
Defines a try-catch-finally block. Pops two values off the stack. Pops the PC of the catch block and saves in the handler. Pops the PC of the finally block and saves in the handler. The catch block handles the exception if thrown. The code in the finally block always gets executed whether or not an exception occurred. If the PC for either value is 0, then the respective block is disabled. For example, if the catch PC value is 0, the catch block is not defined and exceptions may not be handled. Similarly, if the finally PC value is 0, the finally block is not defined.
OP_END_TRY
Closes the try-catch-finally block by resetting the handler for the current stack frame.
OP_THROW
Pops the value off the stack and throws an exception. Looks for the current handler. If an exception handler is defined, the handler may handle the exception. Otherwise, pops off the current invocation stack frame to the caller frame to see if a handler exists there. It continues until there is a handler or until there are no more stack frames. At that point, the mobile client handles the exception (one implementation could show the error to the user).
OP_CLEAR_EXCEPTION
Clears the pending exception.

APPENDIX E

```
ch = getchar( )
// Start of a tag?
if (ch=="<") {
    ch = getchar( )
    if (ch=="/") {
        type = END_TAG;
    else {
        type = START_TAG;
    }
    skip_whitespaces( );
    name = read_text_until_whitespace( );
    do {
        skip_whitespaces( );
        if (ch is part of a name) {
            attr_name = read name( );
            attr_value = read value( );
            save_attribute(attr_name, attr_value);
        }
    } while (ch not end of tag);
} else {
    type = TEXT;
    text = read until_start_tag( );
}
```

After the getNext( ) is called, the following functions can be called:
getText( )
If the result of the getNext( ) was a TEXT, then we should call this function to get the text in between the start and end tags.
getNextAttr( )
If the result of the getNext( ) was a TAG, then we call getNextAttr( ) in a loop to get all of the attributes of the tag. The return determines whether there are more attributes (TRUE) or no more (FALSE). After calling getNextAttr( ) we can call getAttrName( ) and getAttrValue( ) to get the name and value of the attribute.
getAttrName( )
After calling getNextAttr( ) use this to get the attribute name.
getAttrValue( )
After calling getNextAttr( ) use this to get the attribute value.

APPENDIX F

Hyperlink—When a select action is performed, a new page is rendered given a specified target page to render. Application developers can set a target page URL that is used when the select action is performed. In addition, application developers can assign custom handlers to handle the select action so that their own functions can be executed rather than to jump to the target page.

Form—A form is a block that allows for user enterable data to be filled. Application developers set a target page URL. When the form data gets submitted, the form data is encoded and then sent to the specified URL for further handling. Form "submission" can be done either via user selection of a button or can be done programmatically by the application developer.

Form text input field—Allows users to enter text in the field. Allows for textual, numeric, or password (hidden non-echoed text). It can be rendered as a single line or multi-line field to allow users to enter textual information. Characters that the user enters on the mobile device keyboard are echoed in the text field (except for password fields). In addition, application developers can add their own handlers to determine what should happen when users enter text into the text field.

Form button—When the user selects the button and performs the default action, the form data in the encompassing "form" widget gets collected and sent to the handler. All data in the form elements that are contained in the form are collected, encoded, and submitted to the "form" widget URL. An application developer can override this button behavior by defining their own handler.

That way, when the end-user interacts with the button, the application can perform a different action.

Form checkbox—These are elements that have two states, on and off. When the default action is performed, the states are toggled between on and off. An application developer can override this behavior by defining their own handler.

Form radio button—These are elements that have two states, on and off. Radio buttons are similar to checkbox elements. However, radio buttons exist in a group such that only one radio button in the group are on while the rest are off. When the default action is performed, that radio button's state goes to on while the other radio buttons in the group go to off. An application developer can override this behavior by defining their own handler. A radio button can become a member of a group by their name.

Form list selection—Displays a list of elements that the user can individually select. Selection can be one or multiple items in the list. When the default action is performed for a one-selection model, the single item gets selected while the others are deselected. For the multi-selection model, the states of each individual item toggles between on and off.

Form dropdown list selection—This widget is similar to the list one-selection model, when one item gets selected, the other items are deselected. However, as rendered, it shows like a text field and expands when users are to select items in the list. This also allows for an input mode where the user can type text into the field (like the text input field).

Form file upload—This widget allows for submission of binary data. On a desktop computer, users can specify a file to "upload" to the server. In the mobile case, we'll use this to invoke special functions on the mobile device and upload its data. Some examples include image, audio, video capture. Users select the widget and select it to launch the specific mobile device capture tool. The tool runs and captures the data. The application can then retrieve the data and upload in the form on a form submission.

Form hidden element—This is a non-visible widget that includes only of a name and value pair. It is useful when values need to be posted along with the form. Users are not able to interact with this widget since it is not visible.

SVG—Provides a vector-based graphics display canvas on which to render graphical elements. See section on vector graphics for more details.

Active Object—This is an application definable widget that can do what the developer sees fit. This type of widget is useful in the cases when the basic elements are not enough to render the user interface. Some examples include video players, audio players, scrolling items, etc.

What is claimed is:

1. A mobile device, comprising:
at least one processor;
memory storing instructions, the instructions comprising:
   instructions for a declaratory markup language renderer configured to instruct the at least one processor to render a declaratory markup language component of a widget application on a display of the mobile device;
   instructions for a compiled programming language execution engine configured to instruct the at least one processor to execute a compiled programming language component of a widget application installed on the mobile device;
   instructions for a mobile device API, adapted to be accessible to a widget application, and providing access to a device service API of the mobile device; and
   instructions for a widget manager configured to instruct the at least one processor to: crawl one or more remote network resources accessible via a network for widget applications; to automatically determine one or more of the widget applications for download based on a user profile associated with the mobile device; to automatically download the one or more widget applications, from a remote network location to the mobile device, to constitute a set of downloaded widget applications; and to install the set of downloaded widget applications, wherein the downloading and installing are based on the user profile associated with the mobile device, without user interaction with the mobile device;
   wherein the set of downloaded widget applications corresponds to a first set of widget applications; and
   instructions for the widget manager configured to instruct the at least one processor to automatically uninstall one or both of the first set of widget applications and a second set of widget applications on the mobile device based at least in part on user preferences, without user interaction with the mobile device.

2. The mobile device of claim 1, wherein the instructions for the widget manager are further configured to instruct the at least one processor to initiate displays of the set of downloaded widget applications or descriptions of the set of downloaded widget applications on the display of the mobile device.

3. The mobile device of claim 1, wherein the instructions for the widget manager are further configured to instruct the at least one processor to automatically download descriptions of widget applications from a network location to the mobile device based on the user profile associated with the mobile device.

4. The mobile device of claim 1, wherein the instructions for the widget manager are further configured to instruct the at least one processor to delete widget applications from the mobile device one or both of the first set of widget applications and a second set of widget applications on the mobile device based at least in part on user preferences, without user interaction with the mobile device.

5. The mobile device of claim 1, wherein the instructions for the widget manager are further configured to instruct the at least one processor to:
receive a search query from a user of the mobile device; and
send the query to the network location to initiate a search for widget applications related to the query.

6. The mobile device of claim 5, wherein the instructions for the widget manager are further configured to instruct the at least one processor to:
receive widget applications or descriptions of widget applications in response to the query, from the network location or a different network location, the received widget applications or descriptions being related to the query; and
display the received widget applications or descriptions of widget applications on the display of the mobile device.

7. The mobile device of claim 1, wherein the instructions for the compiled programming language execution engine provide access to the device service API of the mobile device.

8. The mobile device of claim 1, wherein the compiled programming language execution engine is a compiled scripting language execution engine.

9. The mobile device of claim 8, wherein the instructions for the compiled scripting language execution engine instruct the at least one processor to execute compiled JavaScript.

10. The mobile device of claim 8, wherein the instructions for the compiled scripting language execution engine instruct the at least one processor to execute bytecode.

11. The mobile device of claim 8, wherein the instructions for the compiled scripting language execution engine instruct the at least one processor to execute object code.

12. The mobile device of claim 1, further comprising instructions for an installation component configured to instruct the at least one processor to permanently install a widget application onto the mobile device.

13. The mobile device of claim 1, wherein the instructions for the declaratory markup language renderer are configured to instruct the at least one processor to render images and/or video on a mobile device display.

14. The mobile device of claim 1, wherein the device service API is an API for a camera of the mobile device.

15. The mobile device of claim 1, wherein the device service API is an API for a video-recorder of the mobile device.

16. The mobile device of claim 1, wherein the device service API is an API for displaying content in a home screen of the display of the mobile device.

17. The mobile device of claim 1, wherein the device service API is an API for a touchscreen of the mobile device.

18. The mobile device of claim 1, wherein the device service API is an API for a transceiver of the mobile device.

19. The mobile device of claim 1, wherein the device service API is an API for a raw network connection of the mobile device.

20. The mobile device of claim 1, wherein the device service API is an API for a network socket.

21. The mobile device of claim 1, wherein the device service API is an API for an audio speaker of the mobile device.

22. The mobile device of claim 1, wherein the device service API is an API for a global positioning system (GPS) device of the mobile device.

23. The mobile device of claim 1, wherein the device service API is an API for a microphone of the mobile device.

24. The mobile device of claim 1, wherein the device service API is an API for using an email software program on the mobile device.

25. The mobile device of claim 1, wherein the device service API is an API for using a software calendar of the mobile device.

26. The mobile device of claim 1, wherein the device service API is an API for accessing a data storage of the mobile device.

27. The mobile device of claim 1, wherein the device service API is an API for using a personal information manager software program.

28. The mobile device of claim 1, wherein the device service API is an API for an accelerometer of the mobile device.

29. The mobile device of claim 1, wherein the device service API is an API for a software program for storing and managing personal contacts.

30. The mobile device of claim 1, wherein the device service API is an API for a text messaging service of the mobile device.

31. The mobile device of claim 1, wherein the device service API is an API for an instant messenger and/or chat service of the mobile device.

32. The mobile device of claim 1, wherein the device service API is an API for a voice call service of the mobile device.

33. The mobile device of claim 1, wherein the device service API is an API for a media player of the mobile device, the media player adapted to play at least one of audio data and video data.

34. The mobile device of claim 1, wherein the device service API is an API for a battery level determiner of the mobile device.

35. The mobile device of claim 1, wherein the device service API is an API for a brightness level control for the display of the mobile device.

36. The mobile device of claim 1, wherein the device service API is an API for a vibrator of the mobile device.

37. The mobile device of claim 1, wherein the device service API is an API for allowing a software application on a mobile device to send data to another software application on the mobile device.

38. The mobile device of claim 1, wherein the device service API is an API for displaying customized content within a screen saver.

39. The mobile device of claim 1, wherein the device service API is an API for displaying content on a second display of the mobile device.

40. The mobile device of claim 1, wherein the device service API is an API for generating a popup notification on the mobile device display.

41. The mobile device of claim 1, wherein the device service API is an API for monitoring for an event comprising one of a receipt of a text message, receipt of an email, receipt of a phone call, or activation of an alarm, the system configured to execute a widget application in response to the event.

42. The mobile device of claim 1, wherein the device service API is an API for accessing a mobile device ID.

43. The mobile device of claim 1, wherein the device service API is an API for a wireless signal strength determination unit.

44. The mobile device of claim 1, further comprising instructions for a data synchronization engine configured to instruct the at least one processor to synchronize network content between a server and the mobile device, the network content being utilized by the widget application.

45. The mobile device of claim 44, wherein the instructions for the data synchronization engine are further configured to instruct the at least one processor to prefetch content for a widget application installed on the mobile device.

46. The mobile device of claim 1, further comprising instructions for a data access management component configured to instruct the at least one processor to allow a widget application to write data to a first storage that is inaccessible to other widget applications and software programs installed on the mobile device, and to allow a widget application to write data to a second storage that is accessible to other widget applications and software programs installed on the mobile device.

47. The mobile device of claim 1, further comprising instructions for a data synchronization engine configured to instruct the at least one processor to synchronize widget applications between a server and the device, such that specified widget applications are sent by the server to the device during a synchronization process of the device.

48. The mobile device of claim 1, wherein the mobile device is further configured to store network content.

49. The mobile device of claim 1, where the execution engine comprises a virtual machine adapted to execute bytecode.

50. The mobile device of claim 49, wherein the virtual machine is adapted to execute compiled JavaScript.

51. The mobile device of claim 1, further comprising instructions for a widget permissions engine configured to instruct the at least one processor to preclude a widget application from accessing unauthorized functionality of the device.

52. The mobile device of claim 51, wherein the instructions for the widget permissions engine are further configured to instruct the at least one processor to cease execution of a widget application attempting to access unauthorized functionality of the mobile device.

53. The mobile device of claim 52, wherein the instructions the widget permissions engine are further configured to instruct the at least one processor to add additional permissions restrictions to the widget application attempting to access unauthorized functionality of the mobile device.

54. The mobile device of claim 52, wherein the instructions for the widget permissions engine are further configured to instruct the at least one processor to mark a widget application attempting to access unauthorized functionality of the mobile device with a warning.

55. The mobile device of claim 1, further comprising instructions for an advertisements engine configured to instruct the at least one processor to:
    receive advertisements from a server;
    store the advertisements in a storage of the mobile device; and
    respond to an execution of a widget application on the mobile device by retrieving at least one of the advertisements from the storage and showing the at least one advertisement on the display of the mobile device.

56. The mobile device of claim 55, wherein the instructions for the advertisements engine are configured to instruct the at least one processor to receive advertisements that define actions for the advertisements engine to initiate if a user of the mobile device selects an advertisement shown on the display.

57. The mobile device of claim 56, wherein the instructions for the advertisements engine are configured to instruct the at least one processor to initiate one or more of the following actions in response to a user's selection of an advertisement shown on the display:
    initiate a telephone call to an advertised service or company;
    show, on the display, additional text and/or image content related to the selected advertisement;
    play audio data related to the selected advertisement; and
    play video data related to the selected advertisement.

58. The mobile device of claim 56, wherein the instructions for the advertisements engine are further configured to instruct the at least one processor to:
    log data comprising one or more of: (1) an amount of times each of the advertisements are displayed on the display, (2) user selections of advertisements shown on the display, and (3) actions initiated by the advertisements engine in response to said user selections; and
    send said logged data to a server over a network.

59. The mobile device of claim 1, further comprising:
    instructions for a location module configured to instruct the at least one processor to determine a current location of the mobile device.

60. A method comprising:
    rendering, on a mobile device, a declaratory markup language component of a widget application;
    executing, on the mobile device, a compiled programming language component of the widget application;
    automatically crawling, by the mobile device, one or more remote network resources accessible via a network for widget applications and determining one or more of the widget applications for download based on a user profile associated with the mobile device, without user interaction with the mobile device; and
    automatically downloading and installing, by the mobile device, the one or more widget applications to constitute a set of downloaded widget applications from a remote network location to the mobile device, without user interaction with the mobile device;
    wherein the set of downloaded widget applications corresponds to a first set of widget applications; and
    automatically uninstalling, by the mobile device, one or both of the first set of widget applications and a second set of widget applications on the mobile device based at least in part on user preferences, without user interaction with the mobile device; and
    wherein executing the compiled programming language component comprises making available to the widget application an API to access a device service of the mobile device.

61. The method of claim 60, wherein the compiled programming language component comprises a compiled scripting language component.

62. The method of claim 60, where the device service is one of the group consisting of: a camera, a video-recorder, a user interface for a home screen of a display of the mobile device, a touchscreen, a transceiver, a raw network connection, a network socket, an audio speaker, a GPS device, a microphone, an email software program, a software calendar, a data store, a personal information manager software program, an accelerometer, a software program for storing and managing personal contacts, a text messaging service, an instant messenger service, a chat service, a voice call service, a media player, a battery level determiner, a brightness level control for the mobile device display, and a vibrator.

* * * * *